United States Patent
Robotham et al.

(10) Patent No.: US 6,704,024 B2
(45) Date of Patent: Mar. 9, 2004

(54) VISUAL CONTENT BROWSING USING RASTERIZED REPRESENTATIONS

(75) Inventors: John S. Robotham, Belmont, MA (US); Charles Lee Johnson, Newton, MA (US); Howard P. Weiss, Newton, MA (US)

(73) Assignee: ZFrame, Inc., Belmont, MA (US)

( * ) Notice: Subject to any disclaimer, the term of this patent is extended or adjusted under 35 U.S.C. 154(b) by 420 days.

(21) Appl. No.: 09/725,331

(22) Filed: Nov. 29, 2000

(65) Prior Publication Data

US 2002/0015042 A1 Feb. 7, 2002

Related U.S. Application Data

(60) Provisional application No. 60/244,231, filed on Oct. 30, 2000, and provisional application No. 60/223,151, filed on Aug. 7, 2000.

(51) Int. Cl.[7] .............................. G09G 5/00; G06F 15/16
(52) U.S. Cl. ........................ 345/581; 345/619; 345/744; 709/203; 709/219; 709/246
(58) Field of Search .................................. 345/427, 428, 345/581, 582, 594, 613–614, 619, 531, 538, 744, 733, 734, 737, 748–751; 709/200, 201, 203, 205, 213, 219, 227, 232, 245–246, 238; 715/500.1, 501.1

(56) References Cited

U.S. PATENT DOCUMENTS

| | | | |
|---|---|---|---|
| 5,586,244 A | 12/1996 | Berry et al. | |
| 5,754,774 A | 5/1998 | Bittinger et al. | 395/200.33 |
| 5,801,689 A | 9/1998 | Huntsman | 345/329 |
| 5,895,471 A | 4/1999 | King et al. | 707/104 |
| 5,918,013 A | 6/1999 | Mighdoll et al. | 395/200.47 |
| 5,918,228 A | 6/1999 | Rich et al. | 707/10 |
| 5,930,472 A | 7/1999 | Smith | 395/200.33 |

(List continued on next page.)

FOREIGN PATENT DOCUMENTS

| | | | |
|---|---|---|---|
| EP | 0 690 415 A2 | 1/1996 | |
| EP | 0 810 579 A2 | 3/1997 | |
| EP | 0 974 916 A2 | 1/2000 | |
| EP | 0994 426 | 4/2000 | G06F/17/30 |
| EP | 1050 846 | 11/2000 | G06T/3/40 |

(List continued on next page.)

OTHER PUBLICATIONS

Fox, et al., "Experience With Top Gun Wingman: A Proxy-Based Graphical Web Browser for the 3Com PalmPilot", Middleware. IFIP International Conference on Distributed Systems Platforms and Open Distributed Processing, Sep. 1998, pp. 407–424.

Myers, B.A., Miller, R.C., Bostwick, B., Evankovich, C. "Extending the Windows Desktop Interface with Connected Handheld Computers," Human Computer Interaction Institute, School of Computer Science, Carnegie Mellon University, 10 pgs.

Primary Examiner—Matthew C. Bella
Assistant Examiner—Wesner Sajous
(74) Attorney, Agent, or Firm—Hamilton, Brook, Smith & Reynolds, P.C.

(57) ABSTRACT

The present invention relates to display of visual content on a client device using server-side rasterization of visual content. Visual content is rendered on a server system, transformed into bitmaps compatible with the display attributes of a client device, and transmitted for display on the client device. The invention allows the server to perform, in effect, as a remote browser for displaying Web pages, e-mail, e-mail attachments, electronic document and forms, database queries and results, drawings, presentations, and images at the client device. The approach is "remote" because the server does the rendering and the client provides the interface; "multi-level" because rendered visual content is represented as a multi-level set of raster representations; and constitutes a "browsing system" because the client and server share data about the source visual content element being browsed, and the client performs a specific browsing function assisted by the server.

44 Claims, 24 Drawing Sheets

U.S. PATENT DOCUMENTS

| | | | |
|---|---|---|---|
| 5,931,904 A | 8/1999 | Banga et al. ................ 709/217 |
| 5,953,735 A | 9/1999 | Forcier |
| 5,987,256 A | 11/1999 | Wu et al. |
| 6,032,162 A | 2/2000 | Burke ........................ 707/501 |
| 6,035,281 A * | 3/2000 | Crosskey et al. .............. 705/14 |
| 6,049,821 A | 4/2000 | Theriault et al. ........... 709/203 |
| 6,052,730 A | 4/2000 | Felciano et al. ............ 709/225 |
| 6,070,184 A | 5/2000 | Blount et al. ................ 709/200 |
| 6,073,136 A | 6/2000 | Bertram et al. ............. 707/104 |
| 6,073,168 A | 6/2000 | Mighdoll et al. ........... 709/217 |
| 6,133,918 A | 10/2000 | Conrad et al. |
| 6,147,670 A | 11/2000 | Rossmann .................. 345/123 |
| 6,185,585 B1 * | 2/2001 | Sequeira ..................... 715/513 |
| 6,476,830 B1 | 11/2002 | Farmer et al. |
| 6,487,538 B1 * | 11/2002 | Gupta et al. ................... 705/14 |
| 6,490,626 B1 * | 12/2002 | Edwards et al. ............ 709/229 |
| 6,507,854 B1 * | 1/2003 | Dunsmoir et al. ........ 715/501.1 |
| 6,553,410 B2 * | 4/2003 | Kikinis ........................ 709/218 |
| 6,623,527 B1 * | 9/2003 | Hamzy ........................ 715/513 |
| 2002/0030699 A1 | 3/2002 | Van Ee |

FOREIGN PATENT DOCUMENTS

| | | |
|---|---|---|
| JP | 09168027 | 6/1997 |
| WO | WO 97/38389 | 10/1997 |
| WO | WO 01/60068 A2 | 8/2001 |

\* cited by examiner

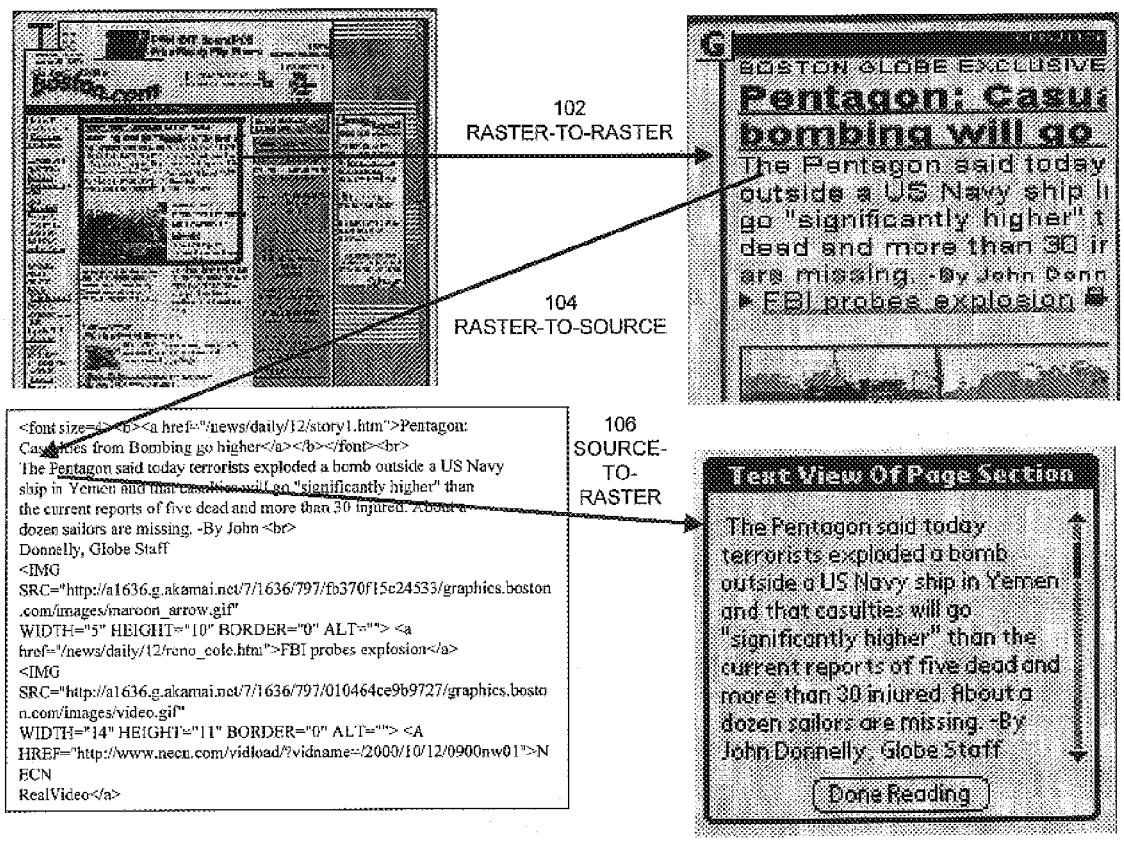
FIG. 12: CORRESPONDENCE MAP EXAMPLES

OVERVIEW
REPRESENTATION

RASTERIZED DETAIL
REPRESENTATION

TEXT-RELATED
RENDERING

OVERVIEW
REPRESENTATION

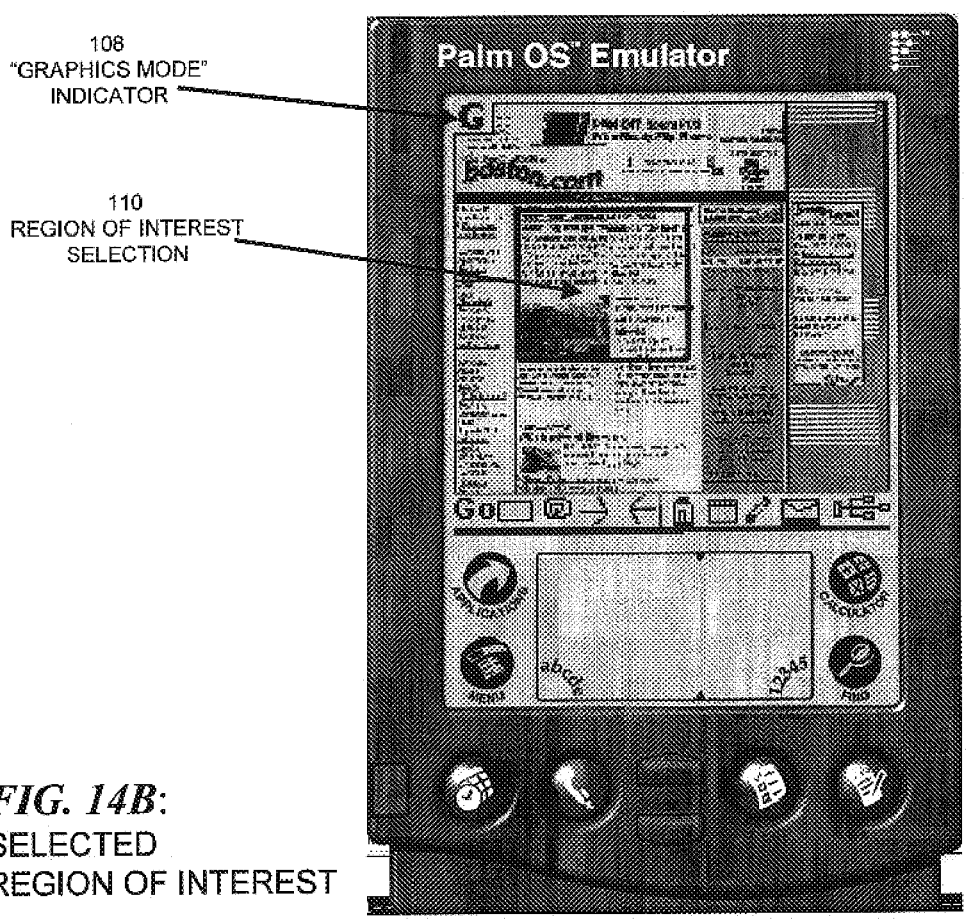
108 "GRAPHICS MODE" INDICATOR
110 REGION OF INTEREST SELECTION
*FIG. 14B*: SELECTED REGION OF INTEREST

RASTERIZED DETAIL
REPRESENTATION

108 "TEXT MODE" INDICATOR

110 REGION OF INTEREST SELECTION

SELECTION IN TEXT MODE

TEXT-RELATED RENDERING

TRANSACTION BOOKMARK
EXAMPLE

120 VISIBLE WATERMARK

122 RASTERIZED CONTENT

124 REGION SELECTED FOR VIEWING AT DETAIL LEVEL

*FIG. 16:* VISIBLE WATERMARK EXAMPLE

120
VISIBLE WATERMARK

123
RASTERIZED DETAIL

VISIBLE WATERMARK
OVER DETAIL

ACTIVE VISIBLE WATERMARK
WITH SELECTION LIST

COMPOSITE PAGE CONSTRUCTION

VISUAL CONTENT BROWSING USING RASTERIZED REPRESENTATIONS

RELATED APPLICATIONS

This application claims the benefits of U.S. Provisional Application Serial No. 60/223,151, filed on Aug. 7, 2000; and U.S. Provisional Application Serial No. 60/244,231, titled "Remote Browser Systems Using Server-Side Rendering," filed on Oct. 30, 2000.

FIELD OF THE INVENTION

The invention relates generally to a method and system for browsing visual content using rasterized representations and related browsing data. In particular, the invention relates to a method for rendering and transforming visual content on a server system based on the display attributes of a client device, and transmitting the transformed visual content for display on a client device with respect to related browsing data.

BACKGROUND OF THE INVENTION

Rendering is the process of converting visual content such as electronic documents (e.g., word-processing documents), spreadsheets, Web pages, electronic forms and electronic mail (email) into an image format useful for generating a display. In some instances, a rendered image requires additional processing to convert it into data that can be viewed on a particular display device or class of display devices. For example, rendered image data can be represented in a canonical pixel resolution and format, which are then transformed into a bitmap for display on a particular display device or class of display devices.

The term "rasterizing" as used herein describes the process of generating a displayable bitmap image from input data. Rasterizing can include a rendering step, when the input data is in a non-image (or "source") form. A bitmap includes any ordered sequence of pixel data defining a displayable image, and can include, for example, data representing bi-tonal, grayscale, RGB, hue and saturation, and chrominance and luminance values. Thus, each visual content element of an image or other displayable file is accessed, interpreted and rasterized as a bitmap according to the display attributes of a display surface, which receives the rendered image. The contents of the display surface are then "painted" onto a bitmap display device.

Client-side rendering is a common method for rendering visual content. The client system in a client-server architecture controls a display device that displays the rendered visual content for viewing by the user. The client system generally includes a processor, memory, and bitmap display, and may be, for example, a personal computer (PC). The client accesses and then renders and displays the visual content. If client-side rendering requires the client to download and execute dynamic content, then the client is susceptible to viruses and other unwanted interference from outside sources.

Content layout and design intent are important considerations in the rendering of visual content. Visual content, such as a Web page, is generally designed to convey specific information and achieve a desired viewer reaction. This design is implicitly embedded in the "coding" of the visual content and its constituent component(s). Interpreting this coding is part of the rendering function. Typically, content layout is based on PC displays. Currently, there is relative uniformity in client processing power, memory, display attributes and software environment due, in part, to the widespread use of MICROSOFT WINDOWS and similar operating systems. Consequently, the display of visual content is relatively uniform for most viewers.

As wireless networking becomes widely accepted and new intelligent client devices (e.g., Personal Digital Assistants (PDAs) and cellular telephones) are introduced to the public, the reliance on client-side rendering may begin to decrease. Processing power, memory, and software implementation will soon vary significantly among different client devices, overturning long-standing assumptions about the preferred layout of visual content; the diversity of display formats and capabilities will require new methods of providing visual content to a viewer using such client devices.

Content transcoding is one approach that addresses some of the problems of display rendering on new classes of client devices. Transcoding is an operation in which a visual content element is converted from one source format to another, before a rasterizing (or rendering) function is performed. In content transcoding, constituent components of the visual content are analyzed, and a new set of constituent components is generated by a gateway server. Content transcoding is generally based on client-side display rendering of the "re-mapped" content. Re-mapping includes various conversions of the constituent components of the visual content to accommodate the rendering capabilities of the client device.

The transcoding function can include filtering or extractive steps, where certain types of encoded content are converted, transformed or removed from the derived source representation. Transcoding can also perform a complete translation from one source encoding format to another. Transcoding can be lossless (all of the visually significant encoding and data are preserved) or lossy (some portions are not preserved).

For example, an HTML document can be rendered by an HTML rendering function in one rasterizing mode. This HTML source can also be transcoded to a WML (Wireless Markup Language) format and then rasterized by a WML rendering function in a second rasterizing mode. The two different representations can be associated as a multi-modal set, based on their relationship to the original HTML-encoded visual content element.

Transcoding can also be used to generate a different version of the source visual content element using the same encoding format as the original. For example, an HTML document can be transcoded into another HTML document, while changing, translating or removing certain encoded data. For example, references to unwanted or objectionable content can be removed, automatic language translation can be applied to text components, or layout directives can be removed or changed to other layout directives.

Many current Web pages are defined in HyperText Markup Language (HTML). Some wireless telephones are programmed to render documents based on the Wireless Access Protocol (WAP). One type of transcoding gateway reads the HTML for the Web page and attempts to remap this into equivalent WAP content. The wireless telephone then uses client-side rendering to render the WAP content for viewing on its bitmap display.

Transcoding can significantly alter the layout or contents of the re-mapped visual content as compared to the original, requiring sophisticated algorithms to preserve as much of the original intent as possible. An alternative to transcoding is to represent the same visual content in multiple forms, each form appropriate for client-side rendering on a given class of client devices. While not as technically challenging as transcoding, the additional time and cost to maintain multiple versions of the same content can be substantial.

SUMMARY OF THE INVENTION

The present invention relates to display of visual content on a client device using rasterized representations of visual content. In one aspect of the invention, visual content is rendered on a server system, transformed into bitmaps compatible with the display attributes of a client device, and transmitted for display on the client device. The the server and client coordinate to perform, in effect, as a remote multi-level browsing system for displaying Web pages, e-mail, e-mail attachments, electronic document and forms, database queries and results, is drawings, presentations, and images at the client device. The approach is "remote" because the server does the rendering and the client provides the interface; "multi-level" because rendered visual content can be represented as a multi-level set of raster representations; and constitutes a "browsing system" because the client and server share data about the source visual content element being browsed, and the client performs a specific browsing function (assisted by the server). Remote browsing contrasts with remote frame-buffer or client/server display-list architectures, since in these architectures the client and server do not share data about the source visual content element and the client does not provide a specific browsing function. Remote browsing also contrasts with client-side browsing, where the client provides an integrated rendering and browsing function, while the server only provides access to the source visual content element.

Although the image is ultimately displayed on the client device according to the present invention, it is rasterized on the server side into a form compatible with the client display. The invention results in reduced software and hardware requirements on the client, centralized administration on the server, centralized rendering resources such as font libraries, improved security and reliability on the client, reduced power consumption for portable client devices, and optimizations for wireless data communications. The invention facilitates improved support for new types of client devices including PDAs such as the PALM PILOT, wireless telephones with bitmap displays, devices intended for use in automobiles, and devices embedded in household appliances. The original layout of the visual content is preserved across different devices with consistent rendering of various types of visual content.

The approach of the invention can be "multi-modal" in the sense of providing or supporting multiple rendering modes, based on user preference and/or the type of content. For example, an implementation of the system may have two modes (a multi-level raster, and a single level text representation).

More generally, a rendering mode refers to the type of rendering technique being used, and the parameters supplied to a given technique. In the family of rendering solutions, a rendering technique can be defined by the following:

a) an optional pre-rendering step: this can provide a source-to-source transform (source transcoding and/or source extraction);

b) the rendering step: this provides the source-to-raster conversion; and c) an optional post-rendering step: this provides optional raster-to-raster transforms (multi-level raster transforms and/or raster extraction).

The algorithms used in each step define different rendering modes. In addition, each of these steps can be performed on the client or the server. The different client/server combinations define different rendering modes, and a rendering step can also be split between server and client. For example, the server can render certain types of content while the client renders the rest. A visual content element may be described as a container of its constituent components, with each constituent component having a type (which might also be "container"). Consequently, rendering by type can be applied on a "per constituent component" basis.

Each step can have parameters. Different parameters generate different representations, but these need not constitute different rendering modes. For example, changing the font size parameter in a rasterized representation from 10 point Times to 12 point Helvetica creates a different look but is not a different rendering mode.

As noted above, "rendering" as used herein refers to generating displayable data from source data—i.e., performing a source-to-raster conversion. A "source," in this context, requires some type of interpretation or conversion to generate a raster representation. The term "transcoding" is used herein to refer to source-to-source transforms. "Pixel transforms" refer to raster-to-raster transforms, i.e., operations in which output pixel values can be computed from a corresponding region of input pixels. Standard image processing operations like convolution filters are "pixel transforms," as are operations specific to the invention (e.g., generating a multi-level set of representations from a proxy display surface). The term "rasterizing" refers to a process that uses whatever transcoding, rendering and/or pixel transforms are required to convert an input visual content element into a bitmap representation for display on a particular display device or class of display devices.

A "painting function" is the process of painting a bit-map representation onto a display screen using "per-pixel" operations (including simple scaling on a "per pixel" basis), and is therefore distinct from a pixel transform. A "painting function" is typically provided by a windowing system or other type of display manager. For example, in the context of the present invention, the server typically provides "pixel transforms" while the client provides the "painting function" to its bit-map display.

A representative implementation of multi-modal browsing combines multi-level server-side rendering with client-side rendering of a transcoded text-related source representation. These two different rendering modes are applied to the same visual content element. This implementation may also provide a means to share a single raster overview representation while browsing over two different modal representations of the detail (detail raster and a rendering of the text-related representation). Since the multi-level raster representations are generated on the server, this approach constitutes multi-modal multi-level remote browsing.

The multi-level raster may, for example, have two levels (overview and detail) or more than two levels (i.e., at least one intermediate level). The user can optionally select a specific "region of interest" on an overview raster representation for viewing at the detail level. This allows the user to control how much of the detail is being sent from server to client. As part of the detail selection, the user can specify a specific rendering mode or let the system decide based on the type of content selected.

The choice of detail mode (raster, text or automatic) may be set through the user interface on the client device. If the user desires the multi-level raster version of the detail, the server sends the corresponding partial raster representation to client for browsing. The server need not send the entire raster detail, which provides a significant performance improvement over traditional content-delivery systems.

If the user desires a text-related version of the detail, the server sends the corresponding partial transcoded source to the client. For text mode, the client may render the text as a word-wrapped raster representation that fits the client viewport's horizontal pixel width. The user scrolls up and down the selected text, rather than dragging it from side to side. This also provides improved performance (compared with sending the entire detail raster, or sending the entire source representation), and is also more convenient for reading just the text. The client-side rendering of the transcoded text-related representation may be capable of displaying text, text-related formatting (bold, italic, larger type for headers) and hyperlinks; indeed, the invention is amenable to rendering the entire proposed XHTML Basic standard.

As a result, the invention is capable of handling virtually any desktop page (in both raster and text mode, with a multi-level interface shared between raster and text mode) and simultaneously handle any page designed for a tiny screen. The invention can essentially extract any part of a desktop page and convert it into a representation suitable for cell phone displays.

It should be noted that the rendering of the text-related transcoded representation need not always be on the client. For example, it might be more convenient to render Kanji (or other languages like Arabic) on the server, while still providing a text-related representation (to extract the text, and render it to fit exactly the width of the client viewport, with scrolling as needed). A variation of "text mode" may include rasterized representations of graphics components (such as tables or forms). In this mode, graphics components are rendered (on the server or client) to fit within the horizontal width of the client viewport. The rendered graphics components are sequenced vertically with text-related components, creating a segmented vertical strip of rendered content.

Accordingly, in one aspect, the invention provides a method for displaying visual content on a client device. This method includes the steps of establishing a communications link between the client device and a server, determining a display attribute of the client device, representing a visual content element on a proxy display surface of the server, transforming the represented visual content element and transmitting the bitmap to the client device for display along with a browsing-related attribute of the visual content element. The browsing-related attribute can, for example, describe data indicating the source (e.g., location or type) of the visual content, or equivalent data for a constituent component of the visual content. In one embodiment, the representation of the visual content element includes rasterizing the visual content element on the proxy display surface of the server. In another embodiment, the method includes the additional step of generating a display surface in a display memory at the client device in response to the bitmap and the data element. In yet another embodiment, the method also includes the step of generating a user interface at the client device in response to the data element.

In another aspect, the invention provides a method for generating on a server a multi-level set of bitmaps from an input bitmap. The method includes the steps of determining a display attribute of a client device, selecting a pixel region of an input bitmap, performing a transform operation on the pixel region to generate a first bitmap, defining a data element corresponding to a second bitmap, and transmitting the first bitmap, the second bitmap and the data element to the client. The data element corresponding to the second bitmap defines a relationship of the first bitmap to the second bitmap. In one embodiment, the method includes the additional step of receiving an input bitmap at the client device. In another embodiment, the step of selecting includes recalling a stored selection identifying the pixel region.

In another aspect, the invention provides a method for generating on a server a multi-level set of bitmaps from an input bitmap. The method includes the steps of determining a display attribute of a client device, identifying multiple pixels regions of an input bitmap and performing a transform operation on each of the identified pixel regions to generate multiple bitmaps based on the display attribute of the client device. The method also includes the steps of defining a plurality of data elements and transmitting the bitmaps and the data elements to the client. Each data element corresponds to a respective bitmap and defines a relationship of the respective bitmap to the input bitmap. In one embodiment, the transform operation is a scaling operation.

Another aspect of the invention provides a server for providing a rasterized visual content element to a client device. The server includes a proxy module, a transformation module in communication with the proxy module, and a communications module in communication with the transformation module. The proxy module is used to represent a proxy display. The transformation module generates a bitmap in response to an input bitmap and a display attribute of the client device. The communications module transmits the bitmap to the client device for display. In one embodiment, the transformation module is a scaling module.

Still another aspect of the invention provides a server for generating a multi-level set of bitmaps from an input bitmap. The server includes a proxy module for representing a proxy display, a communications module to receive pixel region selection data from a client device, and a transformation module in communication with the proxy module and the communications module. The transformation module performs a transform operation on a pixel region of the input bitmap to generate a first bitmap in response to the pixel region selection data and generates a data element corresponding to a second bitmap. The data element defines a relationship of the first bitmap to the second bitmap. In one embodiment, the transformation module is a scaling module.

Other aspects and advantages of the present invention will become apparent from the following detailed description, taken in conjunction with the accompanying drawings, illustrating the principles of the invention by way of example.

BRIEF DESCRIPTION OF THE DRAWINGS

The foregoing and other objects, features and advantages of the invention are apparent from the following more particular description of preferred embodiments of the invention, as illustrated in the accompanying drawings. The drawings are not necessarily to scale, emphasis instead being placed on illustrating the principles of the present invention.

FIG. 12 illustrates an example correspondence of a mapping.

FIGS. 14A–E illustrates client-device representations.

DESCRIPTION OF THE INVENTION

Much of the Internet is based on the client-server model of information exchange. This computer architecture, developed to accommodate the "distributed computing" environment that characterizes the Internet and its component networks, contemplates a server (sometimes called the host) that services the requests of a large number of smaller computers, or clients, which communicate with it. A server is typically a workstation computer or mainframe computer, while clients may be, for example, other workstation computers, mainframe computers, simple personal computers, PDAs, or wireless phones.

Figure 1:
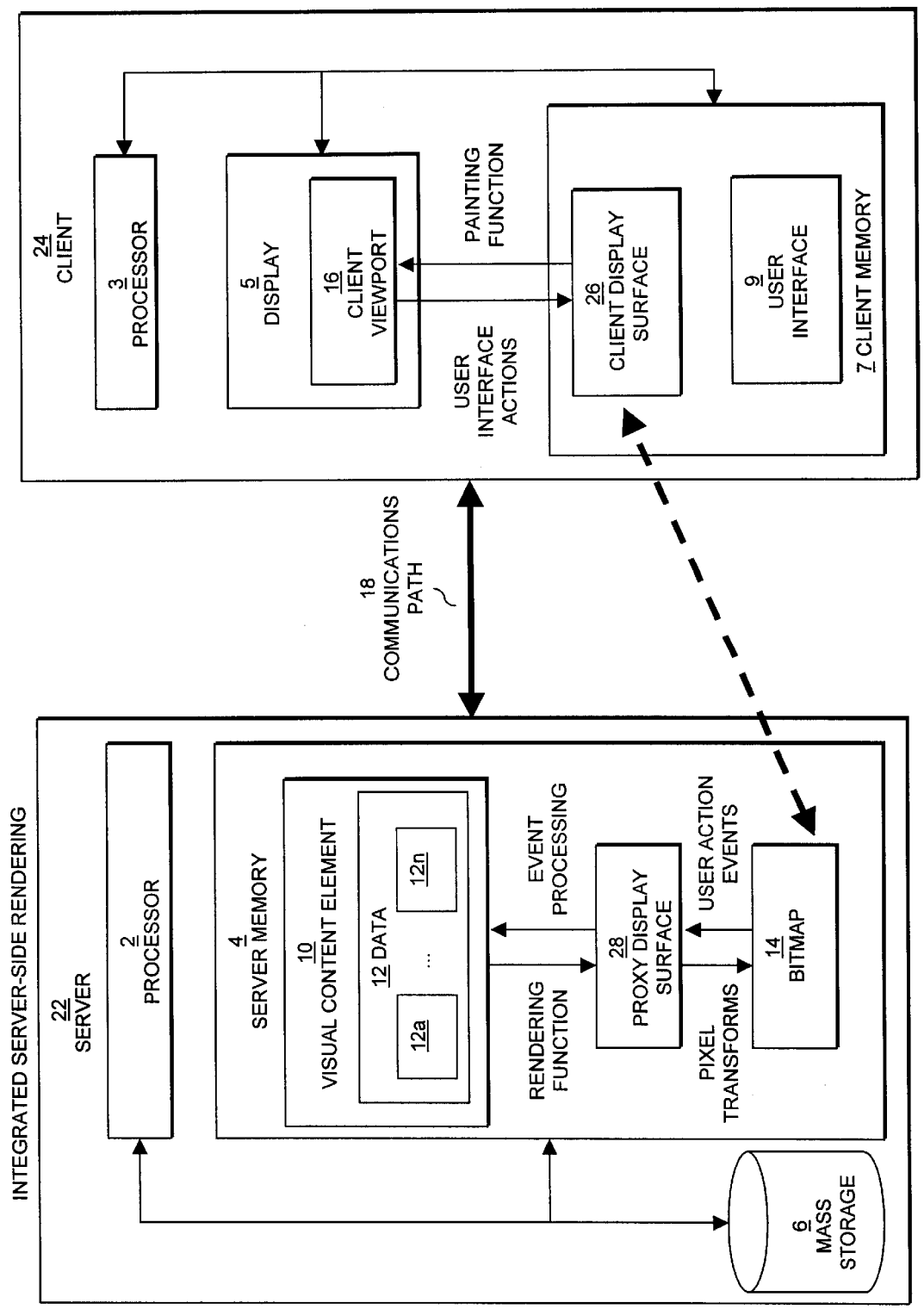
FIG. 1 shows a remote browser system according to an embodiment of the invention.
Figure 2:
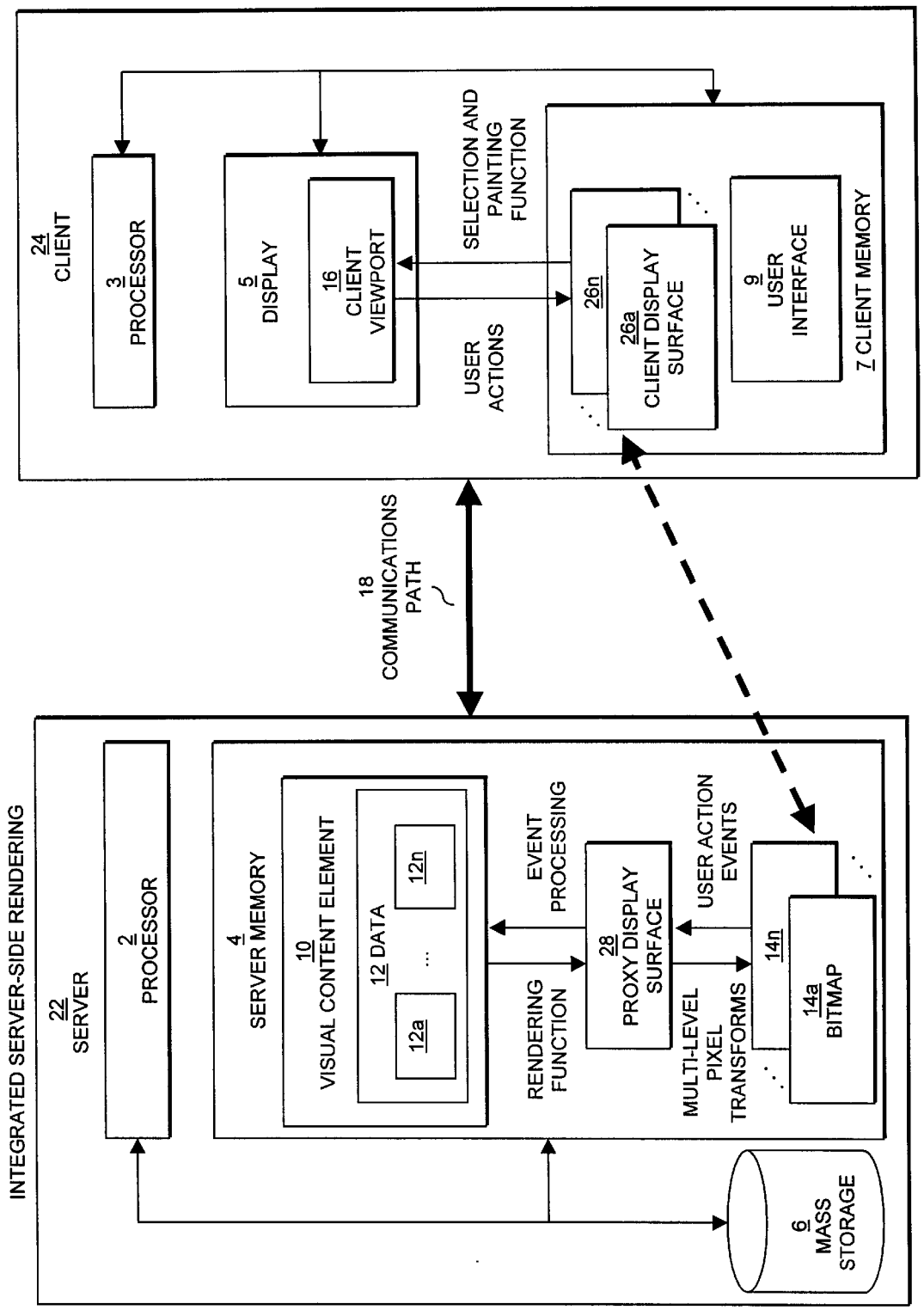
FIG. 2 shows a multi-level remote browser system according to an embodiment of the invention.

Communications supporting the exchange of information over a computer network such as the Internet may be implemented on a client device by means of a browser. A browser is a computer program that provides a navigating capability allowing for the exchange of information, such as Web pages, with local or remote nodes, and a viewing capability allowing for the viewing of information exchanged with the node. With reference to FIG. 1, a computer network supporting the exchange of information includes at least two computers: a server 22 and a client 24.

A server 22 includes a processor 2, a server memory 4, and a mass storage device 6. These components are in communication with each other through a communications bus, such as a Peripheral Component Interconnect (PCI) bus, an Accelerated Graphics Port (AGP) bus, or some other standard or proprietary bus. An input/output (I/O) device, such as a modem, an Ethernet adapter, or a network interface card (NIC), also in communication with the bus, provides for the server's 22 exchange of information with other external devices, such as a client 24.

Processor 2, typically a central processing unit (CPU), controls all other parts of the server 22. Processor 2 can further include a control unit, an arithmetic and logic unit, and memory, where the memory can be registers, cache, random access memory (RAM), and read only memory (ROM). Mass storage device 6, such as a magnetic or optical disk drive, or a magnetic tape drive, stores large amounts of information that can be updated, maintained, and served upon request to other systems, such as a client 24. A server memory 4, which may include volatile and non-volatile elements such as registers, cache, RAM, and ROM, provides a means of storing information required in the short term, or anticipated to be required in the short term, such as an operating system, executable computer program instructions, and data.

With continued reference to FIG. 1, server 22 is in electrical communication with client 24 through a communications path 18. The physical communications path 18 can include wire, such as twisted-pair, or coaxial cable; fiber optic cable; or can be wireless. The communications configuration over the communications path 18 can be a serial or parallel communications protocol, personal area network (PAN), such as a Bluetooth wireless protocol, local area network (LAN), such as an Ethernet, or a wide area network (WAN), such as the public switched telephone network, or the Internet. Servers 22 and clients 24 interface to the communications path through an adapter device, such as a modem, an Ethernet adapter, or a NIC.

The representative client 24, shown in FIG. 1, includes a processor 3, a memory 9, executable instructions defining a user interface 11, and a display 5. The client components are also in communication with one another through a local communications bus, similar in concept to the server communications bus. The client 24 processor 3 and memory 9 are also similar to those on the server 22, and client 24 can optionally include a mass storage device.

A client display 5, such as a cathode ray tube, or a flat-panel display, allows the user to view visual content. Clients 24 such as portable computers, PDAs, and wireless phones, typically provide a flat-panel display 5, such as a liquid crystal display (LCD). When operated, the display 5 defines one or more client viewports 16, representing regions of the display 5 where different visual-information fields can be presented. In addition to an operating system and other programmed instructions, the client memory 7 contains regions dedicated to a user interface 9 and a client display surface 26.

In one embodiment, a client system 24 is implemented as a PDA having a network interface and, running on the system as an active process, a web browser. The network interface connects to a remote system, such as a gateway or other Internet access provider. As a result, the client machine 24 becomes a node on the Internet, capable of exchanging data with other Internet computers. The browser controls the content presented on a client viewport 16 of the display 5. With the client connected as an Internet node, the browser enables specified documents to be located, fetched from a server and displayed.

FIG. 1 illustrates an embodiment of a remote browser system using server-side rendering. The server 22 provides a set of integrated processing functions. The server functions and their integration with the client device functions, in part, distinguish one embodiment of the invention from other methods (including remote frame-buffer systems). One means of integration is achieved by sharing browsing data on the server 22, on the client 24, and between client 24 and server 22.

In accordance with the invention, the server computer system 22 acts as a proxy client. This means that the server 22 performs most of the processing normally done by a client 24 in conventional client-side rendering except for painting the display surface 26 onto the client's bitmap display device. The server 22 allocates its own proxy display surface 28, and accesses and/or generates the constituent components 12a, ..., 12n for the desired visual content element 10.

The server 22 renders the visual content element 10 to the proxy display surface 28, using whatever techniques are needed to rasterize the data of the visual content element 10 and its constituent components 12 into a bitmap 14 suitable for the proxy display surface 28. If the visual content element 10 can be divided into pages or sections, rendering on the proxy display surface 28 can be performed for a single page or section at a time. The proxy display surface 28 can be set to a given size, and those portions of the rendered visual content that fit within the size are rendered at that time. In one embodiment, the preferred size of the proxy display surface 28 is between about 640×400 and about 1280×1024 pixels; typically, proxy display surface 28 is realized as a frame buffer or other RAM partition.

The nature of bitmap 14—that is, the manner in which content elements are rasterized—depends on the known or expected client display attributes. The bitmap 14 is compatible with the expected display attributes 44 if, for example, the bitmap 14 has a tonal range no greater than the expected client tonal range and the bitmap has a pixel format that can be readily interpreted and/or directly used by the client device 24. Conversion to a suitable pixel format may be accomplished, for example, using a color lookup table or similar expedient.

If the client 24 must perform pixel transforms or image transform operations that require operations across multiple input (i.e., server-provided) pixels to generate each client-display pixel, then the pixel format is not considered to be compatible. A bitmap 14 can be compatible even if it has a different pixel resolution or different pixel aspect ratio from the expected client display attributes. Nonetheless, to minimize processing at the client side, the pixel transforms performed at the server 22 can optionally use the expected client display pixel resolution and aspect ratio as input parameters in order to generate display-ready data for the client.

Following rendering, the server 22 transmits the contents of the bitmap to the client 24 through communications path 18. The server 22 can optionally apply one more encoding and/or compression steps to the bitmap 14 before transmission. The client 24 receives the transmission and performs any appropriate decoding and/or decompression.

The client 24 runs an application, such as a web browser, that communicates with the server 22, and which may optionally decode and/or decompress a bitmap 14. The client 24 also provides a display surface painting capability to paint the rendered bitmap 14 onto the client's bitmap display device. Additionally, the client 24 provides a user interface to the remote browsing capability.

The client 24 generates the client display surface 26 from the transmitted bitmap. In general, a memory block is associated directly with the display device and organized as a grid; the contents of each memory location in the grid directly governs the appearance of a corresponding pixel of the display. Viewports 16 may be defined on the display by dedicating the corresponding memory locations to display data associated with these viewports. If the client display surface 26 is a virtual display surface (i.e., not allocated directly within the display memory of the bitmap display device of the client 24), the client 24 paints the client display surface 26 into the client viewport 16. If client display surface 26 shares the same data structures as the client viewport 16, the painting function is implicitly provided during the generation of the client display surface 26.

The client 24 responds to any user interface actions taken by the user related to the rasterized visual content (e.g., selection of a display item using a pointing device), and determines whether to transmit notification of the user's action to the server 22 for further processing. The server 22 interprets such events as user interface actions on its own proxy display surface 28 and responds by generating the appropriate events and/or actions on its display surface 28, which is transmitted to client 24 for display thereon. Consequently, event processing occurs cyclically, with events caused by user actions transmitted to the server, and appropriately updated display information provided to the client.

The server 22 can optionally send to the client 24 additional information, such as content type, related to the visual content element 10 and/or its constituent component 12. When a constituent component 12 is localized to a specific sub-region of the proxy display surface 28, the sub-region coordinates can also be sent. This information is utilized by server 22 to interpret the user's action. The client 24 can optionally customize its caching mechanisms, display methods, and/or user interface based on the content type and constituent component sub-region coordinates. Similarly, the client 24 can provide customized responses to user interface actions based on the content type and/or coordinates of a constituent component 12 on the client display surface 26.

In the specific context of the Web, the viewport may be the display region of the web browser running on the client 24. The server may, however, also perform some of the functions normally handled by the client browser. In general, a set of communications related to remote browsing services can be grouped as a "remote browsing session." Data associated with the remote browsing session provides a context and state for coordinating different functions of the browser. The remote browsing session is established between the server 22 and client 24 and is maintained only for the duration of the session. A "remote browser system" refers to a server and client cooperatively implementing functions normally performed by a local browser.

In one embodiment, a single server 22 provides remote browsing services to multiple clients 24 through one or more communications paths 18. The services to each client 24 can be provided through one or more remote browsing sessions. In this configuration, some portion of the shared remote browsing data on the server 22 is used to provide services to multiple clients 24. In a further embodiment some portion of the shared remote browsing data is transmitted to multiple clients 24. Other portions of the shared server data 56 is reserved for providing services to each individual client 24 (or on a per "remote browsing session" basis). Consequently, privacy and security are supported while serving multiple clients 24 from the same server 22.

In another embodiment, a configuration of multiple servers 22 provides coordinated services to one or more clients 24. In this configuration, each server 22 can communicate with one or more of the other servers 22 to coordinate services to the clients 24. Coordination is achieved by sharing certain portions of the shared remote browsing data.

The remote browser system thus provides several functions normally reserved for the client 24 in conventional client-side rendering systems. The server 22 accesses the visual content elements 10 and their constituent components 12, provides the rendering functions, and transforms the rendered bitmap into a format convenient for the display on the client device 24. Consequently, the client 24 is spared the need to perform these traditionally client-oriented functions. Moreover, hardware and software requirements for the client 24 are reduced and perceived responsiveness to user input can be increased. For certain visual content elements 10 such as Web pages, a significant portion of the time and processing necessary to retrieve, render and display a requested visual content element 10 occurs during access rather than after retrieval. If a visual content element 10 has multiple constituent components 12 that are separately accessed, such as with many Web pages, the time and processing requirements can substantially increase.

Generally, the server 22 has communications capabilities that are better than those of the client 24. As a result, the server 22 can perform access faster, more reliably, more securely and/or less expensively than the client 24 can. In addition, the client 24 need not support rendering software. This includes the software to properly interpret the contents of visual content elements 10 and their constituent components. It also includes the software to generate appropriate rendered bitmaps of this content. In server-side rendering, the software and processing power are centralized on the server 22 and shared by multiple clients 24. This allows the server 22 to be optimized for rendering tasks resulting in potential cost savings and a reduction in the elapsed time for the rendering step, and also facilitates improved client performance through reduction in rendering "overhead." Reduced software requirements result in reduced requirements on the client 24 for processing power, memory and communications capabilities. Consequently, power requirements are reduced providing an important benefit for battery-operated client devices 24.

Server-side rendering also improves the accuracy of the rendered visual content to the intended design and layout of the original visual content 10. The rendering function can be better controlled on a single server 22 than across multiple clients 24 having different software and/or hardware capabilities. The client 24 need not provide software for any intermediate image or pixel transformations other than functions to paint the client display surface 26 into the client viewport 16.

The client 24 is also freed from providing, or gaining access to, the data resources, files and/or databases to support the rendering function. For example, font libraries are used to properly render characters into the appropriate bitmap elements. If a font library is not available, then the visual content element 10 will not be accurately generated according to the original content design. Font libraries can require significant memory and, therefore, are often expensive to download and maintain on each client 24. Moreover, font libraries often require updates. In server-side rendering configuration, font libraries and similar data resources, files and/or databases are maintained centrally on the server 22. Centralized font support on the server 22 also has important advantages for the internationalization of visual content. In a server-side rendering configuration, visual content having an internationalized font can be viewed on any client device 24 if the server 22 has the proper font libraries.

In server-side rendering, pixel transforms can reduce the tonal range and/or pixel value range of the proxy display surface in order to accommodate the display capabilities of the client. Many client devices 24 have limited tonal ranges (e.g., grayscale range or bi-tonal range). Client devices 24 with a color tonal range may nonetheless support only a limited color palette. If the server 22 performs the pixel transformations to these more limited tonal ranges and/or pixel values, it can use a more compact pixel format. For example, an 8-bit or 24-bit color pixel format can be mapped into a 2-bit or 4-bit grayscale pixel format, resulting in significant reduction in the quantity of data transmitted to the client 24 and subsequent data processing by the client. Further reductions in transmitted data can be realized if optional encoding and/or compression are used before data transmission. The potential for significant data reduction using pixel transformations is a major advantage of server-side rendering. If the transforms are made to take full advantage of the client's display attributes, there is no impact on the user's viewing experience. The client 24 can also provide the user with the option to further limit the tonal range and/or pixel value range prior to transmission to obtain further data reduction.

The advantages over traditional client-side rendering are not necessarily clear at first consideration. Rasterizing pixels can seem to be a less efficient means of transporting visual content to a client device 24. However, client-side rasterization makes the client 24 responsible for accessing and transfering each of the constituent components 12 of the visual content element 10. Furthermore, each constituent component 10 is typically in a generalized form not optimized for display on the client device 24.

For typical Web pages that have visual content elements 10 with multiple constituent components 12, client-side rendering often requires more data to be transmitted than server-side rendering. In addition, client-side rendering can require multiple client transmissions of "acknowledge" messages for each constituent component, thereby consuming additional power. Server-side rendering, however, allows a more streamlined protocol to transmit and acknowledge a single set of rasterized, transformed, and encoded pixel values.

As the number and type of client devices 24 grow, individual users are increasingly likely to use multiple client devices 24. For example, a single user might have multiple office client devices 24, home client devices 24, and portable client devices 24. Consequently, the consistency of the user's interactions between client devices 24 will become more important. The remote browser system provides a significant advantage by allowing the users experience to be generally independent of the type of client device 24.

Visual consistency is based on the centralization of rasterizing functions on the server 22 and maintaining the painting functions on the different client devices 24. The user need not be aware of the type of content for display when switching between client devices 24. Moreover, the content provider is assured of a more consistent experience by users interacting with the content.

User profile consistency results from directing visual content requests through a single server 22 or a set of connected servers 22. Consequently, user-level preferences are maintained centrally. Usage patterns are also maintained centrally so that the user has access to its usage history from the current client device 24. Thus the user can easily return to a visual content element 10 and/or constituent component previously viewed by the user on a different client device 24. For example, the user can maintain a central set of "bookmarks" which refer to specific visual content elements 10 and/or constituent components. The bookmarks can be created on any client device 24 and accessed from another client device 24.

Consistent user preferences and usage patterns can be made available to content servers 22 with appropriate access permissions. User preference and usage pattern consistency across client devices 24 benefits the content provider and the user by using the information to provide personalized content.

Advantages of Shared Remote Browsing Data

Shared remote browsing data is important for coordinating remote browser server functions such as rendering, pixel transforms and server communications functions. It also allows coordinating these server functions with the operations of a remote browser client. On the server 22, the rendering and pixel transform functions can be applied to data sent by the remote browser client. This data can be made available by the server communications function as shared server data. Similarly, the rendering function and/or pixel transform function can send data to the remote browser client 24 for use as shared client data.

A number of features and optional extensions to the remote browser system are made possible by the shared remote browsing data. For example, the pixel transform function can optimize the transformed pixels for the client viewport 16 based on data sent from the remote browser client. In another example, the rendering function changes how the remote client browser reacts to user interface actions based on the rasterized visual content. This includes client-side awareness of visual content type, which is made possible by the server rasterizing function providing this information to the client 24 through shared remote browsing data.

Through access to shared remote browsing data, certain coordinated caching strategies are enabled. For example, the rasterizing and pixel transform functions can maintain relationships between caches of visual content elements 10, constituent components, rendered proxy display surfaces, and transformed pixel representations of the rendered display surfaces. This can include coordinated cache validation strategies, coordinated cache aging strategies, and coordinated cache retrieval strategies across the different representations of the same visual content.

Shared remote-browsing data also enables optional extensions such as pipelined operation of the remote browser server 22. Pipelining reduces the latency for displaying updated rasterized visual content to the user, thereby improving perceived system responsiveness. In a non-pipelined configuration, the rasterizing function fully rasterizes the visual content element 10 into a proxy display surface 28 prior to performing the pixel transform function. Similarly, the server communications function does not begin to transmit the transformed bitmap representative of the visual content element 10 until the associated pixel transform function is completed. In a pipelined configuration, however, intermediate stage results of the rasterized output are provided to the pixel transform function and/or intermediate stage results of the pixel transform function are provided to the server communications function. Pipelining requires careful communication between functions, which is enabled by the shared server data.

Similarly, shared client data 60 allows client pipelining to be performed. Results of the client communications function can be pipelined for display surface generation, and results of the surface generation can be pipelined to the painting function. Client-side pipelining is a separate process managed entirely by the client 24 or coordinated with server pipelining through shared data between server 22 and client.

Advantages of shared remote browsing data are also realized in a multi-client remote browser configuration. The ability to selectively share server data to service multiple clients 24 is more efficient because a separate server function for each client 24 is not necessary. The ability to partition portions of shared server data 56 on a per client 24 basis allows the server 22 to service multiple clients 24 while providing a level of privacy and/or security to each individual client.

Shared remote browsing data also makes it possible to support coordinated multi-server 22 configurations, where at least two servers 22 are providing coordinated remote browsing services to one or more clients. The ability to share remote browsing data between multiple servers 22 enables the servers 22 to partition their processing for increased efficiency through techniques such as load-balancing and improve security by allowing selected servers 22 to have access to certain data while providing the related services to the client.

Rasterizing as a Visual Content Representation Format

A rasterized representation of a visual content element 10 is separate from, but related to, the source representation of the same visual content element 10. The unique properties of a rasterized representation can be used while preserving the relationship(s) with the source representation. This is the basis for many of the features and advantages of the present invention, such as server-side rendering, multi-level browsing, and caching methods based on rasterized representations.

With the widespread adoption of the World Wide Web, a considerable body of knowledge and techniques has been developed around network access to source representations such as HTML. Rasterized representations represent a higher level representation of the same visual content elements. In accordance with the present invention, rasterized representations can be used instead of, or in addition to, the associated source representations.

New network protocols and/or network services can be developed for delivering and/or caching rasterized representations. For example, a network protocol or network service can maintain a mapping between the network location of a rasterized representation and the network location of an associated source representation. If the rasterized version can be supplied more efficiently, and the requesting system can accept a rasterized representation, this network protocol or service can substitute the rasterized representation for the initially requested source representation. This can provide additional levels of value and efficiency above currently available caching systems for Web content.

Selected and Composite Rasterized Visual Content

A selected pixel region 124 (see FIG. 16) can be used as a visual content element 10 or as a constituent component 12 of a visual content element 10. A selected pixel region 124 can be defined. An equivalent source representation of the selected region, however, can be difficult or even impossible to construct.

In one example, a Web page can have one constituent component 12 in a text form, another in an image, and yet another as a table. If these separate components are rendered as adjacent pixel regions 124, a selected pixel region 124 can be readily defined that includes only selected sub-regions of each of these rendered constituent components. In this example, the selected pixel region 124 can contain a "headline" from a text story, part of a related picture, and part of a related table of statistics. This combination can be meaningful to the viewer, easily defined on the rasterized representation, but have no corresponding representation within the structural hierarchy of the source representation.

Multiple rasterized representations of different visual content elements, or their constituent components, can be combined into a composite visual content element 10. Each rasterized representation is treated as a constituent component 12 of the composite. Selected pixel regions 124 can be defined for any or all of these rasterized representations. A composite can include rasterized representations of any type of visual content, including another composite.

Multi-level Remote Browsing

Figure 10:
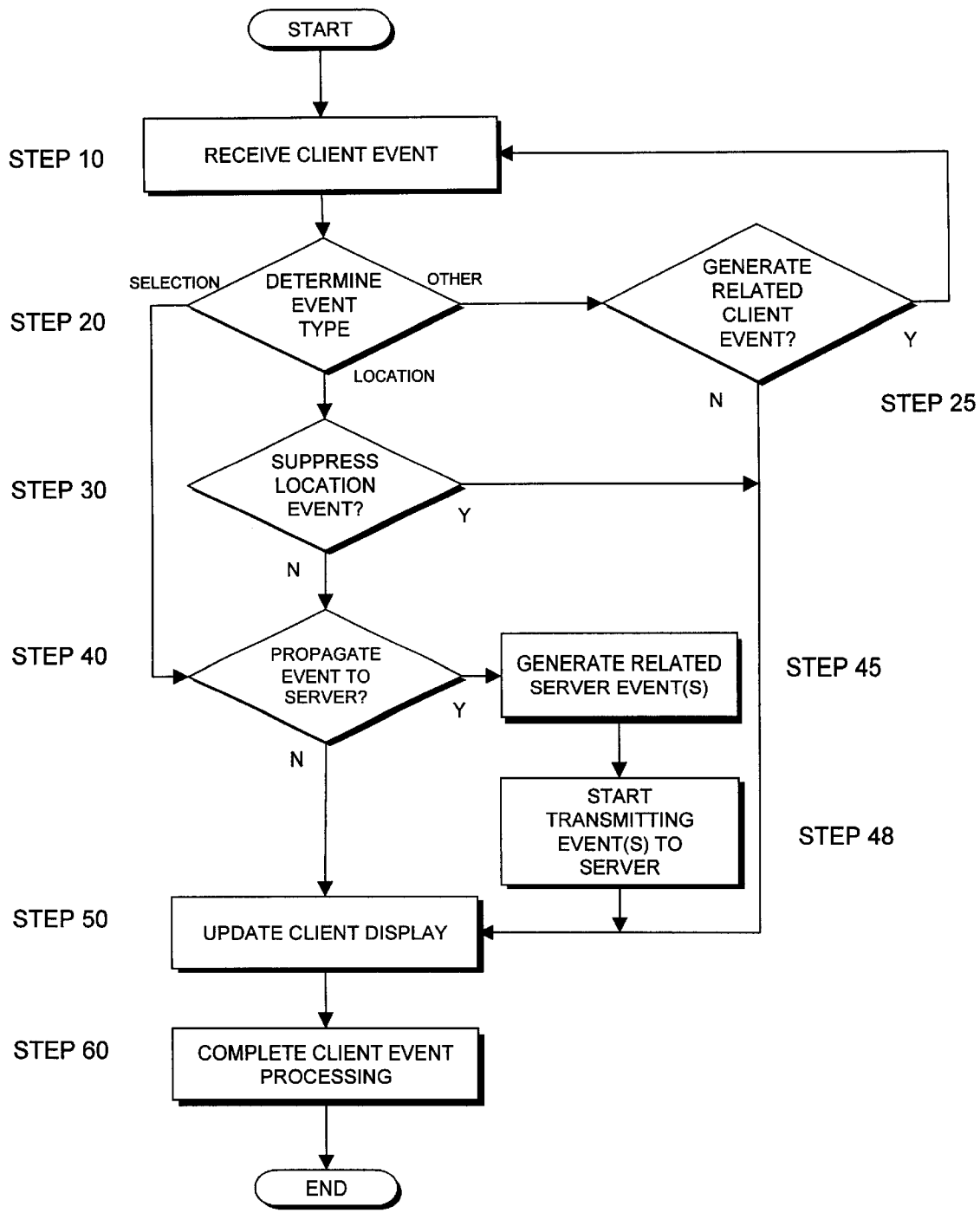
FIG. 10 is a flowchart representation indicating the processing of events on a client device according to an embodiment of the invention.

With reference to FIG. 10, a remote browser system in accordance with an illustrative embodiment of the invention includes a server 22 providing a multi-level remote browsing function. By this is meant that the same visual content is transformed into more than one rasterized representations. In accordance with this approach, the rendering function generates a rendered proxy display surface 28 for a visual content element. The server 22 transforms the proxy display surface 28 to a multi-level set of bitmaps 14a to 14n, each corresponding to, for example, a different portion of the content element, or to the entire element rendered at a different resolution, or different versions of the element (e.g., a game at different states of play or a transaction at different stages of processing). The multi-level set of bitmaps 14 is transmitted through the communications path 18 from the server 22 to the client 24.

The client 24 generates a multi-level set of client display surfaces 26a to 26n that corresponds to the multi-level set of bitmaps 14 sent by the server 22. The client 24 uses a selection and painting function to select which of the multi-level set of display surfaces 26 to paint into the client viewport 16. In one embodiment, a single one of the multi-level set of bitmaps 14 is painted into the client viewport 16. Optionally, additional client viewports 16 (not shown) can be used to display additional display levels (i.e., additional bitmaps 14). In other embodiments, the selection and painting function manage a single client viewport 16 such that multiple levels of bitmaps 14 share the same viewport.

The client 24 may process user interface actions associated with its viewport 16 and determine (or change) the particular client display surface 26 that will be displayed. If the client 24 transmits one or more related user interface events to the server 22 through the communications path 18, information identifying the level or levels associated with the event is also transmitted to the server 22. Based on the mapping between the associated levels and the proxy display surface 28, the server 22 generates one or more related user action events on the proxy display surface 28, resulting in event processing functions. Event processing typically results in changes to the proxy display surface 28 or the generation of a new proxy display surface 28.

As noted above, the server 22 transforms the bitmap 14 of its proxy display surface 28 into a multi-level set of derived bitmaps 14. In one embodiment, there are at least two levels of derived bitmaps 14. Each derived bitmap 14 provides a scaled view of a common selected pixel region of the proxy display surface 28 and each view is transformed to a tonal range and pixel format compatible with the expected display attributes 44 of the client display surface 26. The common selected region can be the entire proxy display surface 28 or at least one pixel sub-region of the proxy display surface 28. Each representation optionally can include an associated selection of additional pixel sub-regions of the proxy display surface 28 beyond the common selected region.

The derived bitmaps 14 can, for example, include an overview bitmap having a reduced-scale view of the common selected region at a pixel resolution that provides at least an iconic view (i.e., at least 10×10 pixels) of the common selected region, but at no more than one-half the pixel resolution of the common selected region in at least one dimension. In an optional intermediate bitmap, the bitmap 14 includes a scaled view of the common selected region at a pixel resolution suitable for viewing and/or navigating the major viewable elements of the common selected region. The intermediate bitmap has a higher pixel resolution in at least one dimension from the view of the common selected region in the overview bitmap 14. In an optional production bitmap, the bitmap includes a scaled view of the common selected region at a pixel resolution that presents most of the viewable features and elements of the common selected region. The production bitmap has a higher resolution in at least one dimension from the overview representation and (if an intermediate bitmap is present) a higher resolution in at least one dimension from the view of the common selected region in the intermediate representation (e.g., between about 640×480 and about 1024×768 pixels in an illustrative embodiment).

If desired, multiple levels of intermediate bitmaps may be included. Each of these optional levels presents a scaled view of the common selected region at a pixel resolution that is higher in at least one dimension from the preceding intermediate bitmap. If there are multiple intermediate bitmaps, the lowest level intermediate bitmap has a view of the common selected region at a higher pixel resolution in at least one dimension than the view of the common selected region in the overview bitmap. In addition, the highest level intermediate bitmap has a view of the common selected region at a lower pixel resolution in at least one dimension than the view of the common selected region in the production bitmap.

A derived bitmap can be based on a clipped version of the proxy display surface. As shown in FIG. 10, clipping 82 can be used, for example, to remove unwanted regions of the proxy display surface 28 such as "white space," unwanted advertising banners, and/or regions that are considered less important to the user (e.g., the lower right corner of a typical Web page).

Different levels of the derived bitmaps can apply different clipping algorithms provided that a common selected region is included in all levels of bitmaps. In an illustrative embodiment, a clipped region used for the overview bitmap is the same as, or a subset of, the corresponding region used for the production bitmap. Clipped regions can be similarly defined between the overview bitmap and any optional intermediate bitmaps, and between any optional intermediate bitmaps and the production bitmap.

The derived bitmaps can differ in their pixel aspect ratios, tonal ranges, and/or pixel formats. If the server 22 has information about the expected attributes 44 of the client viewport 16, this information can be factored into the transformations for one or more of the derived bitmaps 14. For example, the overview bitmap can have a pixel aspect ratio matched to the client viewport 16 and the production bitmap can have a pixel aspect ratio more closely matched to that of the original proxy display surface 28. In one embodiment pixel scaling operations applied at any given level use the same scaling factor.

If a bitmap 14 does not fit within the client viewport 16 of the client display, the client 24 paints a sub-region of the associated client display surface 26 (see FIG. 3) using a clipping operation. The clipping operation treats the client display surface 26 as a set of tiled images. Each tiled image is constructed so that it fits, individually, into the client viewport 16. The client device 24 switches between tiled images or else scrolls across adjacent tiled images based on user actions. In one embodiment, to aid the user in navigating among bitmaps, the overview bitmap is displayable in its entirety within the allocated client viewport 16 and thus is a single tiled image. The user may select one of the bitmaps for display by pointing to a location on the overview bitmap. The client 24 responds by identifying the higher-resolution bitmap associated with the selected location and painting this into the viewport (i.e., overwriting the overview bitmap). User interface 9 may also be configured to allow the user to specify not only a location on the overview bitmap, but also a desired resolution (e.g., an intermediate bitmap or a production bitmap).

Data Representation in a Remote Browsing System

The outputs of the server-side rendering process that are communicated to the client device may be packaged into a "container" format that defines different parts of the rendered representation. A flexible content representation format, such as the Extensible Markup Language (XML), can be used as a container format. Using XML, a dictionary of the different parts can be supplied as an XML Document Type Definition (DTD). Each part can be assigned its own XML data type and given a unique XML tag.

In multi-level browsing, the different representation levels can be defined in terms of XML data types and assigned different XML tags. The XML container can also include data elements 12 that describe pixel locations or pixel regions 124 within a rasterized representation of the visual content element 10.

In one embodiment of a remote browsing system that uses a combination of rendering techniques, different types of representations are communicated from the server 22 to the client. For example, some representations can be in raster form, others in source, or transcoded source form. The different types of representations can be represented as different types of data elements 12 within a common container format, such as one based on XML.

In embodiments performing functions that require client/server communications, such as requests for rendered visual content, bookmark refreshes, or dynamic selections, the client/server communications can be modeled as requests/responses referencing an XML representation of the visual content element 10. In these embodiments, the client 24 and server 22 share portions of a common data representation model for the referenced visual content element 10. The server 22 provides updates, such as providing a selected region of a detail representation or providing a text-related transcoding for a selected region, and the client processes the updates as changes to its XML model of the referenced visual content element 10.

The client 24 will typically have access to a subset of the total data model created by the server 22. For example, the server 22 can maintain a source representation and multiple rasterized representations of the visual content element, but may only share one rasterized representation, or a selected region of this representation, with the client. The client 24 can also maintain, in its version of the data model, data that is not available to the server 22. The data elements 12 that are shared can be synchronized through a client/server protocol that references the data model.

Requests and responses between client 24 and server 22 may use a protocol such as the Simple Object Access Protocol (SOAP) which employs XML as its representation format. The use of such a protocol allows the server 22 to provide rendering services to any client 24 that supports the protocol. The client 24 can then interpret the XML-encoded contents provided by the server 22. The client 24 can display the contents to the user or use the contents to provide additional services to its clients.

Transactions on rendered content, such as those specified by a transaction bookmark, can also be treated as request/responses referencing data elements 12 within a container format for the rendered content. The Document Object Model (DOM) for a Web page is one example of such a structured container representation. As the visual content element 10 is rendered, input fields and trigger locations can be assigned unique names and data types by the rendering function. Instead of referencing the pixel locations of rendered visual controls, the transaction specification can reference data elements 12 within the container representation.

The server 22 can maintain a mapping between the rendered representations of the input fields and/or triggers and the corresponding visual controls within the source representation of the visual content element 10. These visual controls can themselves be mapped to software services that can be requested by the server 22. Through such mappings, the transactions in a remote browsing system can be represented and processed through more flexible and robust mechanisms such as SOAP or other XML-based request/response protocols.

Advantages of Multi-level Remote Browsing

Multi-level remote browsing systems have several important advantages. First, the overview bitmap is small enough for rapid transmission and display on the client device 24, thereby increasing the perceived system responsiveness. If the user determines that intermediate and/or detail representations are not needed, some or all of the transmission time required to send these additional bitmaps is saved. This further increases the perceived system responsiveness, and reduces processing and power requirements for both the client 24 and the server 22. Moreover, the overview bitmap is typically small enough to fit entirely within the allocated client viewport 16 on most client devices 24. In an illustrative embodiment, the server 22 obtains information specifying the dimensions and display characteristics of the client viewport, and explicitly represents the client viewport 16 in order to determine the pixel resolution when generating the overview bitmap. This provides the user with a single view of the overall layout of the visual content element 10. Even if the overview bitmap does not fit entirely into the client viewport 16, it is small enough so that the user can rapidly perceive the overall layout by scrolling, panning and/or tiling through the overview bitmap. The overview bitmap provides a convenient means of navigating through the rasterized visual content. Consequently, the user saves considerable time compared to panning, scrolling and/or tiling through a single rasterized bitmap which is typically at the resolution of the proxy display surface 28.

Other advantages include the option to select or perform other user actions directly on the overview bitmap, providing an additional convenience for the user, particularly on client devices 24 having a relatively low-resolution bitmap display (e.g., a PDA device or wireless telephone having a bitmap display). If the intermediate and/or production bitmaps have not been fully transmitted, the perceived system responsiveness is improved by allowing user actions on the overview bitmap while receiving the other bitmaps.

The optional intermediate bitmaps provide many of the advantages of the overview bitmap while providing increased levels of detail. Ordinarily, the production bitmap provides sufficient detail to view and use most or all aspects of the rasterized visual content. In one embodiment, the system lets the user easily switch between the multi-level bitmaps thereby allowing the user the advantage of working at all available levels. Consequently, the user is not constrained to work at a single level of detail, but can move relatively seamlessly across different levels while the system maintains the coherency of visual representation and user actions at the different levels.

Figure 3:
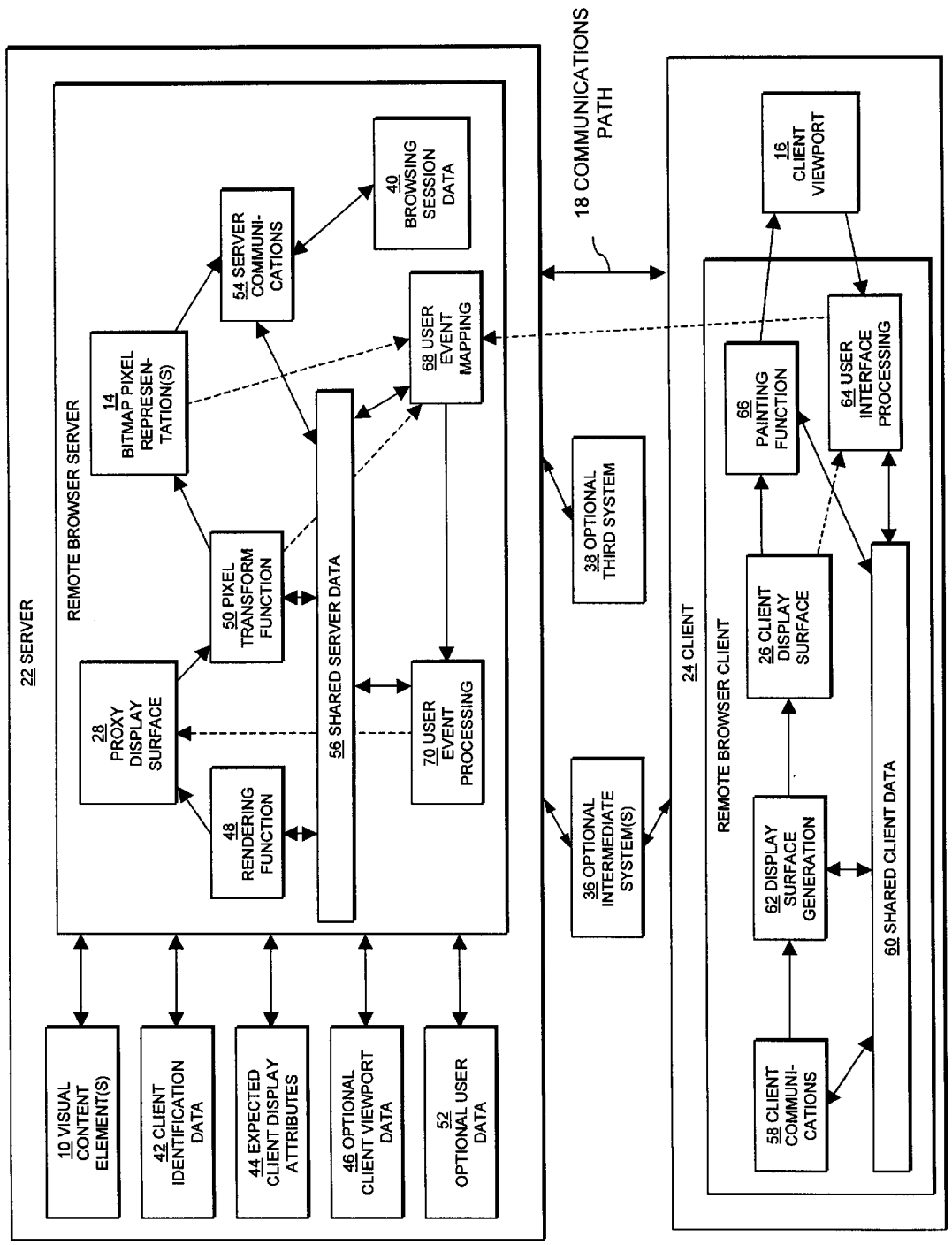
FIG. 3 depicts the architecture of a remote browser system according to an embodiment of the invention.

The architecture and data flow of a remote browser system, in accordance with an illustrative embodiment of the invention, is presented in FIG. 3. The solid arrows represent data transfer or communications paths 18, and the dotted arrows represent conceptual flows implemented by the data and/or communications paths 18.

The communications path 18 is established between a server system 22 and client device 24 through one or more data communications channels, data networks and/or internetworks (e.g., the Internet). The client device 24 can be a personal computer, hand-held device such as a PALMPILOT or other PDA, a wireless telephone with a bitmap display, or any other device or system with a processor, memory and bitmap display that is capable of communicating with a server computer system 22. A remote browser server function is performed on the server system 22, and a remote browser client function is performed on the client device 24. The communications path 18 can provide direct communications between the client 24 and the server 22, or there can be at least one optional intermediate system 36 in the communications path 18.

The client 24, server 22, or an optional third computer system 38 initiates the establishment of the communications path 18. If present, the optional third computer system 38 can communicate with the server system 22 through either the communications path 18 or through a separate communications path (not shown). Using the communications path 18, a remote browsing session is established between the client 24 and the server 22. The remote browsing session includes a sequence of data communications between the remote browser server 22 and the remote browser client 24. During a remote browsing session, the remote browser server 22 provides remote browsing services to the remote browser client 24 The services are similar to those offered by conventional client-side browsers, such as server access, e-mail, Web access, and storage services. Each remote browsing session has associated browsing session data 40 that maintains the context and state of the remote browsing session.

The server 22 first determines the identity of the client device 24. The identity may be a specific device identity, or the type or class of client device 24. The client identification 42 can be generated by the server 22 if the server 22 initially establishes the communications path 18, or may be received by the server 22 from the client 24 or the third computer system 38. For example, the client may transmit a code specifying display characteristics when a content item is requested, or when a remote browser session is initiated. The exchange of information may be explicit, but more desirably occurs invisibly, without participation or even detection by the client user. The display information may, for example, be transmitted as part of the initial frame containing the content request; the browser, when installed on client 24, detects the client display type, stores it, and appends an identifier corresponding to the display type either at the start of the browsing session or with every content request. Indeed, transmission of this identifier can be implemented at an even lower level-i.e., as part of the protocol for transmitting requests. In this case, the browser client or other requesting client application automatically inserts the identifier into the request itself. The server interprets the identifier (e.g., by means of database lookup) and tailors rasterization accordingly.

Alternatively, server 22 may also be configured to detect a display type. In response to a session initiation or a content request, for example, server 22 may transmit a query message to the requesting client requesting transmission by the client of display characteristics; in this approach, the interaction between client and server resembles the handshaking protocol associated with facsimile transmissions.

In any case, this client identification data 42 may enable the server 22 to determine the expected client display attributes 44 of the client display surface 26 allocated by the client 24 to display the rasterized visual content. Expected client display attributes 44 may include, for example, pixel resolution, pixel aspect ratio and tonal range. The expected client display attributes 44 can be maintained at the server 22, and determined based on the client identification information. Alternatively, the expected client display attributes 44 can be transmitted by the client 24, saved at the server 22 or mass storage device 6 (see FIG. 1) in association with the client identification information 42, thereby facilitating future lookup based on the identification information 42. In other alternative embodiments, the expected client display attributes 44 are transmitted to the server 22 each time the client 24 establishes a communications session with the server 22 or updated by the client 24 when attributes of the allocated client display surface 26 change.

The client 24 may also send to the server 22 client viewport data 46. (As explained above, the client viewport 16 is a pixel region within the display memory of the client's bitmap display device allocated for painting the client display surface 26.) In this embodiment, the client viewport data 46 includes information about the pixel attributes of the client viewport 16. The server 22 can thus optimize its rasterization function 48 and/or pixel transform functions 50 to fit content within the client viewport 16. In one embodiment, the client 24 updates the server 22 when the client viewport 16 changes.

Optional user data 52 identifies the user accessing remote browsing services through the remote browser server 22 and maintains (e.g., in mass storage device 6) data associated with that user. This user data can be independent of the client identification, since a user can access the remote browser system from different client devices 24 (or different users can access the remote browser system from the same client device 24). The server 22, client and/or optional third system 38 can supply optional user data, including, for example, display preference data.

In an illustrative embodiment, the optional user data 52 is associated with a remote browsing session. This allows the optional user data 52 to be accessed and updated as part of the remote browsing session. For example, optional user data 52 can be used for security, authentication and personalization services. These services can be associated with the remote browsing session as a whole, or associated with access to and generation of specific visual content elements 10 or their constituent component 12. For example, optional user data 52 can be used to support Web browsing "cookies."

As an additional extension to the illustrative embodiment, selected portions of user data 52 can be selectively changed or made unavailable during the remote browsing session. This allows the user to temporarily change its identity and to selectively make certain user data 52 available when accessing or updating selected visual content elements 10 and their constituent components 12.

The server system 22 can directly generate or retrieve visual content elements 10 and their constituent components 12. Alternatively, the system can access the visual content elements 10 and constituent components 12 from the client device 24, the optional third system 38 or some other computer system or file system in communication with the server 22. Retrieval or generation of the visual content elements 10 and their constituent components can be initiated, for example, by actions initiated by the server 22, requests from the client 24 and/or requests from other computer systems.

Referring again to FIG. 3, a module 54 implementing server communications can provide various types of client/server communication capabilities, including request/response protocols, streaming protocols and/or "push" protocols (in which the server 22 "pushes" data to the client 24 based on a profile maintained on the server 22). The server communications module 54 can include executable instructions implementing any optional encoding and/or compression performed before data transmission.

Browsing session data 40 can be directly accessed and updated by the server communications module 54. This allows the module 54 to participate in establishing, maintaining and eventually closing a remote browsing session. Certain portions of the browsing session data 40 may be shared across remote browser system functions; such data is referred to as "shared server data" 56, and enables system functions to cooperate within one or more remote browsing sessions.

More specifically, shared data 56 allows each of the browser server functions 48, 50, 54 to modify its operation based on data supplied by any of the other functions 48, 50, 54. Shared server data 56 can include portions of data available to or created by the remote browser server 22. Shared server data 56 can also include pointers and references to any portion of data available to or created by the remote browser server 22. Using the shared data 56, the remote browser server functions 48, 50, 54 dynamically share information to coordinate their operations.

The shared server data 56 may also be valuable in coordinating the server 22 and the client 24. For example, a subset of the shared server data 56 can be transmitted by the server communications function 54 to the client communications function 58. The client communications function 58 makes some or all of the shared server data 56 available as part of a similar store of data referred to as "shared client data" 60.

The client 24 provides a client communications function 58 that communicates with the server communications function 54 through the communications path 18. The client communications function 58 can, for example, include optional decoding and/or decompression of data sent by the server 22. The client communications function can place some portion of the data received into the shared client data 60 and can send data directly to the display surface generation function 62.

A display surface generation module 62 generates a client display surface 26 from the bitmap provided by the server 22 generally by implementing a mapping and/or data transfer function. The client display surface 26, or a pointer or reference to the client display surface, can be shared between client functions 58, 62, 66 as a portion of the shared client data 60.

The client display surface 26 can be a separate data structure within the main memory of the client 24 or it can instead exist within the bitmap display memory of the client 24. In the former case, the client 24 paints the client display surface 26 into the client viewport 16; otherwise the paint function 66 is implicitly performed during display surface generation 62. The client 24 can optionally allocate additional client viewports 16, each displaying a view of the client display surface 26. Optionally, display surface generation 62 includes clipping the bitmap 14 to a fixed size if the client display surface 26 is of limited size. Alternatively, display surface generation 62 includes generating multiple client display surfaces (stored in main memory and/or in mass storage) that collectively represent the single virtual client display surface 26, and providing information to map the multiple display surfaces into the single virtual client display surface 26.

In one embodiment, the client 24 responds to user interface actions associated with the client display surface 26 through its user interface processing 64 function. This user interface processing 64 function determines immediate client reactions and/or responses to user interface actions and also determines what, if any, corresponding user interface events should be transmitted to the server 22 for further processing.

When the server 22 receives a user interface event from the client, an event-mapping function 68 maps this event from the appropriate bitmap to the proxy display surface 28 (see FIG. 1). Based on this mapping, described in greater detail below, the server 22 implements a user event processing function 70, which generates one or more appropriate user interface events as if they occurred on the proxy display surface 28. Alternatively the client-generated event can reference a structural component of the visual content element 10 corresponding to the pixel location, based on mapping data previously supplied by the server 22. The server 22 then processes the event(s), typically resulting in changes to the rendered proxy surface or generation of an entirely new proxy display surface 28. An updated (or new) proxy display surface 28 can be rendered and processed by the server 22, and transmitted back to the client as discussed previously.

Multi-client Remote Browser Systems

Figure 4:
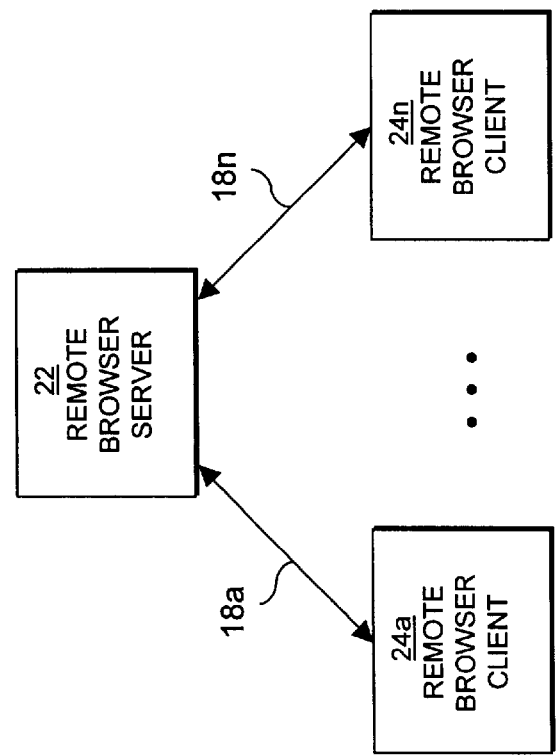
FIG. 4 is a block diagram depicting a multi-client remote browser system.

FIG. 4 illustrates one embodiment of a remote browser system realized as a multi-client system in which a single remote browser server 22 is in communication with multiple remote browser clients 24a to 24n and provides remote browsing services to the clients 24, through one or more communications paths 18. In some embodiments, a portion of the shared server data 56 is shared with multiple clients 24, while other portions of the shared server data 56 are maintained on a per-client basis.

Figure 7:
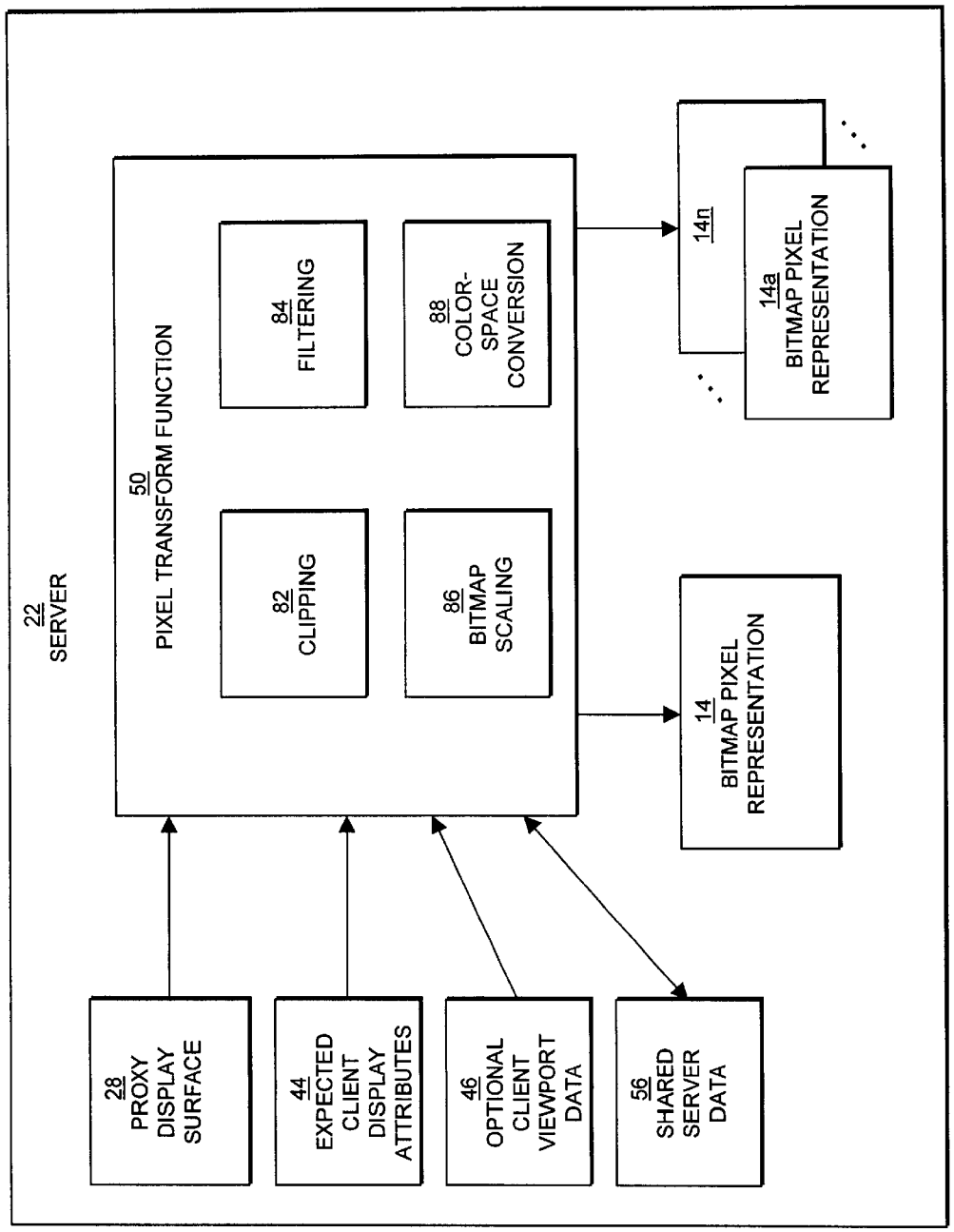
FIG. 7 is a block diagram illustrating the components of a pixel transform function according to an embodiment of the invention.

A remote browsing session is a context for providing a set of remote browsing services. In some embodiments, each client 24 is associated with one or more remote browsing session(s). In the embodiment referred to in FIG. 7, a single remote browser session can not be shared among multiple clients 24; on the other hand, a single client 24 can participate in multiple browsing sessions. In embodiments where a single client 24 participates in multiple browsing sessions, the single client 24 has optional user data 52 for one or more users each associated with one or more sessions.

Multi-server Remote Browser Systems

Figure 5:
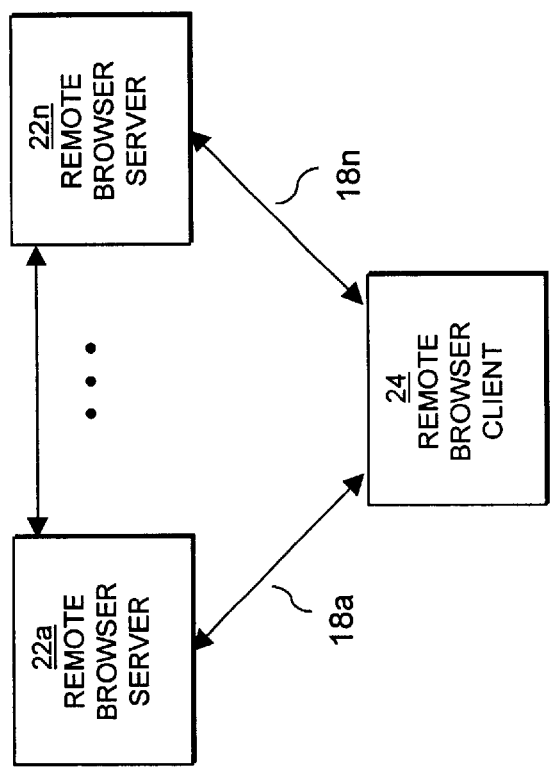
FIG. 5 is a block diagram depicting a multi-server remote browser system.

FIG. 5 illustrates an embodiment of a remote browser system realized as a multi-server system in which multiple remote browser servers 22a through 22n are in communication with a single remote browser client 24 and provide coordinated remote browsing services through one or more communications paths 18. In some embodiments, a portion of the shared server data 56 (see FIG. 3) is shared between multiple servers 22 to coordinate remote browsing services to one or more client devices 24. In other embodiments, multiple servers 22 provide a single coordinated remote browsing session by sharing selected portions of browsing session data 40. Still other embodiments comprise both multi-client and multi-server configurations where multiple servers 22 provide coordinated remote browsing services to multiple clients 24.

Server-side Rendering

Figure 6:
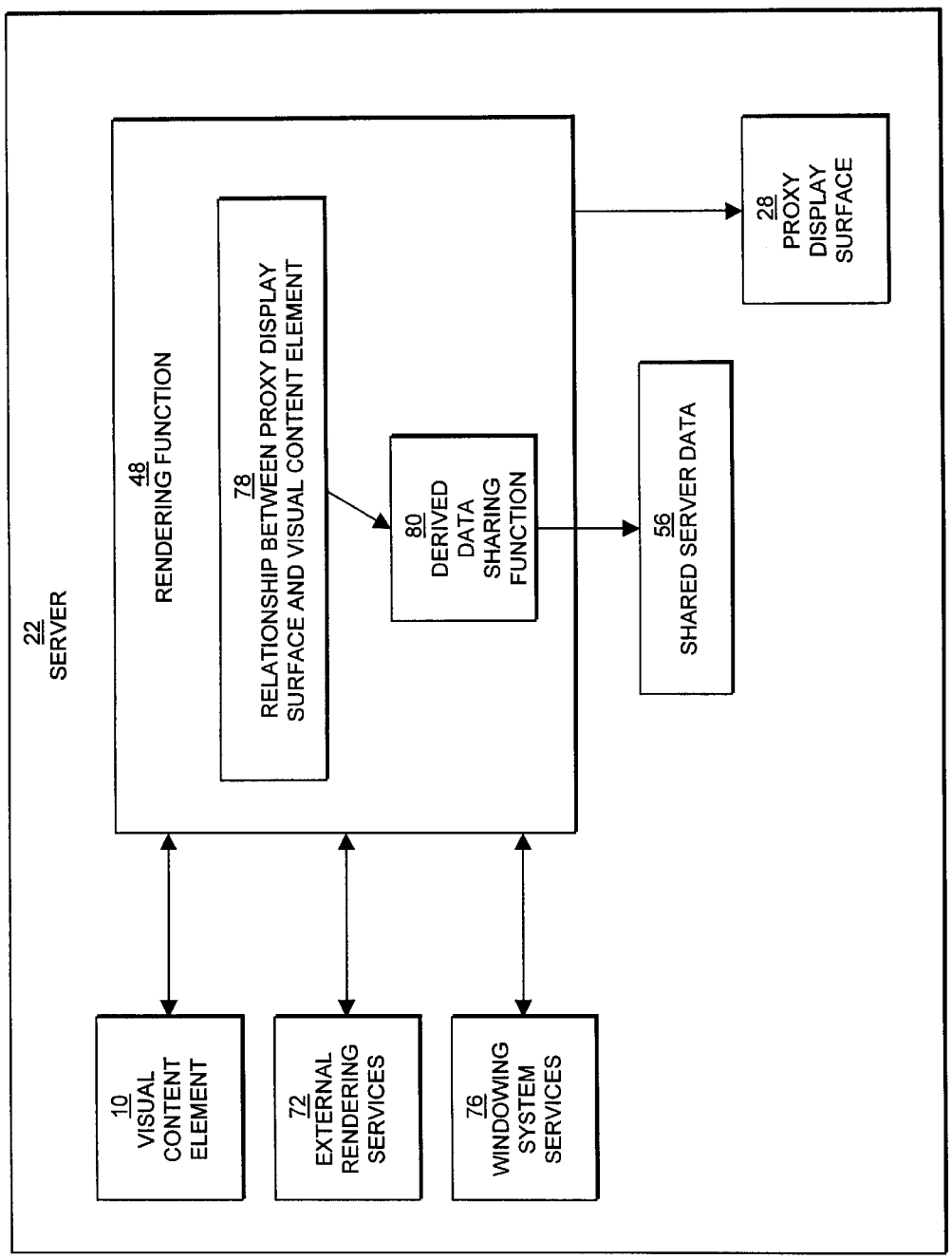
FIG. 6 is a block diagram illustrating the configuration of a server-side rendering function according to an embodiment of the invention.

One embodiment of the present invention comprises a server-side rendering function 48 for generating one or more bitmaps of a visual content element 10 wherein the generated bitmaps are transmitted to a client 24. Referring to FIG. 6, a server 22 comprises a rendering function 48 with relationships to a visual content element 10, one or more external rendering services 72, one or more windowing system services 76, shared server data 56, and a proxy display surface 28. The rendering function 48 defines the relationship between proxy display surface 28 and a visual content element, as well as a "source descriptor" data element 80. The "source descriptor" data element 80 provides information about the visual content element 10 rendered into the proxy display surface 28, for sharing with other non-rendering server functions and with the client 24.

In some embodiments, a server 22 allocates a proxy display surface 28 and requests services that render the visual content element 10 and its constituent component(s) 12 into the proxy display surface 28; whereas, in other embodiments, a server 22 allocates a proxy display surface 28, parses the visual content element 10 into its constituent component(s) 12, and requests services that render the constituent component(s) 12 of a visual content element 10 into the proxy display surface 28. In one embodiment, the visual content element 10 is divided into pages, or sections, and the rendering is performed on a single page, or section, at a time. In one embodiment, the rendering services are locally available on the server 22, and in another embodiment the rendering services are remote rendering services accessed from another computer system.

In some embodiments, server-side rendering is accomplished using a web browser (or the rendering functionality thereof) for HTML documents, facilitating direct creation of bitmaps from HTML code. Other embodiments use terminal emulation applications and remote windowing software services that render bitmap images on one computer system from data streams generated on another computer. Some embodiments can use available operating system windowing system services, such as UNIX, X WINDOWS, MICROSOFT NT, or WINDOWS 2000, or other types of display manager functions using bitmap capture operations. The relationship between the proxy display surface 28 and visual content element is maintained, regardless of the method used to create the proxy display surface 28, and at least one "source descriptor" data element 80 describing at least one aspect of the source visual content element is stored in the shared server data 56 for use by other (non-rendering) functions within the remote browser system and for sharing with the client. In some embodiments, the proxy display surface 28 is part of the shared server data 56.

Pixel Transform Function

Referring to FIG. 10, one embodiment of a pixel transform module 50 comprises executable instructions implementing a series of transform operations, e.g., clipping 82, filtering 84, bitmap scaling 86, and color-space conversion 88. The pixel transform function 50 may use expected client display attributes 44 and optional client viewport data 46 to transform the proxy display surface 28 into either a single or multi-level set of bitmap pixel representations 14. In some embodiments, the pixel transform function 50 uses shared server data 56; whereas, in other embodiments, the pixel transform function 50 creates shared server data 56. In some embodiments, the expected client display attributes 44 and optional client viewport data 46 are part of the shared server data 56, and in other embodiments, the expected client display attributes 44 and optional client viewport data 46 are stored in separate data structures.

Each transform operation is applied to an input bitmap, such as the proxy display surface 28, or an intermediate bitmap generated by a previous transform operation, and generates a destination bitmap for use by another transform operation, or for use as an output bitmap 14. In one embodiment with certain parameters, any of the transform operations can perform a 1:1 mapping resulting in a pixel transfer operation. In another embodiment, a 1:1 mapping results in an "in place" mapping where the input and output bitmaps share the same data.

The clipping transform operation 82 selects sub-regions of an input bitmap for inclusion or exclusion in the output bitmap. In one embodiment, clipping 82 is performed on pixel boundaries comprising rectangular sub-regions where selection of the sub-regions identifies unwanted matter (e.g., an advertising banner on a Web page), unneeded matter (e.g., white space) or information based on its position information. Other reasons for clipping 82 can be based on a determination that the sub-region does not comply with the pixel resolution selected for the bitmap, or that the sub-region does not fit within the expected client viewport.

The filtering transform operation 84 applies an image processing filter to an input bitmap to create the destination bitmap. Representative filter operations include enhancement, or sharpening of edges; blurring, including Gaussian blurs; noise reduction; contrast adjustment; and brightness (or luminance) adjustment. Other filters include: convolution filters; min-max filters; threshold filters; and filters based on image histograms.

The bitmap scaling transform operation 86 enlarges or reduces a bitmap, or changes an aspect ratio. Some bitmap scaling transform operations 86 calculate the output value of a pixel, based on the values of the surrounding pixels.

The color-space conversion transform operation 88 converts the range of pixel values of an input bitmap or the tonal range of a bitmap. Examples of color-space conversions include converting a 24-bit RGB color bitmap to a 4-bit grayscale bitmap, and false-color mapping a grayscale tonal range to a color tonal range. In one embodiment, color-space conversion 88 is primarily used for color-space reduction based on the expected client display attributes 44 or the client viewport data 46. Where the client 24 has a limited tonal range or a limited range of pixels, the color-space conversion 88 implemented on the server 22 reduces considerably the amount of data required to send to the client 24 without any appreciable reduction in the perceived image quality on the client 24.

Software implementing the foregoing transform operations is conventional and well-characterized in the art.

In one embodiment, the pixel transform functions 50 are performed sequentially, where one of the transform operation is completed before the next transform operations 50 is initiated. In another embodiment, the pixel transform functions 50 are performed in a pipelined fashion, such as where an input proxy display surface 28 is segmented into sub-regions and the sequence of operations is performed on a "per sub-region" basis, resulting in increased efficiency, especially where the transform is directly supported by the underlying computer hardware.

Remote Rendering

Figure 8:
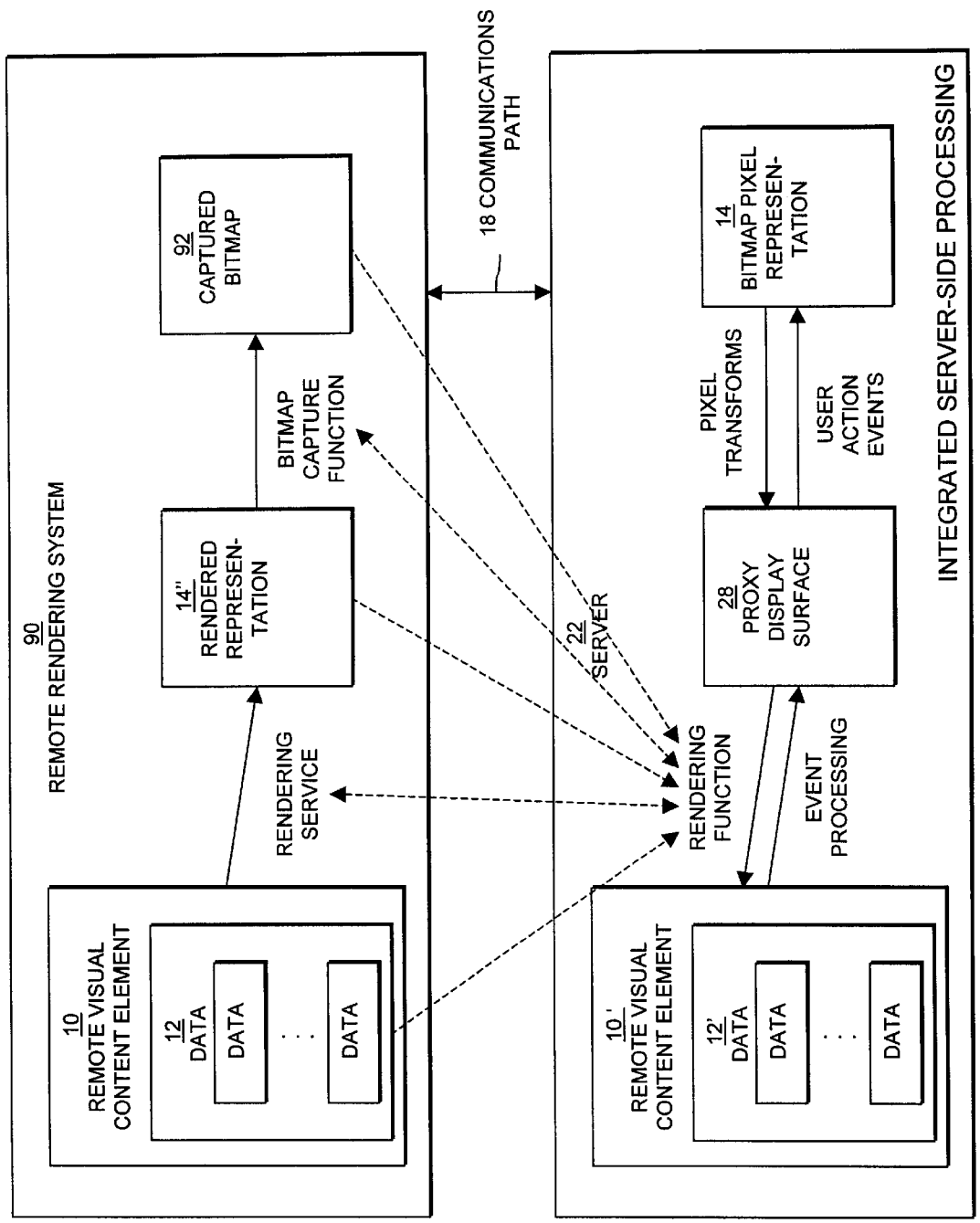
FIG. 8 is a highly schematic diagram of a remote rendering system according to an embodiment of the invention.
Figure 9:
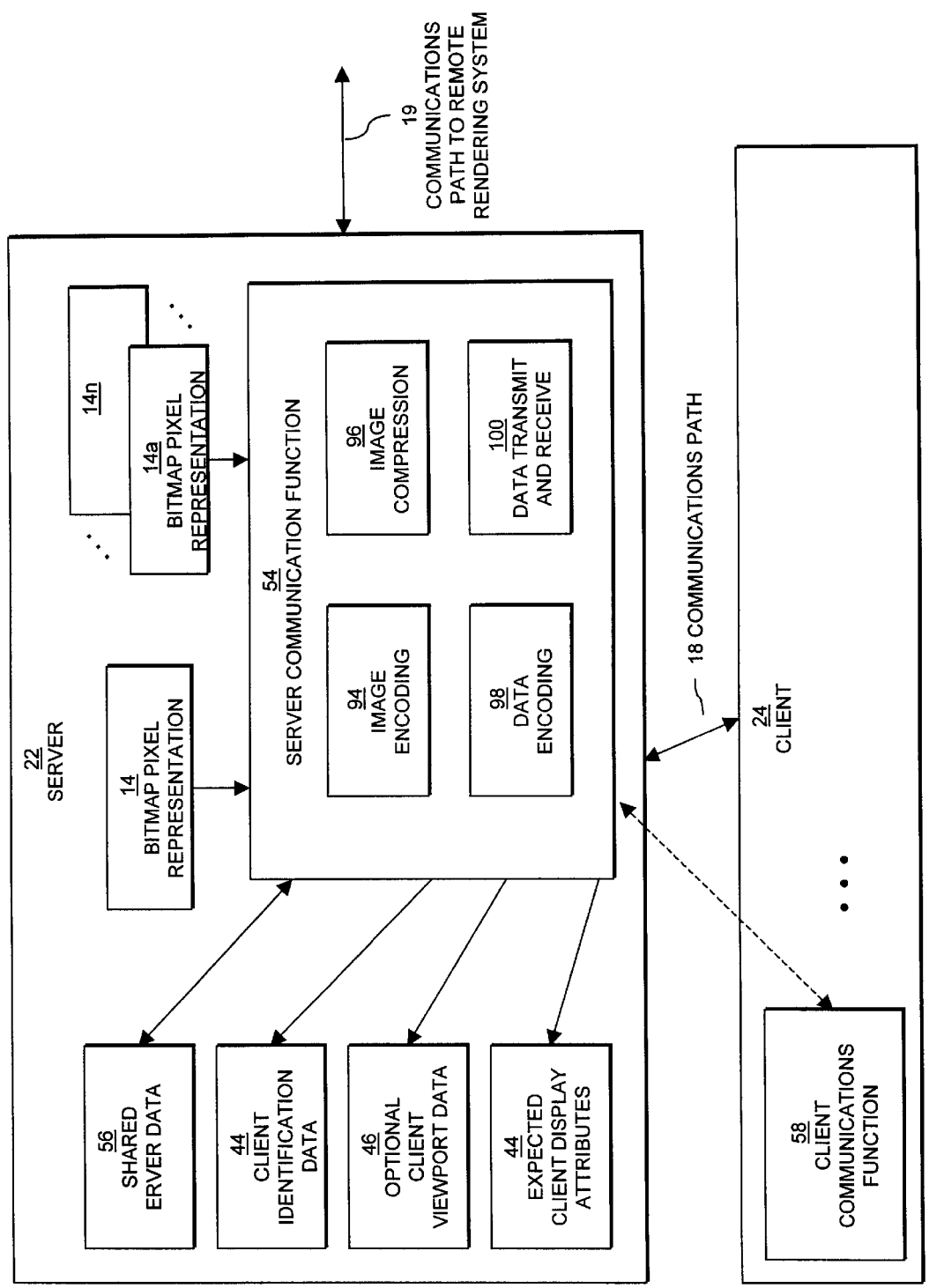
FIG. 9 is a block diagram illustrating the components of a server communications function according to an embodiment of the invention.

A remote browser system may utilize a remote rendering function 48 in which the server 22 accesses rendering and/or bitmap capture operations from another computer system through a communications path 19 (see FIG. 9). Referring to FIG. 8, one embodiment of remote rendering comprises a server 22 in communication with a remote rendering system 90, where the server 22 is substantially similar to the server 22 shown in FIG. 1. The remote rendering system 90 implements a rendering service that accesses or generates a remote visual content element 10, or its constituent components 12, to create a rendered bitmap representation 14". This rendered bitmap 14", or a captured bitmap 92 (as captured from this bitmap representation 14"), is provided to the server 22 through communications path 19 (see FIG. 9). In one embodiment, the server rendering function 48 accesses or generates a visual content element 10 on the server 22, the client device 24, or any other file system accessible to the server 22 and provides this to the remote rendering system through communications path 19. In another embodiment, the remote visual content element 10 and/or its constituent component(s) is located on a file system directly accessible to the remote rendering system.

As an example, where the server 22 is a UNIX or LINUX server 22 that is also connected to a MICROSOFT WINDOWS NT or WINDOWS 2000 system, and a bitmap version of a MICROSOFT WORD document is required, the UNIX server 22 sends a "remote rendering" service request to the Windows system to perform the rendering, because it is typically easiest for software on the Windows system to render a MICROSOFT WORD document into a bitmap. The server 22 may be configured to communicate with any of several remote rendering systems, enabling the server 22 to select the system best suited for a particular transformation.

Remote Rendering on an Isolated System for Reliability and Virus-containment

One or more remote rendering systems 90 may be attached to the server 22 through restricted communications channels 19 to isolate the system performing the remote rendering services from other systems on a network, such as the Internet, and reduce susceptibilities to computer viruses and system crashes. In one embodiment, isolation is accomplished using custom communications protocols other than standard networking and inter-networking protocols. In another embodiment, isolation is accomplished using restricted implementations of standard protocols that restrict the connectivity of the remote rendering systems 90 to systems other than the server 22.

As an illustrative example, if a server 22 communicates to an isolated remote rendering system 90 and the remote rendering system 90 is affected by a virus or a system crash, the server 22 can continue processing other server-side rendering requests directly, i.e., without relying on the remote rendering system 90. When the server 22 detects that the remote rendering system 90 is not responding, the server 22 can decide to re-direct remote rendering requests to another available remote rendering system.

Specialized Rendering of Constituent Components

A visual content element 10 may be composed of one or more constituent component(s) 12. Different constituent components 12 can be rendered by different specialized rendering functions. The overall rendering function 48 can coordinate specialized rendering function(s) to create intermediate representations that are used to generate the overall rendered representation.

For example, suppose that a visual content element 10 is a compound document such as an HTML Web page. The HTML Web page can include multiple images complying with different formats (e.g., JPEG, GIF, etc.). The HTML Web page can include other components such as an embedded spreadsheet. In such a case, the overall rendering function 48 for an HTML document accesses the services of different specialized rendering functions 48 for tasks such as rendering text, rendering GIF images, rendering JPEG images, and rendering embedded spreadsheets. The rasterized outputs of the specialized rendering functions 48 are composed by the overall rendering function 48 into a composite bitmap pixel representation 14 of the visual content element 10. The composite bitmap 14 can be represented as a single bitmap, or be dynamically assembled as needed by the rendering function 48 from the outputs of the specialized rendering functions.

Specialized Server-side Rendering

In one embodiment using server-side rendering (see FIGS. 1 and 3), the pixel transform function 50 is coupled to the rendering function 48 through one or more software interface(s). Based on data supplied by the pixel transform function 50, the rendering function 48 can alter its operation to create a proxy display surface 28 that is customized for the pixel transform being performed. This can include parameterized invocation(s) of relevant specialized rendering function(s) 48 to produce customized intermediate output(s).

When the pixel transform function 50 and rendering function 48 are coupled, the initial rendering process can be delayed until requested by the pixel transform function 50. This type of "on demand" rendering can use customization parameters provided by a client user or responsive to a client user's expressed preferences as inputs to its rendering process. Subsequent customization requests can generate alternate versions of the rendered proxy display surface 28.

Where an initial rendering is performed and the rendering function 48 receives a customization request from the pixel transform function 50, the rendering function 48 can re-invoke those specialized rendering functions that can be customized. The server 22 can avoid re-invoking specialized rendering functions that do not respond to the customization parameters. For example, the server 22 may have a specialized GIF rendering function that produces customized output based on parameters, such as pixel format or color palette of the client display surface, from the pixel transform function 50, while a specialized spreadsheet rendering function 48 cannot accept any such customization parameters.

A pixel transform can be performed on a sub-region of the proxy display surface 28, where a rendering function 48 is coupled to the pixel transform function 50 and determines which constituent component(s) 12 are associated with this sub-region. This allows the rendering function 48 to invoke only the specialized rendering function(s) 48 required for the associated constituent component(s) 12 (such as invoking only the GIF rendering function 48 if the sub-region is entirely occupied by a GIF image).

By limiting the re-rendering to selected constituent component types, and tracking which component(s) 12 are associated with different sub-region(s) of the proxy display surface 28, the rendering function 48 can avoid re-rendering the entire proxy display surface 28 each time a new customization request is issued by the pixel transform function 50. As a further optimization, the server 22 can maintain versions of the regions of the proxy display surface 28 that change due to a transform customization request. In response to additional customization requests, the server 22 can dynamically generate a composite proxy display surface 28 that includes pixel regions 124 appropriate for the new customization parameters.

Server Communications Function

Referring to FIG. 9, an embodiment of the server 22 comprises a communications function 54 providing capabilities to communicate with the client 24 through a communications path 18 and work cooperatively with a client communications function 58. The communications path 18 can be any communications channel, network, or inter-network, including the Internet. The server 22 communications function transmits a bitmap 14, or set of bitmaps 14, to the client 24, along with additional data such as information about the type(s) of visual content 10 being transmitted. The server communications function 54 also handles any data transmissions from the client communications function 58, or any other computer or file system that communicates with the server 22. In the illustrated embodiment, the server communications function 54 also includes an image encoding element 94, an image compression element 96, a data encoding element 98, and a data transmit and receive element 100. Server communications function 54 is capable of reading and writing shared server data 56, as well as generating client identification data 42, expected client display attributes 44, and optional client viewport data 46.

Optional Image Encoding and/or Image Compression

For each transformed bitmap representation 14, the image encoding 94 function can be applied to encode the image on the server 22 before being transmitted to the client 24. An image encoding 94 function can include a "watermarking" algorithm inserting data that produces alterations to the transformed bitmap representation 14 that can be either visible, or invisible. Watermarking algorithms can be used to encode identifying information about the origins of the visual content 10, such as the initial source of the information, the server 22, or the client 24.

For each transformed bitmap representation 14, the image compression 96 function can be applied to compresses the image on the server 22 before being transmitted to the client 24. Image compression 96 functions can be "loss-less," such as run-length encoding and Huffman coding, to reduce the amount of data associated with a bitmap representation 14 without affecting the viewing characteristics of the bitmap image. Alternatively, image compression 96 functions can be "lossy," (e.g., JPEG) to similarly reduce the amount of data, while allowing perceptible alterations to some aspects of the bitmap image. Generally, detail representations use loss-less compression, whereas, overview and intermediate representations can tolerate lossy compression.

A data encoding 98 function, such as a data encryption algorithm can be applied to increase data security of the image being transmitted to the client 24. In one embodiment, data encryption can be performed using standard protocols, such as the Secure Socket Layer (SSL) protocol.

In some embodiments, the bitmap representation 14 is encoded by the image encoding 94 function, compressed by the image compression 96 function, and data encoded by the data encoding 98 function before being transmitted to the client 24. Consequently, the image is first encoded, subsequently compressed, and ultimately data encoded.

Data Transmission to the Client Device

With continued reference to FIG. 9, the data transmit and receive 100 function prepares the data on the server 22 for transmission. In one embodiment, preparing data for transmission includes dividing the data into packets and inserting appropriate header information. The data preparation for transmission can include generating and incorporating protocol-specific packets, such as acknowledge packets, into the data transmitted from the server 22. These embodiments can comprise data transmission protocols based on the HyperText Transport Protocol (HTTP) over one or more Transport Communications Protocol/Internet Protocol (TCP/IP) sessions.

In one embodiment, the data transmission is sequenced in a manner allowing an overview representation to arrive first, thereby providing the client 24 device with an opportunity to display the overview representation while other representations are transmitted. In another embodiment, the server 22 divides representation levels into segments for transmission to the client 24, allowing the client 24 to display any segments already received while continuing to receive any remaining segments. A representation level can be segmented by dividing its pixel representation into sub-regions (spatial segmentation). Alternatively, representation level can be segmented into different levels of image detail (resolution segmentation).

In some embodiments, the server 22 determines the segmentation method and the sequence of transmitting segments based on one or more factors related to viewing patterns, such as expected viewing patterns, historical viewing patterns, and actual viewing pattern of the user at the client device 24.

The data transmit and receive function 100 also receives and processes data from a client 24, or from any other computer or file system that is in communication with the remote browser server 22. The data transmit and receive function 100 receives data communications and conditions received data for handling by other parts of the server 22 by processing any special protocol packets, such as acknowledge packets, reading and interpreting header information, and assembling multiple related packets into a data stream, or other data object. The data transmit and receive function 100 creates, or updates information, such as shared server data 56, client identification data, expected client display attributes and optional client viewport data 46. In one embodiment, the data transmit and receive function 100 communicates with other remote browser server functions 54 to notify them of data received, or of the status of a data transmission.

The Remote Browser Client using Multi-level Remote Browsing

In one embodiment of a remote browser system using multi-level remote browsing, where a multi-level set of bitmaps includes an overview representation, one or more intermediate representations, and a detail representation, the client device 24 first receives an overview representation. Then, using the display function, the client 24 displays the received overview representation while substantially simultaneously receiving the any other representations, such as any intermediate representation(s), or detail representation of the multi-level set of bitmaps.

Providing the client display function while receiving additional levels of a multi-level set of bitmaps improves perceived user responsiveness. The user can assimilate information provided in the overview representation and to make decisions based on this information while additional bitmaps are transmitted. For example, if the client 24 user decides not to view any intermediate or detail representations after viewing the associated overview representation, transmission of the subsequent levels can be stopped. Consequently, the remote browser system avoids unnecessary data transmission. In another example, the transmission of any intermediate or detail representations (in whole or in part) can be conditional on a client request prompted by a user interface action, thus avoiding any transmission of subsequent levels until a specific client request has been received.

In one embodiment, the client device 24 is also capable of sending directives to the server system 22 for prioritizing which parts of the non-overview representations should be sent sooner, based on either user input at the client device 24 or the history of user interactions.

In another embodiment of a remote browser system using multi-level remote browsing, the client device 24 displays one or more of the transformed bitmap representations 14 on its display screen by painting one or more client display surfaces into its client viewports 16. The client device 24 can display pixels from one or more representation levels 14 at any given time by displaying selected portions of multiple display surfaces (one per representation level) in multiple client viewports 16 (one viewport per display surface). Multiple client viewports 16 are displayed simultaneously or individually on the client's bitmap display device. If multiple client viewports 16 cannot be displayed simultaneously, a user interface 9 (FIG. 1) permits the user to switch between client viewports 16 (e.g., using a pointing device or other selection tool as discussed below). Whether to display multiple viewports simultaneously depends on client device 24 capabilities, the number of pixels available in the client bitmap display device for the client viewport(s) 16, and user preferences.

In one embodiment, display of an overview representation is given priority over display of any sub-regions of different representation levels. Thus, the client device 24 can display as much of the overview representation as possible within a client viewport 16 that is as large as possible, but no larger than necessary to display the entire overview representation. This preserves the advantages of viewing and working with as much of the overall layout as possible at the overview level.

In another embodiment, the client device 24 divides a representation level into multiple tiles in which tile size is related to the size of a client viewport 16. User interface 9 enables the user to select or switch between tiles, pan across adjacent tiles, and/or to scroll across adjacent tiles.

In one embodiment, user interface 9 allows the client 24 user to select or switch between representation levels within a single viewport, or across multiple viewports. Where a representation level is painted into a client viewport 16, the client user interface allows the user to specify one or more locations on the client viewport 16, which are mapped by the client 24 to the corresponding location(s) on the appropriate bitmap 14. The user interface also permits selection of other levels of the multi-level set. Based on the user-specified location(s) and the relative pixel resolutions of the two levels, a related portion of the selected other level is painted into a client viewport 16.

For example, specifying one or more locations on a lower level representation (such as an overview representation), and selecting display of a higher level (e.g., detail level) representation of the specified locations on the lower level representation, causes display in a client viewport 16 of that portion of the higher level representation that corresponds to specified locations on the lower-level representation, and any surrounding portions of the higher level representation that fit within this client viewport 16.

Similar mechanisms allow the client 24 user to select a lower level representation from a higher level representation. Selection events include user interface actions such as mouse "clicks," pen clicks, or button presses. Within a client viewport 16 of a given size, more can be shown of the lower level representation than of the higher level representation. Therefore, the visual effect is one of "zooming in" or "zooming out" using location-sensitive information. These "zooming" functions can be implemented using two or more client viewports 16, or within a single client viewport 16. The effect to a client 24 user is that a single proxy display surface 28 exists, allowing a user to "zoom in" or "zoom out" across the proxy display surface 28 as needed.

Selection Bookmarks

Figure 16:
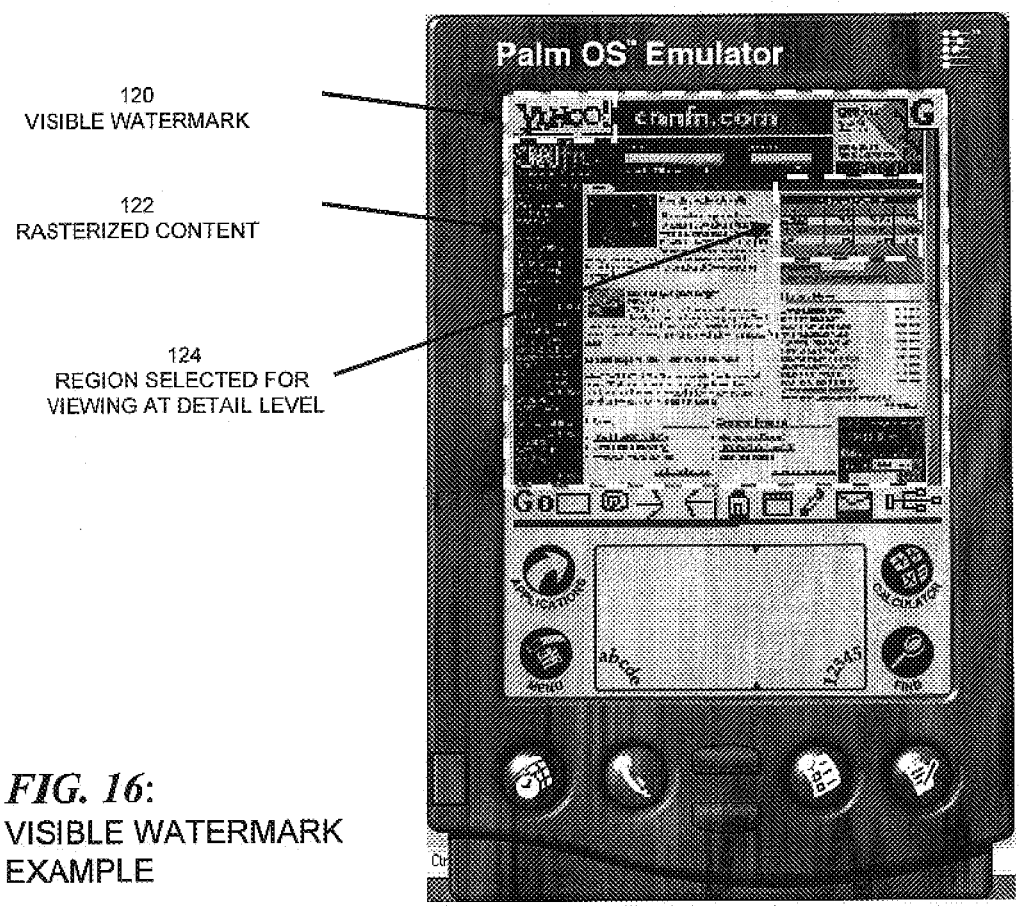
FIG. 16 illustrates an example visible watermark.

Bookmarks, such as those commonly used in Web browsers, specify the location (e.g., URL) of a visual content element 10. Retrieval of the visual content element 10 based on these bookmarks causes rendering and display of the entire visual content element 10 or a portion thereof. In one embodiment, the retrieved visual content element 10 is displayed within the client viewport 16. Referring to FIG. 16, in another embodiment, a pixel region 124 of interest can be defined on a rasterized representation, such as an overview or detail representation of a visual content element 10, with that pixel region 124 defining a "selection bookmark." User execution of the selection bookmark prompts retrieval by server 22, based on a request by interface 9, of the associated visual content element 10 and subsequent display of the region of pixels defined by the bookmark. Multiple selection bookmarks can be stored for the same visual content element, each corresponding to a different region of interest.

In one embodiment, a selection bookmark is a stored representation of a dynamic selection. A selection bookmark allows the user to specify the region of interest based on the layout, further allowing fast access to a particular portion of a rendered visual content element 10. The selection bookmark function can prioritize any associated content retrieval, rendering and pixel transforms according to the selected region of interest for display. A selection bookmark defines a prioritized region of interest but does not preclude viewing other parts of the rendered visual content element 10.

A selection bookmark can be based on a previous rendering of a rasterized representation, such as an overview or detail representation. A selection bookmark based on a previous rendering of a rasterized representation precludes the need for generating, downloading, or rendering a new rasterized representation before processing the selection bookmark. The user can access the content of interest first, then decide whether to request a new version of an overview representation 122 and/or see additional detail not within the selected region.

Selection bookmarks are broadly applicable, such as for Web pages, in which the layout of a visual content element 10 remains relatively constant, even as the content rendered within the layout changes. For example, selection bookmarks can be defined on layouts with pixel regions 124 reserved for topics such as the latest news headlines, sports scores, stock market trends, or the five-day weather forecast. The content changes regularly, (e.g., several times each hour) but the format remains constant. Many other types of visual content 10, such as spreadsheets, also have fixed layouts with changing contents. If a selection bookmark is defined for a layout that does change, the retrieved rendered content will not be as expected by the user. The user can then specify a new selection region based on a more current rasterized representation, such as an overview or detail representation.

A selection bookmark can specify or prioritize the type of rendering used for the region of interest. In a rasterized extraction technique, the entire visual content element 10 can be rendered with the region of interest extracted in a rasterized form for display. In a content extraction technique, the relevant segment of the source visual content can be extracted and/or transcoded for separate rendering using a rendering technique such as a text-oriented rendering with word-wrapping.

The implementation of prioritized viewing for selection bookmarks depends on several factors: the rendering technique being used; the context in which the rendering is performed; and additional information such as user preferences. Preferences related to prioritizing can be stored with the selection bookmark. Prioritized viewing can be accomplished through any combination of the following techniques, some of which are relevant to only specific rendering techniques:

a) prioritized rendering where the selected region of interest can be prioritized within the rendering process;
b) prioritized multi-level transforms for a multi-level set of derived representations where the transform of a selected region of interest can be prioritized during one or more of the multi-level transform functions;
c) prioritized transmission where the rendered and/or transformed region of interest can be prioritized in the transmission from server 22 to client 24; and
d) prioritized viewport 16 placement where the rendered representation is positioned within a client viewport 16 such that the selected region of interest is immediately viewable.

Prioritizing can also be applied across one or more of the rendering, transform, transmission, and viewport placement steps. In one embodiment, prioritizing across one or more of these steps creates a prioritized pipeline for rapidly viewing the rendered selection and then processing the remainder of the rendered visual content element. In such a prioritized pipeline, certain rendered representations, such as overview representations 122, can still be prioritized above the selected region of interest. In another embodiment of a partially prioritized pipeline, only certain steps are prioritized, such as a rendering step that is performed for an entire visual content element 10 while subsequent steps are prioritized for a selected region of interest.

One embodiment of prioritized rendering uses a raster-to-source correspondence map for mapping the selected region of interest to an associated segment of the visual content element 10 such that only the associated segment is rendered. This can result in a rendered appearance that differs from a rasterized extraction technique in which the entire visual content element 10 is rendered and the selected pixel region 124 of interest is extracted in rasterized form.

The difference in rendered appearance can be acceptable or even preferable, such as for text-related rendering. The difference in rendered appearance in some instances, however, can be less than desirable, but still represent a reasonable trade-off for faster access to the selected region 124. Prioritized rendering is generally not useful if no differences in rendered appearance are acceptable. In one approach, prioritized multi-level transforms determine which representation levels are required and which are prioritized. For example, overview representation 122 can be required for the entire proxy display surface 28 but only the selected region of interest 124 is needed at a detail representation level. In this example, the overview representation 122 places the selected region 124 within the context of the overall layout. Only the selected region of interest is provided in a detail representation level. All other transforms are either delayed or entirely avoided.

In an illustrative embodiment of multi-level browsing using a selection bookmark, the selected region of interest 124 is rendered and transformed at a detail representation level. This rendering operation may utilize techniques such as rasterized extraction or content extraction. The selected region of interest 124 is transmitted (if required) and displayed in a client viewport 16. The user can view the selected region of interest at the detail level.

Rendering and transforms of any other portion of the visual content element 10, and at any other representation level, may be delayed until requested by the user. Alternatively, these other portions may be omitted or processed in the background in anticipation of a future user request. Thus in some instances a detail level representation of the selected region of interest is provided first, while maintaining all other parts of the rendered visual content element 10 available for later viewing. When the selected region of interest is relatively small compared to the rendered version of the entire visual content element 10, the result can be a considerable improvement in perceived user responsiveness.

A further reduction in communication requirements can be obtained by coordinating the caching of selection regions between the server 22 and client 24. The client 24 transmits a time-stamp (previously supplied by the server) for its cached selection region 124 when requesting a refresh. The server 22 computes the pixel differences between the newly rendered selection region and its corresponding time-stamped cached bitmap representation of the same selection region. If a difference representation for the selection region can be encoded more compactly than the complete pixels of the selection region, this difference representation can be transmitted to the client 24 along with an updated time-stamp. In selection regions where only a small portion of the bitmap changes, the communications savings can be considerable.

If a slow communication link (such as some modem, cellular or serial connections) is used, the selection bookmark provides highly responsive viewing of the selected region 124 of interest compared to sending the entire representation and then viewing the region of interest. Selection bookmarks are also highly advantageous when used with relatively small client viewports 16 on devices such as PDAs or cellular telephones, or within relatively small viewports 16 on a larger screen display by eliminating the need to pan or scroll to the region of interest.

Transaction Bookmarks

Conventional bookmarks, such as those used in current Web browsers, retrieve visual content elements 10 based on specified locations such as a URL. This type of bookmark can also include modifiers to provide additional retrieval-related data, where the modifiers can be appended to the URL.

Figure 15:
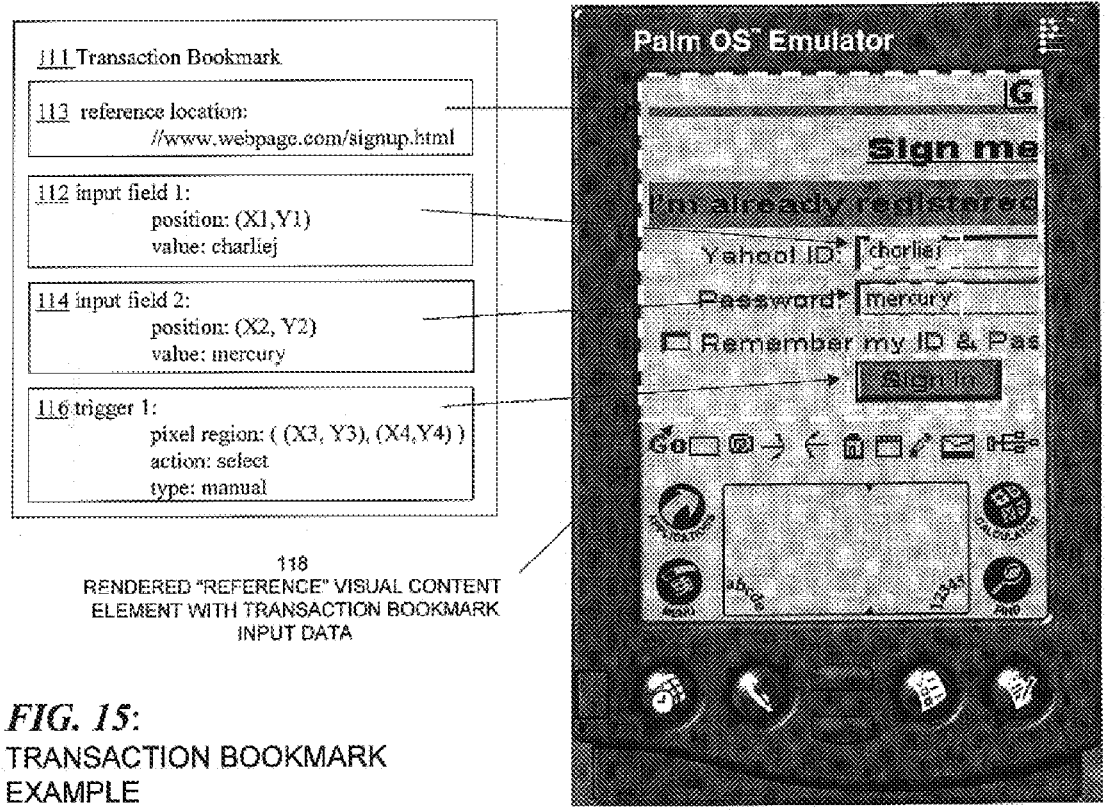
FIG. 15 illustrates an example transaction bookmark.

Referring to FIG. 15, in one embodiment, a transaction bookmark 111 according to the invention is a specification for a transaction to be applied to a visual content element 10. The transaction bookmark 111 specifies a visual content element 10 using a URL or similar specification. The transaction bookmark 111 also includes a specification for a transaction associated with the visual content element 10. After the specified transaction is initiated and processed, a visual content element 10 that represents the results of the transaction can be rendered and displayed to the user.

A transaction bookmark function has both a "reference" visual content element 10 and a "result" visual content element 10. The transaction is applied to a rendered representation of the reference visual content element 10. The results of the transaction can be displayed as a rendered representation of the result visual content element 10. The result can be an update of the reference visual content element 10, or it can be an entirely different visual content element 10, depending on the type of transaction, and the implementation of the associated transaction processing function.

In one embodiment, multiple transaction bookmarks reference the same visual content element 10, each specifying a different transaction associated with that visual content element 10. A transaction bookmark 111 can also specify multiple alternative input values to generate different transactions from the same transaction bookmark.

In one embodiment of a transaction bookmark, the transaction specification can include input fields and/or input actions to be applied to a rendering of the reference visual content element 10. The transaction specification can include one or more of the following: the pixel location(s) of one or more transaction "triggers" on the rendered reference visual content element; the value(s) of one or more input fields corresponding to visual controls associated with the reference visual content element; specification(s) for one or more input actions to be applied to the rendered reference visual content element; the type of transaction to be generated; one or more data element(s) to control manual or automatic generation of the transaction; and one or more data element(s) to control the rendering and/or display of the transaction results.

In another embodiment, a transaction bookmark function applies the specified input field(s) to a rendered representation of the reference visual content element 10. This is done as if the user had entered the input field(s) interactively. Examples of an input field can be alphanumeric input, a selection from a selection list, or a selection of a button or check box (e.g., inserting the user's name or identifier into a dialog box).

Each of the input(s) is applied in the sequence defined by the transaction bookmark. The sequence can be determined automatically or through a component of user interface 9 supplied by the transaction bookmark function. The transaction bookmark function supplies the input so that the input processing function for the rendered visual content element 10 can provide the appropriate response (e.g., transmission of the user's name or identifier to a Web site). The response can include updates to the rendered representation of the visual content element, or retrieval and rendering of a different visual content element 10.

The transaction specification can also include the pixel location(s) associated with one or more transaction triggers. A transaction trigger is an input action applied to a trigger pixel location that initiates a transaction. A trigger can also be implicitly defined within an input field in which the value of the input field initiates the transaction. For example, a special character such as a carriage return at the end of an input field can implicitly initiate a transaction.

In a representative example, a transaction bookmark 111 can be created for a search box on a Web page. A typical Web page search box has an alphanumeric input field 112 and button to initiate the search. In this example, the button is the trigger. Often, a carriage return at the end of the alphanumeric input will act as an implicit trigger to initiate the search transaction.

FIG. 15 illustrates a transaction bookmark 111 that includes four transaction specifications. The first specification is a reference location 113 which specifies the location of the reference visual content element 10. The second specification is the pixel position (text anchor point) and value (e.g., "charliej") of an alphanumeric input field 112. The third specification is the pixel position and value (e.g., "mercury") of another alphanumeric input field 114. The fourth specification is a trigger specification which includes bounding box pixel coordinates of the pixel region 116 associated with the trigger, the user input action associated with the trigger, and the type of trigger ("manual"). This trigger initiates a "sign in" transaction using the specified input fields. A rendered representation of the reference visual element, with the transaction bookmark input fields applied to this rendering, is shown in FIG. 15.

In another example, a transaction bookmark 111 for a spreadsheet document includes a sequence of input actions. The first input action selects a spreadsheet cell for modification. The second input action supplies a new value for this cell followed by a carriage return character, where the carriage returns acts as an implicit trigger to start the spreadsheet update transaction.

If there are no implicit triggers within the input field(s), then a manual or automatic trigger can be supplied to initiate the transaction. Manual or automatic triggers are processed by the transaction bookmark function after any input field processing. For an automatic trigger, the associated input action can be automatically generated to initiate the transaction. Automatic triggers can be based on one or more criteria such as a time interval and/or the establishment of a certain type of communications link 18. For manual triggers, a user interface can be provided for the user to manually trigger, or initiate the transaction. The bookmark function can provide its own specialized user interface for the manual trigger function. The interface can be based on a rendered representation of a visual content element 10, showing the "trigger" pixel region 116.

The user can be prompted to select the trigger where a rendered "trigger" pixel region 116 is positioned within a client viewport 16. In the search box example, the viewport 16 can be positioned so that the user can select a button and initiate a transaction. Adjacent pixel regions, such as the search box input field, can also be displayed. Automatic positioning of the trigger pixel region 116 eliminates any need for the user to pan or scroll through a client viewport 16 to find the trigger.

In one embodiment, a manual trigger gives the user an opportunity to modify one or more input field(s) before the transaction is initiated. For example, the user may change an input field to a new value or select an alternate input value previously stored with the transaction bookmark 111. The bookmark function can supply the user with an option to update the transaction bookmark 111 with the new or changed input value(s), or to create a new transaction bookmark 111 with these values.

A user interface can be supplied for creating the specification of any input field(s) 112, 114 and/or triggers. One such method is to display a rendered representation of the specified visual content element 10 and then "record" user inputs as they are applied. The recorded input actions form the basis for a transaction specification. The recording function generates a sequenced list of the input actions and/or input gestures so that these can be "played back" at a later time by the transaction bookmark function 111.

The transaction bookmark function can also supply a user interface component for editing the transaction specification. The transaction editing function can be implemented to handle functions such as changing input field values, specifying and selecting alternative inputs to the same input field, setting or changing the sequence of applying input fields, determination of triggers, and determination of whether the transaction should be manually or automatically triggered.

In one embodiment of transaction bookmarks 111, input field and trigger specifications are stored with their associated pixel positions. These pixel positions are based on a rendered representation of the reference visual content element 10. When the transaction is generated by the transaction bookmark function, these stored input actions are applied at the same relative pixel positions. These can be applied to the original rendering or an entirely separate rendering of the reference visual content element 10. If these pixel positions change in a subsequent rendering, such as due to a layout change in the referenced visual content element, the user can update the selection bookmark to reflect these changes.

In another embodiment of transaction bookmarks 111, the input field and trigger specifications are stored with references to associated structural components (e.g. visual controls) defined with respect to the visual content element 10. These associations can be based on a mapping supplied by the server 22 of pixel locations to a structural representation of the visual content, such as a Document Object Model (DOM) for a Web page. By using the structural component references, the input field and trigger specifications can be applied by the server 22 to a structural representation of the visual content element 10. This type of structural representation of a transaction can utilize a structured representational framework such as XML for communicating and processing the transaction.

Transaction bookmarks are useful whenever the layout of a visual content element 10 remains relatively constant, even if the content rendered within the layout changes. In one embodiment, only the relative pixel positions of the input field(s) or trigger(s) are used. Other aspects of the rendered visual content element, including both layout and content, can change but the position of the input field(s) and trigger(s) remain constant. Even the rendered representations of the input field(s) and trigger(s) can change in a subsequent rendering as long as the semantic meanings of associated user input actions remain the same.

A transaction bookmark 111 can be applied to any appropriate rendered or structural representation of the reference visual content element 10. This rendered or structural representation can be local, i.e., on the same device or system as the transaction bookmark, or on a remote device or system. The rendered representation can be previously generated and stored on the local or remote system, or dynamically generated, either locally or remotely, as the transaction bookmark 111 is processed. This provides flexibility in implementing the transaction bookmark function, in optimizing when and where the processing occurs, and in minimizing any associated communications requirements.

For example, a client 24 can have a transaction bookmark function that works cooperatively with a server 22. The client 24 maintains the bookmark but the server 22 generates the associated transaction. The client 24 can initiate the transaction without either generating or displaying a current rendered representation of the reference visual content element 10.

After the transaction is initiated by the transaction bookmark function, the transaction results can be represented as a result visual content element. Depending on how the transaction is processed, this result can be an update of the original visual content element or it can be a different visual content element. The client 24 can display a rendered representation of the result visual content element. This rendered representation can be generated by the client 24, or generated by a server 22 and transmitted to the client 24.

A transaction bookmark 111 can also use selections, where a selection can be applied to the reference and/or result. A reference selection can define a pixel region 124 where all input field(s) and/or trigger(s) are located. The selection can also include other parts of the rendered reference that surround the transaction-related pixel locations. A reference selection can be used to reduce the processing required to generate an updated version of the rendered reference before processing any input field(s) or trigger(s). Difference encoding of selections, as previously described, can be applied to reduce transmission times between server and client of reference and/or result selections.

If the rendered reference is displayed to the user, the selection can also serve as a visual cue to the locations of the input field(s) and trigger(s). A reference selection can also be used to reduce storage, processing, communications and/or power requirements in various implementations of transaction bookmarks. If the rendered reference is saved with the transaction bookmark 111, the selection can be used to reduce client storage requirements. In a client/server implementation of the transaction bookmark function, if the server 22 sends an updated reference to the client 24, the selection can reduce the amount of data transmitted to the client 24 by the server 22.

A "result selection" is a selection on the rendered result visual content element. This can be used to limit or prioritize the display of the rendered result to the selected region of interest 124. A result selection can improve perceived user responsiveness and reduce the amount of user effort to find and see the most relevant section of the results. A result selection can also reduce storage, processing, communications and/or power requirements. Result selections are most applicable when the layout of the result is predictable, even when the content displayed within the layout changes.

Transaction Bookmarks with Server-side Rendering

In an illustrative embodiment of transaction bookmarks 111, the transaction bookmark function is implemented with server-side rendering. The transaction bookmark function is distributed between the client 24 and server 22. The client 24 requests the transaction bookmark 111 and, in response, the server 22 initiates the transaction. The transaction bookmark specifications can be stored on either the client 24 or the server 22.

In one embodiment, the server 22 generates and rasterizes an updated version of the reference visual content element 10. The server 22 then applies any data supplied in the input field(s). The server 22 need not transmit the updated rasterized reference element to the client 24, which can save considerable processing and communications time. In another embodiment, the server generates a structural representation of the reference visual content element 10 and applies any data supplied by the input field(s) with respect to their associated structural component(s). Again, the server 22 need not transmit an updated rasterized reference element to the client 24.

For an automatic trigger, or an implicit trigger within an input field, the server 22 can automatically initiate the transaction.

For a manual trigger, the client 24 provides the manual trigger user interface. The server 22 coordinates with the client 24 and waits for the signal that the user has selected the manual trigger. The client 24 interface can be entirely independent of the rendered reference or it can be based on a previous rendering of the associated trigger pixel region(s) 116. The user interface can include pixel regions surrounding the trigger pixel region 116 as specified in a reference selection.

In one embodiment, the server 22 can send an updated version of the required reference pixel region(s) for use with a manual trigger user interface. By limiting the transmission to required pixel region(s), the server 22 can avoid transmitting the entire updated rasterized reference to the client. In multi-level browsing, the server 22 can prioritize and/or minimize the transmission at each rasterized level. For example, the server 22 can send an updated version of the entire overview but only the required (if any) pixel regions at a detail level. Other embodiments with priority techniques are possible, such as delaying the transmission of rendered reference updates until after the transaction is processed to prioritize the display of results over updating any reference representations on the client 24.

After the transaction is initiated on the server 22, the server rasterizes the result into a bitmap pixel representation 14. This can then be transmitted to the client 24 for display. If a result selection is specified in the transaction bookmark 111, then the server 22 can prioritize the transmission of this rendered selection. The remainder of the rendered representation can be transmitted later, possibly based on a specific user request. If only the result selection is desired, then transmission of the remainder of the rendered result can be omitted.

Saving Input Fields within Transaction Bookmarks

If a rendered visual content element 10 includes rendered visual controls, such as text input areas, selection lists, check boxes, and/or buttons, the user input associated with one or more of these visual controls can be stored with a transaction bookmark 111. When the bookmark 111 is refreshed by retrieving the reference visual content associated with the bookmark 111, the user input can be automatically applied to the refreshed content (in either a rasterized or structural form, as appropriate) so that the user does not have to input the data and/or selections again.

In a manually triggered transaction bookmark, the user can modify any inputs before initiating the transaction. For an automatically triggered bookmark, the user can modify any inputs at any time before the transaction is automatically initiated. Automatic triggering can be based on one or more criteria such as a time interval, or the establishment of a certain type of communications link 18.

Different inputs for the same visual control can be saved as a selection list, allowing the user to either choose one of the previous inputs, such as text inputs, or provide a new input. For example, the transaction bookmark data for a stock symbol text input area can save multiple stock symbols, with the user choosing which one to use rather than having to re-enter this data each time a similar transaction is desired. Different inputs, or different combinations of inputs, can be stored as separate transaction bookmarks 111. This allows the user to treat each transaction bookmark 111 as the reference for a separate transaction, with appropriate settings for the input fields.

Bookmark Refreshes

In general, a bookmark references the location of a visual content element 10. The bookmark and a pointer to the associated content (or the content itself) may be stored on the server 22 in mass storage device 6. If desire, a cached representation of the referenced visual content element 10 can be stored on the client 24 or server 22, and displayed when the user requests a display of the associated visual content element. This cached representation can be in source form or rendered form, including rasterized, multi-level rasterized, or a combination of rendering techniques. If the referenced visual content element 10 changes, then the cached representation is no longer current. The cached representation can be updated, or "refreshed" to reflect the current version of the visual content element 10. A bookmark refresh can be performed manually or automatically.

In a manual bookmark refresh, the user requests a refresh of the associated visual content element 10. This can be done explicitly, through a specific user interface for refreshing content. Manual refresh can also be implicit, such as for some implementations where bookmarks initiate a refresh every time the user selects a bookmark for display.

In an automatic refresh, the bookmark is refreshed automatically based on one or more criteria embodied in executable instructions associated with the bookmarks; representative criteria include, for example, a specified time interval and establishment of certain types of communications links 18. In one example, the bookmarks in a portable device can be refreshed during a "sync" function, where the sync is initiated when the device establishes communications with an appropriate host system.

Each refresh can be costly in terms of processing, communications, storage and/or power requirements; however, not using the current version of a content element 10 can result in a user relying on outdated or inaccurate information. A caching strategy can determine how and when refreshes occur.

When refreshing content over a communications link 18, the amount of delay experienced by the user is generally inversely related to the speed of the communications link 18 if there are no noticeable delays in accessing the retrieved content on the server side of the communications link 18. Over a high-speed communications link 18, such as Ethernet, or broadband, the user experiences very little delay; however, delays incurred through use of a low-speed communications link 18, such as a modem, the delay can be significant.

A caching strategy can be implemented based on the expected and/or measured communications delay to complete a refresh of a visual content element 10. Long delays, whether actual or expected, generally bias the caching strategy to implement fewer refreshes. If the client 24 is a portable device using battery power, the power consumption realized during a cache refresh can also be used to determine an appropriate caching strategy. For example, in a portable wireless device, a client transmission typically consumes more power than a client reception of a server transmission. Power conservation caching strategies can bias toward refresh techniques that require fewer client transmissions and/or require less processing by the client. Server-side rendering is one method of reducing the power requirements of the client 24.

Some specific caching strategies are made possible or desirable within the context of the present invention. These relate to intelligent manual refreshes, caching of rasterized representations, caching with multi-level representations, refreshing selection bookmarks, and refreshing transaction bookmarks.

Handling User Input

In one embodiment of the remote browser system of the present invention, there are at least two general classes of user input processed by the client device 24: (1) location events that define the location of a pointing device on a client display surface; and (2) selection events that define a selection action associated with a client display surface. In a location event, the pointing device is typically a mouse, pen, touch-pad or similar locating device. The location is typically a pixel location on the client display surface, represented by the coordinates (X,Y). The location is captured initially as a pixel location on the client viewport and is subsequently mapped to a pixel location with respect to the overall client display surface. Other user interface actions are capable of generating location events on a client display surface, such as moving a "scroll bar" that can be outside of a client viewport 16, or a client timer event that automatically generates a location event.

Client 24 user interface selection events are typically generated by user interface actions such as mouse clicks, pen clicks, or button presses. In a selection event, a selection action is associated with the client display surface. Some selection actions also have an explicit or implicit (X,Y) pixel location on the client display surface. Other selection actions that generate selection events include clicking within a certain sub-region of a separate client viewport 16 and client timer events that automatically generate a selection events.

Referring to FIG. 10, one embodiment of a method of the invention is depicted as a flowchart of client processing events. The remote browser client initially 24 receives a client event (step 10). This event can be generated by the client's operating system, by a function supplied by the remote browser client or by some other client software that is capable of communicating events to the remote browser client. These events can be user interface events, timer events or other events supported by the client software.

In this embodiment, a client event is fully processed before another event is received to ensure that events are handled in the proper sequence. Receipt of additional client events is temporarily disabled during the "receive client event" step (step 10) and re-enabled at the completion of the client event processing step (step 60). In a further embodiment, additional events received during client event processing are queued for later processing. In another embodiment additional events received during client event processing are ignored. After the event has been received, it is examined to determine the event type (step 20). Generally, the event type is a location event, a selection event or another event type. If the event type is not a selection or location event, the remote browser client decides 24 whether to generate a related client event (step 25). If a related client event is generated, it is separately processed. The related client event is typically a location or selection event, but can also be a different event type.

If the client event is a location event, the client 24 determines whether to suppress the event (step 30). Suppression of location events is a technique for reducing processing requirements on the client 24 and/or reducing data communications traffic to the server 22 (which also reduces related server processing requirements). If the location event is not suppressed, or if the event is a selection event, the remote browser client 24 then decides whether to propagate the event to the server 22 (step 40). If the client event is propagated to the server 22, the client 24 generates one or more related server events (step 45) and starts the process of transmitting the generated event(s) to the server 22 (step 48).

The function of updating the client display (step 50) is shown as the next step in the flowchart. However, this step may be performed at any time after receipt of the client event (step 10), since it is independent of the other steps shown in FIG. 10. The update function makes any appropriate changes or updates to the client display in response to receiving the client event, including updates to the client display surface, client viewport 16 and/or other pixels in the client's bitmap display. Updates can be applied as necessary to multiple client display surfaces.

Client event processing is completed (step 60) by performing any remaining functions related to processing a client event. Such functions include updating data elements or data structures, providing additional user interface feedback (e.g., audible tones, status lights, etc.), and enabling or disabling the receipt of additional client events.

Mapping Client Locations to the Proxy Display Surface

Figure 11:
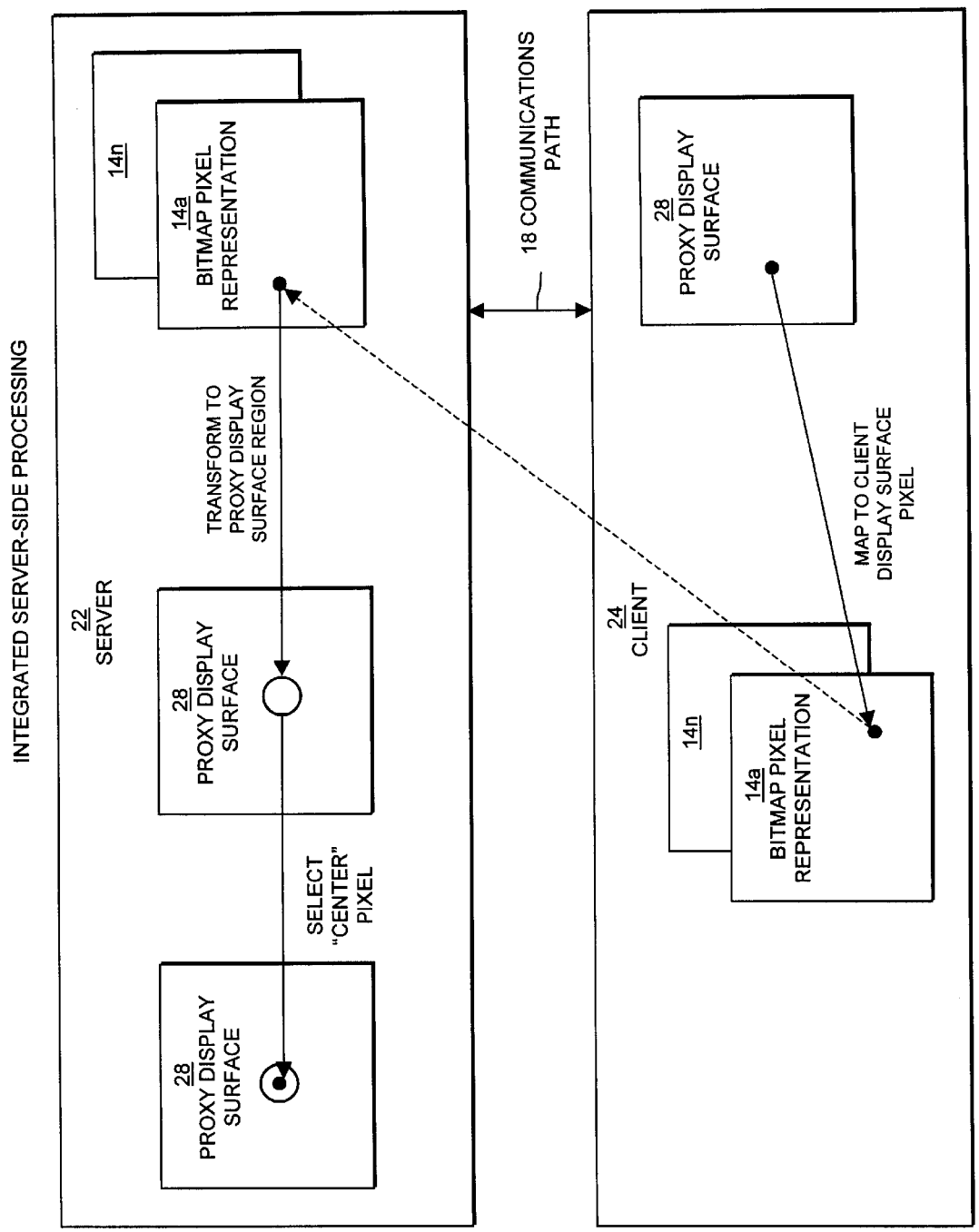
FIG. 11 illustrates the mapping of client locations to a proxy display surface according to an embodiment of the invention.

FIG. 11 illustrates one embodiment of the process of mapping from a client 24 pixel location to the proxy display surface 28 of the server 22. In this embodiment, location coordinates, shown as pronounced dots, are initially reported with respect to the client viewport 16. The client interface 9 maps the coordinates to the equivalent coordinates on the client display surface 26. Generally, the mapping from a pixel location on the client viewport 16 to a pixel location on the client display surface 14 is a 1:1 mapping.

A client viewport 16 can have pixel locations not associated with the bitmap(s) 14. For example, client-specific visual controls, data displays, status displays, window borders or overlays can be displayed in a client viewport 16. These are generated and maintained by the client user interface 9 and therefore have no corresponding pixel locations within the bitmap(s) 14. For these client-specific pixel locations, there is no mapping back to the proxy display surface 28.

When there is a mapping, the client display surface (X,Y) pixel coordinate pair is then transmitted to the server 22 over communications path 18 and mapped to the proxy display surface 28. The particular representation level associated with the client display surface coordinates is determined at the server 22. If multi-level remote browsing is being used, the client display surface coordinates are mapped to pixel coordinates associated with the server's 22 bitmap at the appropriate representation level, and the pixel coordinates associated with the bitmap 14 are transformed to coordinates at the proxy display surface 28.

In multi-level remote browsing, a client display surface 26 can be associated with one or more representation levels. If the client display surface 26 is associated with more than one representation level, the client 24 is responsible for maintaining the mapping. The client 24 unambiguously maps each pixel in the client display surface 26 to a single representation level. Client-specific pixel locations are not included, since they have no mapping to a representation level. The client 24 or server 22 then performs the 1:1 mapping of the (X,Y) pixel coordinate pair from the client display surface 26 to an (X,Y) pixel coordinate pair in the appropriate server bitmap representation 14. If the client 24 performs the mapping, the mapped coordinate pair is sent to the server 22 via the communications path 18 along with the representation level, if multi-level browsing in involved. Otherwise, the client 24 sends the client display surface (X,Y) pixel coordinate pair and the representation level to the server 22, and the server 22 performs the 1:1 mapping.

The server 22 maps the representation-level coordinates to proxy display surface coordinates. This mapping can be a 1:1 process; however, the mapping is not 1:1 where the server 22 has performed transforms from the proxy display surface to each representation level. In this case the server 22 performs an inverse mapping.

Transforms (e.g., scaling) are used to generate different representation levels of a multi-level set. In an inverse mapping of a scaling transform, each pixel in the scaled representation is mapped to a region with sub-pixel boundaries on the proxy display surface 28. This sub-pixel region can cover a part of a single rendered pixel, an entire rendered pixel, or portions of multiple rendered pixels within the proxy display surface 28. In one embodiment, the sub-pixel region is interpreted as a circular sub-pixel region. In other embodiments, the sub-pixel region is interpreted as an elliptical region, rectangular region or other geometric shape.

The server 22 uses this sub-pixel region to generate its own location or selection event(s) on its proxy display surface 28. In one embodiment, the server 22 calculates the centroid, or center of symmetry, of the sub-pixel region. The server 22 then calculates the pixel having the smallest distance to the sub-region centroid (i.e., the center pixel). The proxy display surface coordinates of this center pixel are used as the (X,Y) location for the server-generated events. The proxy display surface 28 is shown twice in FIG. 11 to depict the actions taken by the select "center" pixel step.

In one embodiment, the distance calculation is a standard geometric distance calculation such as: the square root of $(X_1-X_2)^2+(Y_1-Y_2)^2$, where $(X_1, Y_1)$ are the sub-pixel coordinates of the sub-pixel region's centroid and the $(X_2, Y_2)$ are the sub-pixel coordinates of the selected pixel's centroid. If more than one pixel has the same smallest distance (within the error tolerance of the distance calculation), the server 22 selects one of these pixels as the "center" pixel. If the sub-pixel region spans multiple pixels on the proxy display surface, the interface 9 can choose to generate a set of events at a sampled set of pixel locations over the sub-pixel region.

Handling Location Events

In one embodiment, location actions are kept local to the client system 24. This avoids excessive transmission of location events to the server system because there are typically many more location events than selection events. The client 24 differentiates between location and selection events locally so that transmission of location events to the server 22 can be suppressed. Without a local client 24 distinguishing the location events, all events would be transmitted to the server system 22, incurring the delay of the "round trip" response.

In a first approach, the client device 24 maintains a complete representation of the currently displayed client display surface(s) within the memory. This enables the client 24 to handle location events that require painting a different sub-region of the display surface 14 into the client viewport 16 (such as pan, scroll or tiling actions). In a second approach, the client device 24 maintains as many representation levels as possible from a set of multi-level bitmap representations 14 to enable the client 24 to handle switching between representation levels without waiting for the server 22. In a third approach, the client 24 caches representations of previously displayed visual content elements 10. As a result, the client 24 can display a previously cached representation 14 while waiting for a refresh from the server 22. The client maintains an identifier (such as a name, time-stamp and/or content signature), previously supplied by the server, for each cached representation. The client requests the refresh by using the shared identifier, and displays the previously cached version while waiting for any refresh from the server 22. In a fourth approach, the client displays a previously cached representation and waits for the user to request a refresh through the user interface 9.

The mechanisms described above rely on caching on the client 24. In some instances the cached representation is "stale" because it no longer corresponds to an updated proxy display surface 28 on the server 22. The likelihood of a stale cache is increased in the third approach. In one embodiment, the client 24 requests that the server 22 determine if a refresh is recommended, and if so indicates to the user that a "stale" cached version is being displayed until the refresh arrives.

In another embodiment, the client 24 side is designed to handle many location events to avoid transmitting the location events to the server system 22. Selected location events are periodically "echoed" to the server system 22 as discussed below. The selected location events to enable the server system 22 to periodically generate its own location events on its proxy display surface 28 and refresh the client device 24 with updated rendered bitmaps 14. These events also guide the server system 22 in prioritizing which segments of non-overview representations should be sent first, guide the server system 22 in pre-fetching content, and inform the server system 22 that the client 24 is still properly functioning.

"Location-sensitive" visual content responds to certain location events by changing an aspect of the rendered display surface. The server 22 cannot generate location-sensitive reactions when the client 24 does not propagate associated location events. The user experience differs from the user experience in which the client 22 propagates the same location events to the server 22. However, each propagated event requires time and power for the "round trip" of sending location events and receiving updated rendered representations. Enabling the user to make the trade-off is valuable because many of these location-sensitive reactions are secondary to the user's primary purpose of accessing the desired visual content 10. In one example, many location-sensitive reactions provide secondary feedback about the current location, by adding a "glow" to a selected area or displaying a secondary message related to the selected area. The ability to suppress these types of secondary reactions, eliminating the associated processing and waiting, is particularly important in portable wireless devices in which improvements in perceived interactive responsiveness and reduced power consumption can be substantial.

In one embodiment, a client 24 determines whether a location event is associated with a location-sensitive region of the client display surface 14. If the client 24 is not processing location-sensitive events, many of these events can be suppressed by the client 24. This avoids propagation of related events to the server 22 and also avoids further client 24 processing of the suppressed events.

In another embodiment, the client 24 simulates some subset of location-sensitive reactions through any of three methods. First, the client 24 caches the differences in rendered pixel representation(s) of the client display surface 26 when a previous location event has been transmitted to the server 22. If the client 24 determines that the cache is still valid, these same location-sensitive differences can be re-applied by the client 24. Cache validation rules can limit the types of allowed user actions (or other client events) between associated location events. Second, the client 24 can cache a set of location-sensitive reactions sent in advance by the server 22. Third, the client 24 generates its own location-sensitive reactions through the use of proxy client-side visual controls.

Handling Selection Events

In one embodiment of the present invention, selection events are echoed to the server system 22. Selection events are attributed a greater semantic meaning than location events because they indicate an active choice on the part of the user, rather than a relatively passive browsing over the client display surface.

When a selection event is propagated to the server 22, the server 22 generates an equivalent selection event on its proxy display surface 28 (see FIG. 1). A selection event propagated to the server 22 may initiate a function that results in changes to the existing proxy display surface 28 or generation of an entirely new proxy display surface 28. In either case, the server 22 generates updates to the bitmap 14 or multi-level set of derived bitmaps 14 and transmits these updates to the client 24. The client 24 then takes any necessary actions to (i) update copies of the derived representations, (ii) update or replace the client display surface, and (iii) update the painting of the client viewport 16.

Selection events that can be entirely handled on the client device 24 may not be propagated to the server system 22. These non-propagated selection events may include:

a) selection events that indicate a switch between representation levels on a multi-level set of bitmaps 14; and b) selection events generated on proxy client-side visual controls.

On the client device 24, user interface actions are defined for switching between representation levels on a set of multi-level bitmaps 14. These actions generate selection events on the client 24. If the desired representation level has been fully cached on the client device 24, the switch is handled on the client device 24 and the client 24 can avoid propagating the selection event to the server 22. If the user is moving through the representation level hierarchy, caching provides a much higher degree of interactive responsiveness and reduced power drain.

If switches between representation levels are handled on the client device 24, the client 24 can echo a selection event to the server 22, since it contains useful information about current client 24 activity. The server 22 can use the echoed information to anticipate future client 24 requests and prioritize its actions. In one example, a server 22 prioritizes the sending of related segments of other representation levels, or pre-fetchs content related to the selected area of the visual content 10.

If the desired representation level is not available on the client device 24, the client device 24 generates a prioritized request to the server 22 to transmit the desired representation level. If the representation level is partially available on the client device 24, the client 24 generates a prioritized request to the server 22 to transmit the remaining portions of the desired representation level. Client actions while waiting for the desired representation level are implementation-dependent. In one embodiment, the user is given a visual indication of the status and any relevant partial views of the desired representation level are displayed.

Client-side Caching of Derived Representations

When the client 24 is caching derived representations, interface 9 determines which caches are valid and when it is appropriate to request refreshed versions from the server 22. A cache validation scheme can be based on the "age" of a cached representation. The age is defined as the difference between the current time and the time when the cached representation was received from the server 22. In one embodiment, the client 24 requests a refresh when the age exceeds a certain threshold. The aging threshold can be set by the server 22 and sent to the client or, alternatively, be set by the client 24 or the client user.

Client-side caching can benefit from information sent by the server 22. For example, the server 22 can indicate when a visual content element 10 and/or constituent component 12 is "stale." Information relating to the indication can be sent in response to a specific client request or, alternatively, sent by the server 22 based on a history of content requests and a model of expected client 24 caching behavior.

The server 22 can also determine when a visual content element 10 has location-sensitive content and the extent of the visual changes generated by location-sensitive reactions. This information can be sent to the client to help guide its processing of location events.

Server-side Caching of Proxy Display Surfaces and Derived Representations

In one embodiment, the server 22 optionally maintains a cache of proxy display surfaces 28 or derived pixel representations. This cache can improve overall interactive responsiveness and reduce server 22 workload by allowing the server 22 to avoid any or all of the steps of:

a) accessing the visual content element(s) 10 and any constituent component(s) 12;

b) rendering the visual content element(s) 10 and any constituent component(s) 12 to proxy display surface (s) 28; and c) transforming the proxy display surface(s) 28 to multi-level set(s) of bitmaps(s) 14.

Server-side caching can be applied to any or all of the visual content elements 10, constituent components 12, rendered proxy display surfaces 28, and transformed bitmaps 14. At each level, cache validation rules are defined and applied. These cache validation rules, and their application, are implementation-dependent.

In one embodiment, the system performs server-side caching of proxy display surfaces 28, or transformed bitmap representations 14. Server-side caching of these elements can be applied across multiple clients. When multiple clients 24 have access to the same visual content elements 10, or the same constituent component(s) 12, and these are being frequently accessed, server-side caching of display surfaces 28 or transformed bitmaps 14 can be very effective.

By caching proxy display surfaces, the server 22 avoids the access and rendering steps while still being able to serve clients 24 with different display attributes. By caching all or some portion of the rendered display surface, the processing time for access and rendering is eliminated or substantially reduced. By caching transformed bitmap representations 14, the server 22 can quickly respond to multiple client 24 requests for the same transformed representations (when the client's expected display attributes 44 match those used for the transformation).

Furthermore, the coordination of these new caching strategies with more traditional content caching is now possible. Traditional content caching can be coordinated with display surface caching or caching of multi-level transformed bitmaps. This coordination can be implemented through shared server 22 data, where the relationships can be maintained and shared among the various remote browser server 22 functions.

In one example, a small percentage of Web pages account for a very large percentage of Internet access traffic. These highly-requested pages tend to have a high percentage of relatively static content, one or more dynamically-selected advertising banners, and a relatively low percentage (often zero) of other dynamic content. A server 22 can maintain proxy display surfaces caches of these popular Web pages for use by clients. When a single cached display surface can be provided to dozens or even thousands of clients, the total savings in access and rendering time can be quite large.

When multiple clients 24 also share related display attributes, server-side caching of transformed bitmaps can also be very useful. In one embodiment, the processing time for the related transformations can be greatly reduced or even eliminated when the cached versions are used. In one example, a server 22 might be serving a large number of client devices 24 of the same type (such as certain PalmPilot™ models with the same or similar display attributes). When a large percentage of clients 24 for a given server 22 share similar (but not exactly the same) display attributes, the server 22 can cache intermediate transformations, and then apply the final transformation step(s).

Server-side display surface (or transformed bitmap) caching is most efficient when a visual content element is relatively static, or can be treated as relatively static. In many visual content elements with dynamic content, the dynamic content is localized to one or more constituent component(s). If these dynamic constituent components represent distinct sub-regions of the rendered display surface, as if often the case, then the server 22 can segment the cached display surface into static and dynamic sub-regions. The server 22 accesses and renders the dynamic parts.

The server 22 can also treat certain constituent components as static, even though they are dynamic, in order to improve caching efficiency and interactive responsiveness to the client 24. In one example, a dynamically selected advertising banner is treated as a static constituent component. Instead of the banner changing each time if accessed, a single static banner is rendered into the cached proxy display surface. In another example, a single rendered image from a set of animated images (such as animated GIFs on a Web page) is cached.

There are several methods for the server 22 to determine which constituent components 12 have dynamic content, which constituent components 12 will be rendered into separate sub-regions of a segmented proxy display surface, and which constituent components 12 to treat as static. If the constituent component 12 has an associated URL address, the dynamic content can be filtered according to its origin.

In one embodiment, the server 22 accesses and then renders a visual content element 10 or a constituent component two separate times. The rendered visual content is tested for differences and a determination is made as to which (if any) constituent components 12 are associated with these changes. The second access and rendering can be performed immediately, or when a second request is made for a previously cached visual content element 10 or constituent component 12.

For server-side caching of location-sensitive dynamic content, location-sensitive reactions can be ignored. This simplifies the server-side caching function and reduces memory requirements for saving cached representations of different location-sensitive reactions. However, this can prohibit an accurate rendering of location-sensitive reactions.

For any given server 22 (or set of servers 22), the population of clients 24 is associated with a pattern of access. These population-dependent patterns can be factored into caching algorithms of the server 22. In other words, only a visual content element 10 or constituent component 12 that is popular within the client population will be cached.

Cache Refresh Decisions

Cache refresh decisions can be based on one or more of the following approaches: comparing time-stamps between the current visual content element 10 and the cached representation; comparing content-derived "signatures" between the current visual content element 10 and the cached representation; and accessing refresh data associated with the current visual content element 10.

For client caches, each approach involves communicating a short message from a client 24 to a server 22 including an associated client caching data element, followed by a brief message from the server 22 to the client 24 indicating whether a refresh is recommended. This uses only a small portion of the communications bandwidth required to transmit the visual content element 10, or a rendered representation, from the server 22 to the client 24.

To facilitate a time-stamp comparison, the client 24 can store a time-stamp with the cached representation. The server 22 sends this time-stamp when the cached representation is created or refreshed. Then the server 22 compares this cached time-stamp to the time-stamp associated with the current version of the visual content element 10. If the quantified difference exceeds a given threshold, a refresh if recommended. The threshold can be absolute (e.g. 15 minutes) or proportional to the expected time to complete the refresh. In one example, the threshold is set at the greater of 15 minutes or 20 times the expected time complete the refresh.

A "content-derived signature" is a data element 12 computed from a representation of the visual content element 10. A signature can be computed from a source, raster, or multi-level raster representation. A derived representation, such as an overview representation 122 (see FIG. 16), can also be used as a signature. A checksum, or simple error-detection scheme in which each transmitted message is accompanied by a numerical value based on the number of set bits in the message, is one example of a signature algorithm. By comparing the cached and current versions of the signatures, a determination can be made as to whether a refresh should be performed.

Signature algorithms can generate multiple values that represent metrics for different aspects of the content. By comparing corresponding values, refresh decisions can be based on relative differences in one or more aspects of the content.

Signature algorithms can also be processed across selected segments of the representation of a visual content element 10. In one example, a Web page includes pixel regions 124 in which advertising banners are displayed. These advertising banners typically change more frequently than the remainder of the visual content 10. If the location within the source or rasterized representation is known, then it can be excluded from the computation of the signature or given a separate signature.

In one embodiment to facilitate a signature-based comparison, the client 24 stores a signature along with the cached representation of the content. The server 22 sends this signature to the client 24 when the cached representation is created or refreshed. Alternatively, the client 24 computes the signature either when storing the cached representation or as needed. The server 22 can compare the signature sent by the client 24 to the signature associated with the current representation of the visual content element 10. If the difference is over a given threshold, then a refresh can be executed or recommended.

Refresh decisions can also be made based on information contained within or accessible from a visual content element 10. For example, this information can include criteria for making refresh decisions, providing additional refresh-related data, and indicating whether the visual content element 10 should always be refreshed.

Intelligent Manual Refreshes

A manual bookmark refresh can be explicit, such as through a specific user interface action. Alternatively, the manual bookmark can be implicit, (i.e., based on another user interface action) where the user interface action could be, for example, selecting a bookmark for viewing. In one embodiment, an intelligent manual refresh advantageously provides the user with information to determine whether an explicit manual refresh is desirable. As a result, an implicit manual refresh is avoided if the refresh is not actually required.

An intelligent manual refresh is based on a "refresh status" determined according to a cache refresh decision algorithm. The refresh status indicates whether or not a manual refresh is desirable. If the refresh algorithm has computed a measure of the differences between the cached and current representations, the computed difference can be included in the refresh status.

The refresh status can be advantageously used to avoid an implicit manual refresh. If a refresh is not recommended, the cached representation is displayed. If a refresh is recommended, it is performed before the visual content element 10 is displayed. Alternatively, the cached representation is displayed, and then an implicit refresh is performed if the refresh status indicates the need for a refresh. In this case, the refresh is performed while the user is viewing the cached representation.

The refresh status indicator can be incorporated into the user interface. For example, the manual refresh button of a user interface can be rendered in different versions depending on whether a refresh is recommended or not recommended. If the refresh status includes a measure of the differences between the cached and current versions, it can be incorporated into the user interface. In another example, the manual refresh function can be disabled when a refresh is not needed.

Caching of Rasterized Representations

In one embodiment, a rasterized representation can be used for caching regardless of the applied rendering technique. When server-side rendering is employed, rasterized representation can be used as a caching format. When other rendering techniques are used, including combinations of different rendering techniques, a rasterized cache representation can be advantageous. By caching in a rasterized form, the visual content element 10 need not be rendered again when it is retrieved from the cache. This results in faster responsiveness and reduced processing requirements to display a cached visual content element 10.

A rasterized cache representation can be implemented on the client 24, the server 22 or on both the client 24 and server 22. A server cache of a rasterized representation can be delivered to any client 24 that can display the rasterized representation. This can greatly increase the types of clients 24 that can be served with the cached representation, since the client 24 does not have to be capable of rendering the content.

Caching of Multi-level or Combined Representations

In one embodiment using multi-level browsing, a multi-level rasterized representation is saved in a cache. The cached representation can include all representation levels or just selected levels, such as caching only the overview representation 122 (see FIG. 16) level of a multi-level set of representations.

An overview representation 122 is a compact rendering of a visual content element 10. Thus, a large number of overview representations 122 can be stored in the same amount of memory as a much smaller number of detail representations. Overview representations 122 are also typically smaller in size than the source form of a visual content element 10. Since they are compact, overview representations 122 are a more efficient method of storing large numbers of cached items. Their small size also means that they can be more rapidly and more efficiently transmitted from a server 22 to a client 24 in server-side caching.

When a visual content element 10 is requested, the cached overview representation 122 can be supplied from either a client 24 or server 22 cache. The overview representation 122 can be rapidly displayed to the user, improving perceived user responsiveness to the request for a visual content element 10. The overview may be sufficient to avoid the need for any other rendering or transmittal steps.

If another representation (such as a source representation or detail representation) is required, it can be retrieved, rendered and/or transmitted as requested. This is an example of a "multi-part" refresh, where the refresh function is separated by type, or level, of representation. The other representation can come from an original source for the visual content element 10, the same cache as the overview, or a different cache (possibly on a different system).

In a multi-part refresh, the other representation is not retrieved, rendered or transmitted until requested. This saves considerable processing, storage, communications and/or power when only the overview representation 122 is needed. In one embodiment of the multi-part refresh approach, the user can view the overview representation 122 while the other representation is rendered and/or transmitted.

In an overlapped refresh approach, at least one other representation is automatically rendered and/or transmitted after transmission of the overview representation 122. The overlapped refresh approach anticipates a request for the other representation(s), remaining available when the request is actually issued. In one embodiment of overlapped refresh, the user views an available representation, such as an overview, while another representation is rendered and/or transmitted.

Multi-part and overlapped refreshes can start with a representation other than an overview representation 122, following which the overview representation 122 is rendered and/or transmitted at a later time. For example, a detail or source representation can be sent first, followed by an overview representation 122. In this example, the overview representation 122 is cached for future use with a bookmark, perhaps as the only representation saved in the cache.

Multi-part and overlapped refreshes can also be used with combinations of rendering techniques. For example, an overview representation 122 can be sent first, followed by a transcoded source representation, such as a text-related transcoding of the source visual content element or a text-related extraction of hyperlinks and header items, followed by a detail raster representation. This provides a new level of flexibility and responsiveness in a caching strategy. Different representations can be stored and managed using different caching strategies, with other representations accessed (e.g., retrieved, transcoded, rendered and/or transmitted) as needed from their original sources.

Refresh techniques and caching strategies can be applied to selection bookmarks. The selection can be used to limit and/or prioritize a refresh. This can further increasing perceived user responsiveness and reduce processing, storage, communication and/or power requirements.

A selection can also be used to improve the efficiency of a caching strategy. For example, a cache can include a complete overview representation 122 but only the selected region for a detail representation. This can result in significant savings in cache storage requirements while giving the user increased control over the caching strategy. Similarly, a cache of a source representation can be restricted to a transcoded source representation corresponding to the selection.

By computing a signature for the selection region and comparing signatures between the current and cached versions, the need to refresh the selection region can be determined separately from the determination to refresh the entire visual content element 10. This can result in considerable improvements in user responsiveness and overall caching effectiveness if the selected region changes less frequently than the remainder of the visual content element 10, such as for a Web pages that includes advertising banners or other dynamic content that are not part of the selection region.

As previously described, a selection bookmark is most effective when the layout of a visual content element 10 remains relatively constant. A layout is a visual pattern or template. Certain image processing and pattern recognition algorithms can be used to compare two images and provide various metrics of similarity and differences. Other image processing and pattern recognition functions can separate images into regions that approximate the intended major components of the visual layout. Filtered versions of overview representations 122 are often used in such image processing and pattern recognition algorithms.

In one embodiment, an estimation of the probability that the selected region has changed can be made by comparing filtered overview representations of the cached and current representations. This estimate can be used to determine if a refresh of the selected region is required. Furthermore, an estimate can be made of the probability that the overall layout of the visual content element 10 has changed significantly. If the estimate of the probability indicating that overall layout has changed significantly, it may indicate that the selection was based on a previous layout and may no longer be valid.

Refresh techniques and caching strategies can also be applied to transaction bookmarks. This includes refresh and caching optimizations based on selections, as applied to selections made on the reference visual content elements or rendered result visual content elements.

Specialized refresh validation techniques can be applied to transaction bookmarks 111. In one embodiment of a transaction bookmark 111, the pixel locations of input fields and/or triggers are stored with the bookmark 111. The transaction inputs and trigger actions are applied to a current representation based on these stored pixel locations. The surrounding content can change but the input fields and/or triggers need to remain in the same place. If the locations are no longer valid, then the transaction bookmark 111 needs updating before it is processed.

For each pixel region associated with an input field or trigger, a signature can be computed and cached with the bookmark. The signature is computed before any user input is applied. Before the transaction is started, corresponding signatures can be computed on the same pixel regions 124 from the current representation. If the cached versions and the current versions have the same signatures, then the layout of these fields is likely to be the same and the transaction is allowed to proceed. If the input field or trigger signatures are different, then the layout has probably changed and the transaction can be suspended to await user intervention.

In one embodiment, the client 24 and server 22 coordinate caching strategies so that the same bitmap 14 or selected region 124 is cached by both with the same identifier (e.g. name, source location, time-stamp and/or signature). In this embodiment, the server 22 can provide refreshes as a set of pixel differences, if this encoding is more compact than an equivalent encoding of the updated bitmap 14 or selection region 124.

Suppressing, Adding and Substituting Content

In one embodiment of a remote browser system, the server 22 suppresses unwanted content from the rendered proxy display surface 28. Such content can include advertising banners, adults-only content, or otherwise offensive materials. In corporate settings, unwanted content can include content that might not be considered objectionable to the general public but are not considered essential to the business (e.g., stock quotations, Web pages with auctions of consumer items).

Suppressing the unwanted content reduces access time, rendering time and transmission time; however, the overall layout of the rendered visual content element 10 can be affected. In one embodiment, the server 22 can render substitute content into the sub-region of the proxy display surface corresponding to suppressed content. This can still reduce access and rendering times if the substitute content does not have to be accessed over a network. Transmission time can also be reduced if the substitution can be readily encoded and/or compressed before transmission.

In one embodiment, the server 22 can add or substitute sub-regions of a shared proxy display surface. Examples of such additions or substitutions include:

a) "branding" the content 10, such as identification of other content 10 and/or providing the other content 10 (including adding a visible watermark to a sub-region of the display surface, similar to those currently used in television or videos, as shown in FIG. 16);

b) insertion, into the rendered pixel representations, of information which is not visible or readily observable to the user using spread-spectrum watermarking or similar techniques;

c) content deemed desirable by the service provider (including advertisements); and d) content deemed desirable by the user.

The additional content can be treated as part of the visual content element 10 or sent as a separate constituent component 12. If sent as a separate constituent component 12, the client can optionally reserve a specific sub-region of its client viewport 16 for this additional content. This enables the additional content to be displayed regardless of which sub-region of the client display surface associated visual content element 10 is currently visible within the client viewport 16.

In one example, the additional visual content added by the server 22 can be displayed as a separate banner or a "picture frame" around either the client display surface 26 or the client viewport 16. When positioned with respect to the client display surface 26, the additional content is visible when that portion of the client display surface 26 is being mapped to the client viewport 16. When positioned with respect to the client viewport 16, the additional content display is independent of the mapping of the client display surface 26 to the client viewport 16. Control over the display of the additional content can be determined by the server 22, the client 24 (possibly based on user preferences), or cooperatively between the client 24 and server 22.

Consistent application of visible or invisible watermarks to rendered visual content can also be controlled through server-side rendering. Watermarking can be embedded at the bitmap level on the server 22 for consistent generation of watermarked bitmaps. In one embodiment, the watermarking function is not provided by the client. Consequently, the user has reduced opportunity to disable or defeat the watermarking function. However, a visible watermark inserted by the server 22 is only seen by the user when the corresponding portion of the client display surface 26 is mapped to the client viewport 16.

A remote browser system in accordance with the invention can also provide support for content overlays. In this approach, the server 22 sends the content overlay as an additional bitmap image to the client 24. This bitmap image can include per-pixel transparency data (such as an alpha channel) or include pixel values that are interpreted as having transparency values. The client 24 then applies the content overlay to the rendered visual content being displayed (using transparency values, if available and supported), which essentially "embosses" the content overlay over the rendered visual content.

Control over the manner in which content overlays are displayed can be maintained by the server 22, the client 24 (e.g., based on user preferences), or cooperatively between client 24 and server 22. The overlay content can be applied so that it is visible within the client viewport 16, regardless of which sub-region of the client display surface 26 is being presented within the client viewport 16. As the user pans, scrolls or otherwise moves around the client display surface 26, the overlay content can be consistently displayed within an assigned sub-region of the client viewport 16.

The overlay function can be used for "branding" the content by applying the overlay branding mark to the client display surface 26 or to the client viewport 16. For example, a visible watermark can be "embossed" over the lower right corner of the client viewport 16 in a manner similar to the visible watermarks frequently used in television or videos. Alternatively, the visible watermark can be displayed in a sub-region of the client viewport reserved for its display. Such consistently visible branding has marketing value to the content provider or service provider, and can assist in enforcing intellectual property rights in the content.

Since the overlay or other "branding" display function is built into the client-side remote browser, it can more easily controlled than alternatives such as a client-side browser. If the overlay or other "branding" display function is implemented in a more generic mechanism (such as Dynamic HTML, JAVA, JAVASCRIPT, or an ACTIVE X control), the mechanism may not necessarily be supported by the display rendering system. Also, with a more generic mechanism, the user typically has more options to disable or otherwise defeat the branding technique.

A visible watermark 120, regardless of where it displayed within the client viewport 16, can also be used to supply additional information about the content. For example, a visible watermark 120 can display the word "confidential" with the rasterized representation of a confidential document or spreadsheet. A client 24 can be implemented to always display the visible watermark 120 at the same position with a client viewport 16 regardless of any panning or scrolling of the rasterized visual content.

A visible watermark 120 may provide an active visual control in addition to visible branding or content-related information. If the location of the pointing device is over the visible watermark 120, associated user interface actions can be processed by a watermark user interface function. A watermark user interface function can supply special capabilities associated with the watermark 120. These can change the operation of the browsing function and/or change the visual appearance of the client viewport 16.

One example, with reference to FIG. 16, a visible watermark 120 is shown. In this example, the visible watermark 120 is embossed in the upper left corner of the client viewport 16. This visible watermark 120 is used for branding an overview representation 122 of otherwise unrelated content. Using the overview representation 122, the user can select a pixel region 124 for viewing at a detail level.

Figure 17:
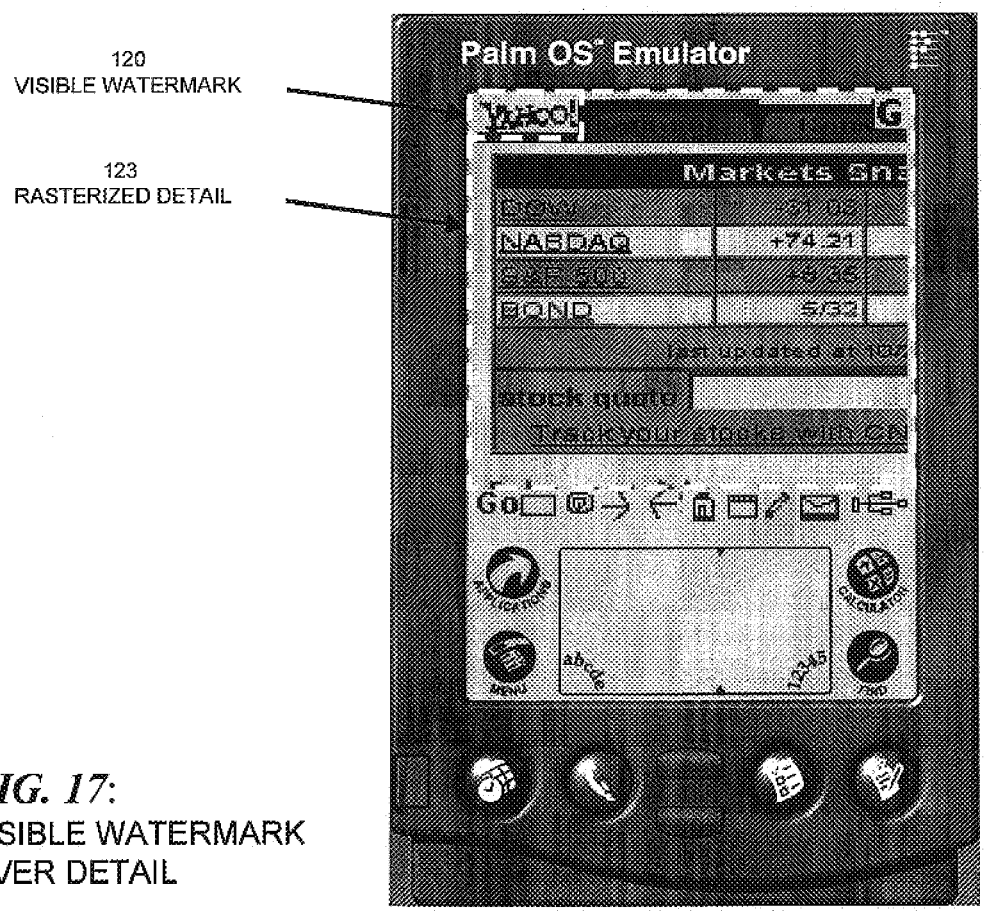
FIG. 17 illustrates an example visible watermark.

In another example, with reference to FIG. 17, the same visible watermark 120 is shown displayed over a detail representation 123 of the same visual content element 10 shown in FIG. 16. The detail representation 123 corresponds to the selection shown in 124 cropped to fit within the client viewport 16. This shows how the visible watermark 120 can remain at a fixed viewport location, independent of the visual content element 10 being displayed, the representation level shown, or the positioning of the rasterized representation within the client viewport 16. This fixed position can be anywhere within the client viewport 16, including a region reserved for its display that is above, below or beside the pixel region displaying the rendered visual content.

Figure 18:
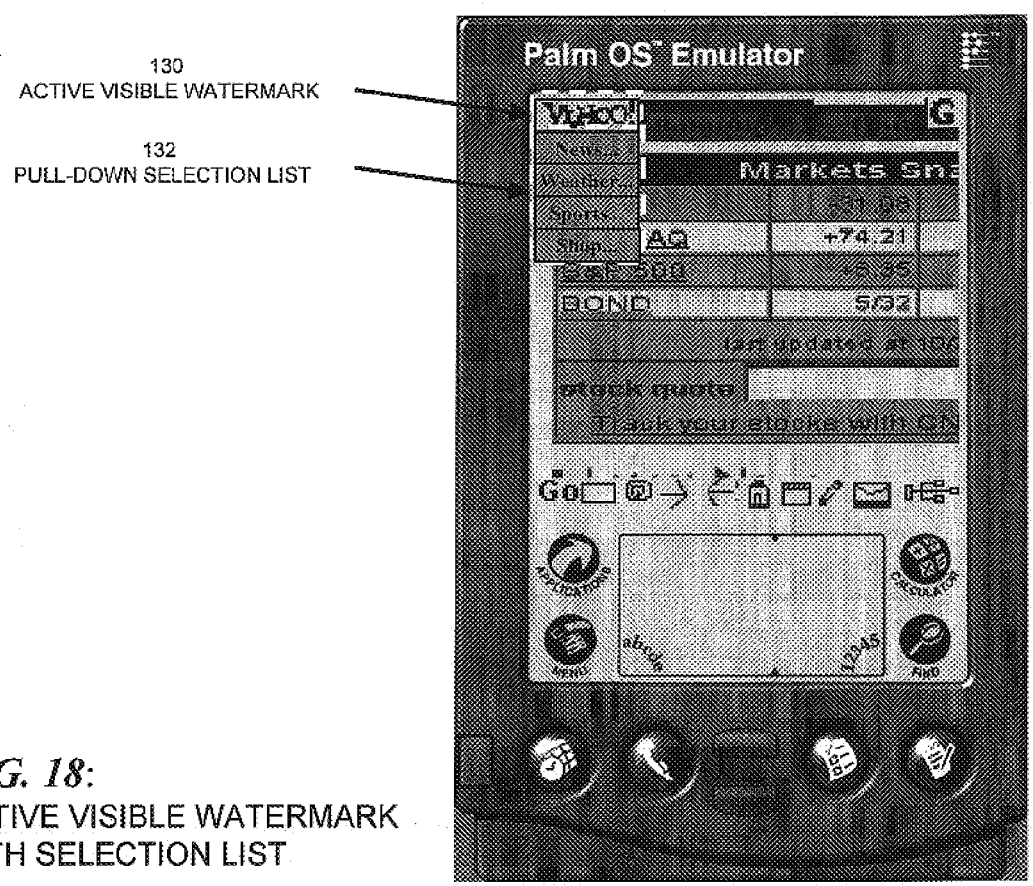
FIG. 18 illustrates an example visible watermark.

FIG. 18 illustrates still another example in which a visible watermark 120 is an active visual control. When the user selects the watermark 130, a pull-down selection list 132 associated with the watermark 130 is displayed. In this example, the pull-down selection list 132 shows a set of possible choices related to the watermark 130. These additional choices can provide additional information related to the watermark 130 or switch the client viewport 16 to a different visual content element 10 associated with the watermark 130. The watermark "owner" has an information or marketing presence that can have considerable value.

The appearance and/or functions of an active visible watermark 130 can change based on its context. Context-related information can include the type of visual content being displayed, the network location of the source representation, and/or the region of the rendered representation being displayed within the client viewport 16. For example, the functions of a branding watermark 120 can change based on the type of page being displayed. The type of page can be determined based on a database that maps the network location of the source to a classification of its content. The server 22 can determine context-related information, and send changes in watermark appearance and/or function sent to the client.

An active visible watermark 130 can act as a navigational element or provide access to a navigational element associated with the visual content element 10 being displayed. On many Web pages, a region of the rendered visual content element 10 is allocated for displaying links that navigate to related pages. This is often referred to as a "navigation bar." If the navigation bar is not visible within the client viewport 16, then the user does not have access to its convenient navigation shortcuts. The visible watermark 120 is always embossed in the same relative position within the client viewport 16 and therefore can provide continuous access to such a navigational element.

Thus, in one embodiment, the server 22 determines if a visual content element 10 has an associated navigational element. This can be accomplished using special data placed within the source representation of the visual content element, such as specialized tags within an HTML document. This data can provide the location of the bitmap image 14 to be used as the watermark 120. If the watermark 120 is to be used as the navigational bar, the data can provide the mapping between the watermark image and the navigational links using a format such as an HTML image map. If the navigational bar is to be displayed as a pop-up when the watermark 120 is selected, then the location of this navigational bar can be provided along with its image map, if appropriate.

In another embodiment, different uses of an active visible watermark 130 can be combined. A branding watermark 120 can be used unless the visual content element 10 specifies either a navigational or information watermark 120. In another example, the branding watermark 120 always has precedence. The server 22 and/or client 24 can determine which usage has priority when there is a conflict.

User Mark-up of the Client Display Surface

The client 24 can support user mark-up of the client display surface. This mark-up can be in the form of character-based messages or bitmap images. Each mark-up is associated with a pixel sub-region of the client display surface 26. This sub-region can be a single pixel or a set of pixels. User mark-up generates derivative content which can be transmitted to the server 22 and associated with the visual content element 10 or a constituent component 12 corresponding to the pixel sub-region of the client display surface 26.

In one example, the client 24 user can use a pen on the client device 24 to draw an ellipse around an area of interest within the client display surface. The user can then command the client device 24 to forward this mark-up to another user. Optionally, verbal or written comment can be added to the forwarded mark-up. Interface 9 interprets these actions, locates and modifies the content in accordance with the user's instructions, and causes the content to be forwarded in accordance with the user's command.

If derivative content has a bitmap image component, it can be rendered as a transparent overlay over the original rendered content. In effect the user draws over the rendered surface in a way similar to drawing on a piece of paper or on a transparency. The overlay bitmap is then rendered and "blended" with the rendered content, leaving the original content unchanged.

When a user mark-up is transmitted to the server 22, it can be stored as a new visual content element 10 or a new constituent component 12. The server 22 can provide additional processing of user mark-up data, such as data reduction services (lossy or loss-less) and rendering services. The server 22 can establish and maintain the relationship(s) between the user mark-up data and the marked-up visual content element 10 or constituent component 12. The server 22 can also notify other systems (including other client devices 24) that new mark-up data is available.

Server-side Location Sampling

In one embodiment, the server 22 provides server-side location sampling, generating its own location events on its proxy display surface 28. These location events are generated at sampling intervals in the horizontal and vertical dimensions of the proxy display surface 28. Server-side location sampling allows the server 22 to generate location-sensitive reactions that can be processed for transmission to the client device 24. The server 22 can cache these location-sensitive reactions for responding to future location events sent by the client device 24.

Server-side location sampling can also be implemented using location events sent by the client. When a client 24 sends a location event, it also reports the associated representation level and the pixel location coordinates with respect to the representation level's bitmap.

As previously described, the representation-level pixel coordinates associated with a client location event can generally be mapped to a sub-pixel region defined on the proxy display surface 28. The server 22 can select a single pixel within the proxy display surface 28 to represent this sub-pixel region, and generate a single event. Alternatively, the server 22 can sample the sub-pixel region and generate one event for each sampled pixel within that sub-pixel region.

Server-side location sampling can also be performed autonomously by the server 22 without a client request, where the server 22 pre-computes location-sensitive reactions. The server 22 determines the sub-pixel region for the sampling, which can be the entire proxy display surface 28 or a sub-region thereof.

The sampling function determines which pixel locations in the proxy display surface 28 should be selected as samples. In one embodiment all pixels that are fully or partially within the sub-pixel region are sampled. In another embodiment, a subset of pixels is sampled based on horizontal and vertical strides, such that every 3–8 pixels partially or totally within the sub-region are selected as pixel samples. The server 22 then generates a series of location events on its proxy display surface 28, one for each sampled pixel location. After each sampled location event is processed and the results rendered, the server 22 compares the rendered proxy display surface 28 to a previous version, e.g., the most recent version prior to the event and/or to the original version before any generated events.

The server 22 may divide the proxy display surface 28 into tiled sub-regions to more efficiently store the computed differences. Tiled sub-regions are effective when the differences are localized to a certain number of tiled sub-regions rather than to the entire proxy display surface 28. Tiled sub-regions are used for many location-sensitive reactions, particularly those associated with Web pages.

In one embodiment, the server 22 compares the differences between the results of each sampled event, to improve efficiency by only storing the differences along with the original bitmap(s) 14. The result is a set of rendered proxy display surface differences. Each difference is a location-sensitive reaction generated by location events for one or more pixel locations on the proxy display surface 28.

The server 22 then determines how to use the set of rendered differences. If the server-side location sampling was performed in response to a client location event, the server 22 determines which (if any) differences to transmit to the client 24. If every sampled pixel associated with the location event generates the same set of differences, then these differences can be used. If the differences vary between sampled pixels, then the server 22 determines which set of differences to use. In one embodiment, only the differences that are common among sampled pixels are used. As a result, any ambiguity between the different location-sensitive reactions is avoided.

The selected differences are used to compute new versions of the bitmap 14, or multi-level set of bitmaps 14 at each relevant representation level. The new bitmaps are then processed for transmission to the client 24. This processing is similar to the original processing of the bitmaps before transmission to the client 24, and can include optional encoding or compression. Encoding, for example, can compute just the differences with the previous version(s) at each representation level allowing the server 22 to send only the computed differences, reducing the amount of data transmitted.

In one embodiment, where the server-side location sampling was performed autonomously by the server 22, the server makes a different set of decisions on how to use the set of differences. The server 22 can cache the differences generated by each pixel sample. Alternatively, server 22 can cache a combined and/or selected set of differences across a set of pixel samples using methods such as selecting the common differences among the set of pixel samples. The server 22 can then keep the cached differences and use them to respond to future client location events.

The server 22 can optionally generate the bitmap representation levels and then stream the cached differences of the representation levels to the client 24. This streaming of representation level differences is performed in anticipation of future client location events. If the cached differences are streamed to the client 24, the client 24 can cache these and rapidly respond to client location events. The server 22 can also use server-side location sampling as part of a mechanism to enable proxy client-side visual controls.

Proxy Client-side Visual Controls

Server-side rendering may include the use of proxy client-side visual controls as an optional extension. Proxy client-side visual controls are implemented to improve the perceived user responsiveness to user input actions on the client device 24, by providing a limited subset of visual controls on the client as an extension to pure server-side rendering.

The server 22 enables proxy client-side visual controls by recognizing a class of visual controls within the visual content element and/or its constituent component(s). The server 22 can recognize a visual control by one or more of the following methods:

a) inspecting and interpreting the data representation(s) of the visual content element 10 and/or its constituent component(s) 12;

b) intercepting "low-level" display commands during the rendering of the proxy display surface 28 that the server 22 can interpret as a visual control; and c) requesting software services from a rendering function 48 for the visual content element 10 and/or its constituent component(s) 12 which identify directly or indirectly a visual control associated with one or more pixel location(s) on the rendered proxy display surface.

In one embodiment, the server 22 recognizes a visual control during one or more of the following processing functions:

a) after accessing the visual content element 10 and/or its constituent component(s) 12;

b) during the function of rendering the proxy display surface 28; and c) while processing a location event or selection event generated on the proxy display surface 28.

Once the server 22 recognizes a visual control, it can send a request to the client device 24 to generate a corresponding proxy client-side visual control. The request by the server 22 to the client 24 includes information that allows the interface 9 to generate such a proxy client-side visual control, e.g., relevant location coordinates for each member of the set of bitmaps derived from the proxy display surface 28. The request to the client 24 also includes the type of control and any relevant attributes, parameters and/or options.

If the client 24 determines that it has the appropriate capabilities, it generates the requested proxy client-side visual control. The client 24 then implements the behaviors of the client-side visual control including any reactions to user input actions. If the behaviors to user input actions are based on a location, then the client 24 uses the appropriate representation-level locations sent by the server 22.

Interface 9 also properly renders the proxy client-side visual control, including any location-based or selection-based visual reactions. The client 24 determines which location events or selection events should be handled entirely by the client 24 (and suppressed from transmission to the server), and which location events should generate equivalent and/or related events to the server.

It should be stressed that the client 24 rendering of a proxy client-side visual control can differ from the equivalent server-side rendering of the corresponding visual control. The behaviors implemented by the client 24 can also differ from those implemented on the server 22. These differences can reflect the unique capabilities or limitations of the client device 24. The overall objective is for the client 24 to preserve the overall semantics of the visual control.

In one example, a client 24 can customize its proxy client-side visual controls to take maximum advantage of a pen-based interface or a telephone-like interface. In another example, the client 24 can customize its proxy client-side visual control for voice recognition or handwriting recognition. In yet another example, a client 24 is customizing a proxy client-side visual control to fit more naturally into the pixel resolution of its bitmap display device.

The client implementation of a proxy client-side visual control can request additional services from the server 22, which in turn can reduce the requirements on the client device 24, while still providing some level of proxy client-side visual controls. For example, the client 24 can request voice-recognition or handwriting recognition services from the server 22 in order to implement a proxy client-side visual control.

If the server 22 supports a structural representation of the visual content element 10 or its constituent component(s) 12, client/server coordination of proxy client-side visual controls can be implemented with respect to the related structural elements. In one example, a Document Object Model (DOM) or XML representation is used as the basis for expressing proxy client-side visual controls and their associated data, inputs and behaviors.

In one embodiment, optional proxy client-side visual controls are limited to pre-defined visual control behaviors using data sent by the server 22. With pre-defined proxy client-side visual control behaviors, the client 24 is not required to implement a scripting language and/or be capable of hosting an executable object. This reduces the software, processing and memory requirements on the client device 24 necessary to support optional proxy client-side visual controls, and also can reduce security and reliability concerns for the user of the client device 24. Processing of programmed (scripted or executable) behaviors can be provided by the server 22 as needed.

Customized Behaviors Based on Content Type

The server 22 may transmit to the client 24 information about the type of each visual content element 10. The server 22 can also transmit to the client 24 information about the type of the constituent components 12. For example, the server 22 may be capable of recognizing when a constituent component 12 is contained within a specific sub-region of the proxy display surface 28. In this approach, the server 22 can also transmit the coordinates of the sub-region to the client 24. Either the server 22 or the client 24 can transform these coordinates into appropriate client display surface coordinates (including any additional transforms when using multi-level bitmap representations). These transforms are the inverse of those previously described for mapping client locations to the proxy display surface.

The server 22 can customize its access and rendering functions based on the content type. For example, specialized techniques can be used for animated or streaming content as previously described. The server 22 or client 24 can choose specialized communications protocols based on the content type. For example, the order in which sections of a bitmap 14 are transmitted, or the prioritization of transmitting different levels of multi-level bitmap representations 14, might depend on content type.

Caching strategies on the client 24 and on the server 22 can also be adjusted based on the content type. Static content, dynamic content, streaming content and animated content can have engender caching techniques. For example, relatively static documents (e.g., spreadsheets, word processing documents) can be cached differently than Web pages or streaming digital video content. The content type can also be used to determine when and how to initiate a remote rendering operation as previously described.

The client 24 can customize its display and its user interface behaviors based on the content type information. The client 24 can also provide different user interface controls for different types of content, and interpret user interface actions in different ways based on the type of content. For example, certain user interface actions could be interpreted as "play," "pause," "rewind," and "fast forward" for streaming content but have different meanings for static content. In another example, the user interface actions to switch between levels of multi-level bitmap representations 14 might differ according to the content type.

Adaptive Client/Server Rendering

An optional extension to a remote browser system is support for adaptive client/server rendering. In adaptive client/server rendering, the choice of rendering mode is partitioned on such bases as "per visual element," or "per constituent component." The selected rendering mode can be client-side rendering, server-side rendering or display-list client/server rendering. The partitioning can be based on the relative capabilities of the two systems, the type of visual content (or type of constituent component), or may reflect a load-balancing approach.

The decision-making function for adaptive partitioning can be:

a) server-controlled (possibly with information previously sent by the client);
b) client-controlled (possibly with information previously sent by the server);
c) cooperatively controlled between the client 24 and server 22 (based on information shared by the client 24 and the server 22; and
d) dynamically controlled (cooperatively controlled on a "per visual content" element and/or "per constituent component" basis).

In one embodiment, the server 22 screens each client 24 request for a visual content element 10 and for constituent components 12. The server 22 also scans all server-initiated requests for visual content elements 10 and for constituent components that are generated as part of responding to a client 24 request. The server 22 applies a set of screening rules to determine:

a) the preferred rendering mode for that visual content element 10 and for constituent component(s) 12; and
b) whether to allow a download to the client 24 of the visual content element 10 and of the constituent component(s) 12.

Screening decisions can be based on criteria such as the type of the visual content element 10, the type of constituent component(s) 12, and its network location. The type can be derived from information such as the Multipurpose Internet Mail Extension (MIME) type available for many Web-based visual content elements 10 or constituent components 12. The network location can be derived from information such as the URL of a Web-based visual content element 10 or constituent component 12. Screening decisions can use rules established by the server 22, supplemented by information sent by the client device 24, or user preferences. User preferences can be either maintained on the server 22 or transmitted by the client device 24.

Rules established by the server 22 may take precedence over client information, and client information may take precedence over user preferences. In this embodiment, adaptive client/server rendering can be server-controlled, cooperatively controlled, or dynamically controlled, but not client-controlled. This allows security and reliability issues to be better managed by the server 22, and for the client device 24 to establish its preferences, capabilities and limitations.

The rendering mode for a particular visual content element 10, or constituent component 12, can be client-side rendering, server-side rendering, or display-list client/server rendering. In accordance with this approach, the default-rendering mode is server-side rendering. If the client 24 is capable of supporting client-side rendering, and the server 22 determines that this is allowed, then the visual content element 10 and constituent component(s) 12 are transmitted to the client 24 along with a request for client-side rendering. If the client 24 rejects the request, then server-side rendering is used. Similarly, display-list client/server rendering can be requested if allowed by the server 22 and supported by both the client 24 and server.

A representative embodiment illustrates the advantages of adaptive client/server rendering. The user views a server-side rendering of an e-mail message which contains attachments rendered as hypertext links. The user clicks on a hypertext link to view the associated document. In current client-side rendering systems, this initiates a download of the associated document and either a "file save" or a client-side rendering of the document. Thus, the client 24 system is exposed to the security and reliability risks inherent in client-side rendering.

In accordance with this example, by contrast, the server 22 performs a server-side rendering of the requested document and starts the transmission of the overview representation of the proxy display surface 28. The user views the overview representation, and can proceed to view the other representation level(s) as they become available on the client 24. In another embodiment, the user is also given the option to download the visual content element 10, or constituent component 12, if the server 22 determines that this is allowed and the client device 24 supports such a download.

From this example, several advantages can be seen. First, the client 24 can view the desired visual content element 10, or its constituent component(s) 12 regardless of the type of client device 24 being used. The ability to view the desired visual content 10 eliminates the limitations of client-side rendering when the client device 24 cannot support the rendering functions. Second, the small size of the overview representation means that it can be quickly transmitted, thus improving the perceived user responsiveness. The client 24 can be working with the overview representation during the overlapped transmission of the other representation level(s). Third, the server 22 takes on the access responsibilities, thereby reducing client software requirements, client processing and memory requirements, client communication requirements, and client power drain. Since the server 22 typically has better communication capabilities (including networking or inter-networking capabilities), overall user responsiveness is generally improved. Fourth, security and reliability can typically be better managed on the server 22 than across multiple clients. The server 22 can actively prevent potentially harmful downloads which can harbor destructive viruses, while still providing the user visual access to the rendered contents. The server 22 can also actively prevent downloads of content 10 having copy prohibition, or insert watermarks (visible or invisible) into the rendered content 10 to assist in tracking the origins of the content 10.

Integrated Remote Frame-buffer Capabilities

A remote browser system can include integrated remote frame-buffer capabilities. Within a single remote browser interface, a user can request remote frame-buffer capabilities to run an application such as a remote window or "desktop" of a remote computer system. A remote browser system offering integrated remote frame-buffer capabilities provides additional protocols to support remote frame-buffer requests and responses. A client 24 handles low-level user interface actions for the remote frame buffer and transmits low-level user interface events to the server 22.

In general, even the server side of the remote frame-buffer operation is not "aware" of the type of content being displayed or the semantic meanings of user actions. This is because the server 22 is simply capturing the pixels displayed by an arbitrary application, application service or system service and transmitting these to the client. While it is possible for a specific application, application service or system service on the server 22 to provide this information and/or support extensions such as proxy client-side visual controls, these are in general not available with a remote frame-buffer operation.

A remote browser system can also provide specialized caching strategies on the client 24 and/or server 22 to better support optional remote frame-buffer operations. For example, more emphasis can be placed on dividing the proxy display surface 28 or client display surface 26 into tiles, caching the tiles on the client 24 or server 22, and sending the differences. This might occur because there are few other generalized caching optimizations available in a remote frame-buffer operation.

Some of the extensions to remote browser systems can also be applied to remote frame-buffer operations. In one embodiment, the server 22 converts its remote frame-buffer into multi-level bitmaps 14 where the client 24 provides appropriate display and user interface methods, providing multi-level bitmap representations 14 to the remote frame-buffer operations. In another embodiment, the server 22 uses information about the expected display attributes 44 of the client display surface 26 to generate bitmaps appropriate for the expected display attributes, thereby reducing the processing burden on the client 24 and potentially reducing the data prior to transmission.

Multi-level Rendering to Multiple Display Surfaces

Multi-level browsing was discussed in detail earlier. This approach, or a similar approach, can be used to generate a multi-level set of derived representations from a single proxy display surface 28. Optionally, at least one of the derived representations can be drawn from a separate proxy display surface 28 rendered from the same visual content element 10. In this case, the transforms to generate the derived representation can be applied during the rendering process to the separate proxy display surface 28, and/or in a separate transform step applied to the separate proxy display surface 28.

In one embodiment, all derived representations are generated from a single proxy display surface 28. In another embodiment, derived representations are generated from one or more separate proxy display surfaces 28. A derived representation from a separate proxy display surface 28 can be used as part of a multi-level set of derived representations, provided that it is derived from a common visual content element 10, or from a copy of a common visual content element 10. A correspondence map (as discussed below) can be used to maintain correspondences between separate proxy display surfaces 28.

Client-side Multi-level Rendering

Multi-level rendering techniques can also be applied to client-side rendering. In client-side multi-level rendering, the client 24 renders and transforms the visual content 10 into a multi-level set of derived representations 14 where each representation derived at a different relative pixel resolution. In one example, bitmap pixel representation(s) 14 at lower relative resolution(s) allows the viewing of an overall layout of the content. The lower level resolution, such as an overview representation serves as an active map of the content and can be used to navigate through that content 10. Decisions, such as user interface selections, made with respect to a lower resolution representation can be used to control the creation, manipulation and/or display of higher resolution representations. This allows the user to use the overview representation as an active navigational map over the rendered visual content, requesting higher levels of detail or alternative representations for selected regions of interest as required.

The mechanisms for multi-level client-side rendering are similar to the mechanism described for multi-level remote browsing. The client 24 can render to a single proxy display surface 28, and then generate one or more transformed bitmaps from this proxy display surface 28. Alternatively, the client 24 can render one or more of the multi-level representations 14 to its own display surface 26 and create the multi-level set of bitmaps 14 from the collection of related renderings of the same visual content element 10.

By maintaining correspondences between pixel regions among all representations within the multi-level set of bitmaps, the client 24 can support user interface operations that select or switch between levels. When the representations 14 are transforms of a common proxy display surface 28, then these inter-representation correspondences are based on the transforms. When the representations are generated from renderings to separate display surfaces 28, then the correspondences are based on the rendering parameters and the specific rendering process.

Rasterized Representations as Active Navigational Maps

Any rasterized representation 14 can be used as an active navigational map over the rendered visual content element 10. In this approach, the rasterized representation 14 is a visual index for the visual content element 10 and any other rendered or derived representation 14 of that content 10, including any representation 14 within a multi-level set of derived representations 14.

As previously described, a pixel region 124 (see FIG. 16) selected on a derived representation can be mapped to an equivalent pixel region of another representation within the multi-level set of representations 14. This is supported by the correspondence relationships maintained across the multi-level set, and allows each member of the multi-level set of representations 14 to play an active role in navigating through the rendered visual content 10 (since selections of pixel regions 124 within the overview have specific semantic meanings).

In an ordinary scaled, or filtered bitmap pixel representation, such as an icon or other type of reduced view, the selected pixel region 124 has no special semantic meaning. In such views, a pixel region 124 has no implied correspondence to an equivalent pixel region 124 within a related representation 14.

For example, selecting an icon by clicking (or by double-clicking) launches the associated application using the associated document. In this example, a click anywhere within the icon has the same meaning (i.e., the application will be launched in the same way regardless of where within the icon the user clicks). In another example, selecting an icon by clicking, or by double-clicking, on a reduced-scale version of a presentation slide can switch to an editing window for the equivalent slide. In this example, once again, a click anywhere within the reduced version has the same meaning.

As explained above, the overview representation 122 may serve as an active navigational map. The pixel resolution of the overview representation 122 allows the viewing of larger portions of the rendered visual content 10, such as the entire useful portion of the proxy display surface 28, while still being large enough to act as an active navigational map. A view of the overall layout and internal patterns within the overview representation 122 allows the user to navigate to the desired portion of the visual content 10 by selecting the pixel region 124 of interest on the overview.

Combinations of Multiple Rendering Techniques

Multiple rendering techniques can be applied to the same visual content element 10 and/or constituent component 12, and the resulting representations 14 used in combination. Rendering techniques such as server-side rasterizing (server-side rendering to bitmap pixel representations), client-side rendering, visual content transcoding with client-side rendering, visual content transcoding with server-side rasterizing, and/or display-list client/server rendering can be combined.

A combined approach provides a way to balance the various advantages and disadvantages of the various rendering techniques under different conditions. In one embodiment of a combined approach, the combination provides the user with alternative means to view, navigate and/or interact with the visual content 10.

Within a combination of rendering techniques that includes client-side rendering of transcoded content, an intermediate transcoding step can be used to customize the visual content 10 to match the capabilities of the client-side rendering process; simplify the visual content to reduce the number and type of functions performed in client-side rendering and/or simplify the resulting rendered representation; pre-fetch and/or aggregate constituent component(s) 12 of the visual content 10 to reduce the number of separate client requests and associated protocol overhead due to client-side retrieval of the transcoded content; and to reduce the total byte count of the encoded visual content to consequently reduce transmission requirements.

Within a combination of rendering techniques that includes server-side rendering of transcoded content, an intermediate transcoding step can be used to customize the visual content 10 to the capabilities of the server-side rendering process; to simplify the visual content 10 in order to reduce the number and type of functions performed in server-side rendering and/or simplify the resulting rendered representation; and to pre-fetch and/or aggregate constituent component(s) 12 of the visual content in order to reduce the number of separate server requests and associated protocol overhead required for subsequent server-side rendering of the transcoded content.

Correspondence Maps In Combined Systems

In a combined system, a correspondence map can be created to relate corresponding parts of the different representations 14. This correspondence map assists in providing functions that require mappings between representations 14, such as supporting a user interface that selects or switches between the different representations 14. For example, the correspondence map can allow the user to select a pixel region 124 on one rendered representation 14 and then view the corresponding region rendered from a different representation 14. A reverse mapping from a second representation to a first representation can also be generated.

Correspondence map(s) are transmitted from the server 22 to the client 24 as required. This allows the client 24 to directly manage mapping functions, including user requests that select or switch between representations. Correspondence maps can include reverse mappings, and can be encoded for efficient transmittal to the client. In one embodiment, the client 24 requests individual mappings from the server 22 based on location or selection events processed by user interface 9.

There are four types of possible correspondence maps, each type based on the type of representation being mapped. The representation can be a "source" representation or "raster" representation. A source representation encodes visual content 10 in a form suitable for later rendering. HTML documents and MICROSOFT WORD documents, are examples of source representations. A transcoding operation receives the source representation and generates a transcoded source representation. A raster representation, as explained above, is a bitmap pixel representation 14 of rendered visual content. The raster representation 14 is typically the bitmap pixel output of the rendering process, but it can be any bitmap pixel representation (such as a source image).

The four types of correspondence maps are source-to-source maps; source-to-raster maps; raster-to-source maps; and raster-to-raster maps. Source-to-source maps describe the correspondence from one source to another, related source. The correspondence can be positional, such as relating the positions of the two sources, or structural, such as relating structural elements of the two sources. Source-to-source maps are typically used to map transcoded visual content element 10 with the original source representation.

Referring to FIG. 12, source-to-raster maps 106 describe the correspondence between a source element and a rendered representation of the source. Each entry in the map provides a positional and/or structural reference to the source representation, along with a corresponding pixel region 124 the raster representation. A source-to-raster correspondence map can be generated as a by-product of the rendering function. (Some rendering functions provide programmatic interfaces that provide source-to-raster or raster-to-source mappings 104.) Raster-to-source mapping 104 is the inverse of a source-to-raster mapping 106.

Raster-to-raster maps 102 describe the correspondence between pixel regions 124 within two related raster representations 14. If the corresponding pixel regions 124 are related through one or more transform operations, such as scaling, then these transform operations can be referenced within the correspondence map.

Thus, a correspondence map allows correspondences to be made between related areas of different but related representations. Correspondence maps support functions such as switching or selecting between related representations, based on a "region of interest" selected within one representation. Correspondence maps are also used to process user input gestures in which a pixel location on one raster representation is related to a different related raster or source representation.

Referring to the example depicted in FIG. 12, an entry in a raster-to-raster map 102 relates an overview representation 122 to a detail representation. An entry in the raster-to-source map 104 maps the detail representation to the corresponding segment of the source visual content element 10. An entry in the source-to-raster map 106 relates the source visual content element 10 to the text-related rendering.

In another embodiment, related correspondence maps are "chained." In one example, a source visual content element 10 is first rendered to one raster representation and then transcoded to a source representation. When the transcoded source representation is rendered, the rendering process can generate its own correspondence map. Chaining can be used to identify any correspondences between the raster representation and the transcoded raster representation. The first raster-to-source map 104 can be chained to the transcoded source-to-source map, which in turn can be chained to the second source-to-raster map 106.

Correspondence maps have an implicit resolution related to the density of available mapping data. At higher resolutions, there are a higher numbers of possible mappings. The resolution determines the accuracy of the mapping process between a given region in one representation and the corresponding region in another representation.

The density of the mappings can vary across different regions of the representations, resulting in variable resolution of the correspondence maps. The client 24 (or server 22) can interpolate between entries in the correspondence map in order to improve the perceived resolution of the mapping process. A technique such as location sampling can be used to initially populate or increase the density of the correspondence map.

Some areas of the representation may have no direct correspondence to a different representation. This can occur, for example, when an intermediate transcoding operation removes some of the visual content data from the transcoded representation. Such areas can be processed using an interpolation function, or treated explicitly as areas with no correspondence.

In one embodiment yielding improved user responsiveness, a correspondence map is separated into multiple segments based on defined sections of the mapped content and/or multiple resolution levels. By segmenting into multiple resolution levels, a lower resolution map is created and is then augmented by segments that provide additional resolution levels. Segmenting can be accomplished so that a smaller map is first transmitted and made available for use by the client 24. Subsequent segments of the map can be transmitted later, or not transmitted at all, based on the relative priority of each segment using factors such as current or historical usage patterns, client requests and/or user preferences.

In another embodiment, the client 24 requests individual correspondence mappings from the server 22 based on events processed by user interface 9.

Combining Server-side and Client-side Rendering for Multi-Level Browsing

In one embodiment, server-side rendering is combined with client-side rendering to create a multi-level browsing environment. The rendered overview representation is generated by server-side rendering. The equivalent of the rendered detail representation (highest relative pixel resolution) is generated by the client 24. Either the client 24 or server 22 can generate an intermediate level representation, as required.

Client-side rendering can be performed on the original visual content element 10, or on an intermediate transcoding of the visual content element 10 provided by the server 22. If the server 22 performs an intermediate transcoding operating, then it can also generate an appropriate source-to-source correspondence map which can be transmitted to the client 24. The server 22 can also generate and transmit to the client 24 the raster-to-source map 104, and/or source-to-raster map 106, mapping(s) between the rasterized representation(s) generated by the server 22 and the source representation (which can be a transcoded representation).

In one embodiment, the overview representation 122 is transmitted from the server 22 to the client 24 before the source representation (or transcoded source representation). As explained previously, this allows the client 24 to display the overview representation 122 before starting the process of receiving and rendering the source representation. Because the overview representation 122 is typically smaller than the source representation, this improves the perceived user responsiveness. The user can be viewing the overview representation 122 while waiting for the source representation to be transmitted and rendered.

Combining Rasterizing and Text-related Transcoding

Server-side rendering can be combined with transcoding to provide an alternative representation of the text-related content within a visual content element 10. Alternatively, client-side rendering can be combined with transcoding to provide an alternative representation of textual content within a visual content element 10. Both approaches are variations of multi-level browsing. The textual representation is used in place of (or in addition to) the rasterized detail representation level. These combinations allow textual content to be viewed, navigated and manipulated separately using a client viewport 16 and/or a user interface optimized for text. The correspondences between the text and the overall design and layout of the content, including the relationships between the text and non-text aspects of the visual content textual are preserved.

Figure 13A:
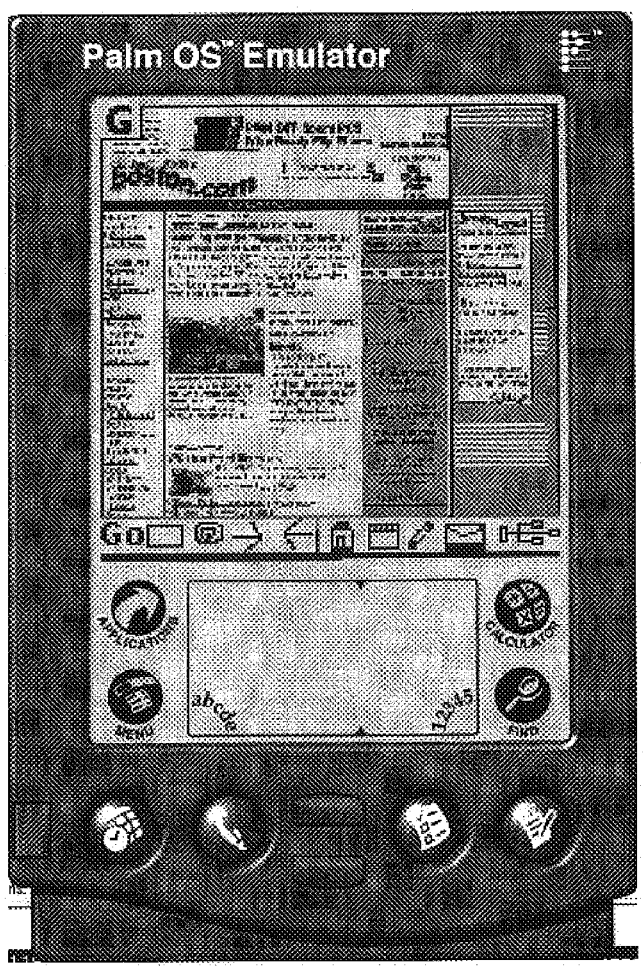
FIGS. 13A–C illustrates client-device representations.
Figure 13B:
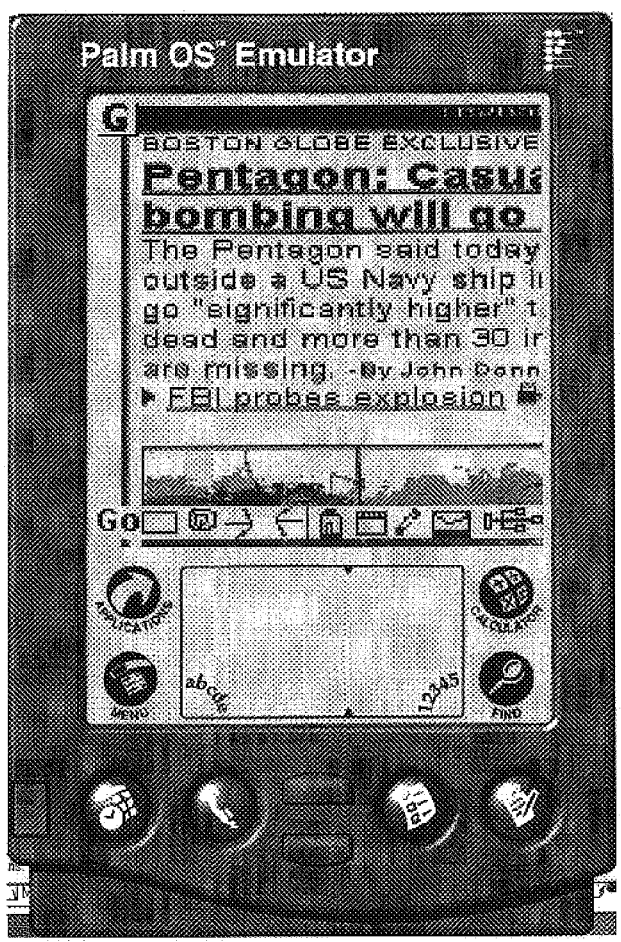
Figure 13C:
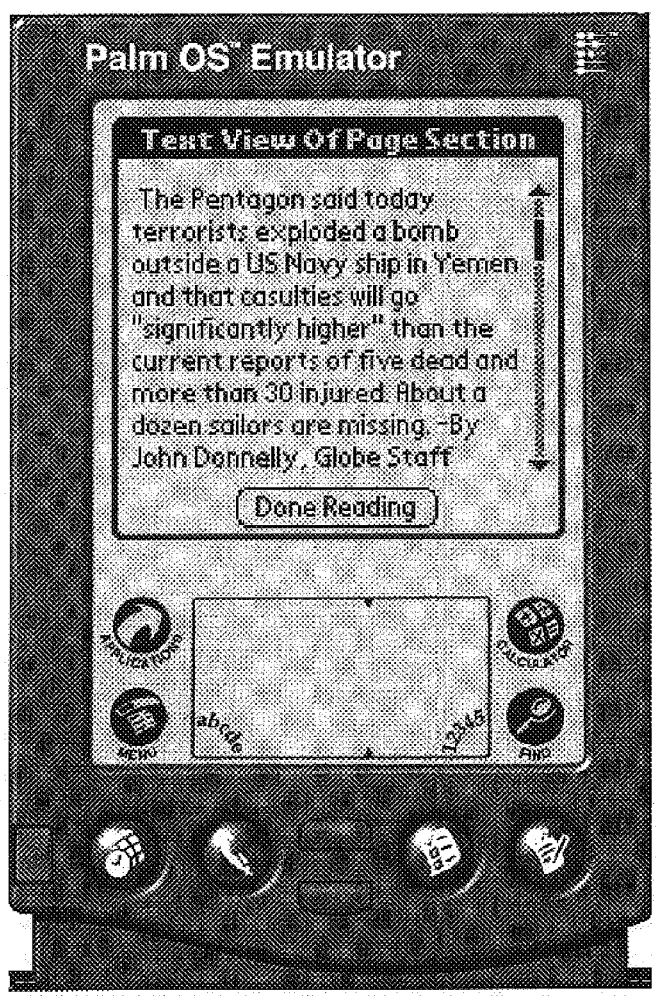

FIGS. 13A to 13C refer to an example in which rasterizing is combined with transcoding. A rasterized overview representation 122 of a Web page is shown in FIG. 16A. A rasterized detail representation of the Web page is shown in FIG. 16B. The detail representation is presented within the client viewport 16. The user can pan or scroll within the viewport 16 to see the full detail representation. A textual version of the Web page is shown in FIG. 13C. The display allows word-wrapping and includes a scroll bar for scrolling through the text.

An intermediate transcoding step can be used to extract the text embedded in the visual content 10 and store the text in a transcoded representation. The transcoded textual content can then be rendered by the server 22 and/or the client 24. If the server 22 performs the transcoding function and the client 24 performs the rendering of the transcoded content, then the transcoded content can be transmitted to the client 24 for later rendering.

The textual aspects of the visual content 10 can include the text and certain attributes related to the text. Textual attributes can include appearance attributes (e.g., bolding, italics, text sizing) and structural attributes (e.g., new paragraph indicators, heading indicators, associated hyper-links such as HTML "anchor" tags). Text formatting, such as list and table formats, can also be included in the textual transcoding. The transcoded textual content can be represented in any suitable format including text strings.

The textual transcoding can be performed as part of a general transcoding function that supports additional structural attributes such as forms (e.g. HTML forms) or other specifications for visual controls to be rendered in the textual representation. In addition, an alternate version of the visual content element 10 more suitable for text-related rendering may already exist and can be used instead of transcoding.

The text rendering function 48 (see FIG. 3) can substantially improve the readability and usability of the text portion of the visual content 10 by providing word-wrapping functions tailored to the client viewport 16. Additionally, control over text fonts and/or font sizes can be provided.

During the transcoding process, one or more correspondence map(s), including raster-to-source maps 104 and/or source-to-raster maps 106, can be generated to map the relations between the rasterized representations and the extracted textual transcoding of the visual content 10.

In one embodiment, a server 22 performs the transcoding function and the client 24 performs the rendering of the transcoded content. The relevant correspondence maps relating the rasterized representation to the text-related representation can be transmitted from the server 22 to the client 24. Consequently, the client 24 can directly manage user requests to switch between representations. Alternatively, the client 24 can request the appropriate mappings from the server 22 when switching between representations. If reverse-mapping from textual transcode to rasterized version is supported, the relevant correspondence map can also be transmitted to the client 24. The client 24 provides the mapping between the textual transcoding and the subsequently rendered bitmap under the client-side rendering process.

If the server 22 performs the transcoding function, the server 22 can retain certain visual content data 12 removed and/or altered during the transcoding process. This allows the server 22 to provide additional capabilities that are not delegated to the client.

For example, the textual transcoding can include information that a region of text has an associated hyper-link. The server 22 can retain the data that identifies the "target" or associated URL of the hyper-link while sending the client 24 a more compact identifier for the "target" information. In this example, the client 24 sends hyper-link requests to the server 22 so that the server 22 can access the associated data and perform the hyper-linking function. Consequently, the amount of data transmitted to the client 24 and the client's required capabilities are reduced.

If at least one of the rasterized representation(s) 14 is at a lower pixel resolution relative to the textual representation, then multi-level browsing between the rasterized representation and the rendered text-related representation can be facilitated. The textual representation can be used instead of, or in addition to, the rasterized representation at the higher pixel resolution.

In one embodiment, at least one rasterized representation is used as the overview representation 122. This overview representation acts as an active navigational map over the text representation and any other rasterized representation at higher relative pixel resolution. A pixel region 124 selection within the overview representation 122 can be used to select a corresponding part of the rendered text representation. The appropriate correspondence maps can also be used to select the rendered text-related representation or a corresponding pixel region 124 of a rasterized representation.

In a combination of rasterizing and textual transcoding, the sequence of generating and/or transmitting the different representations can be dynamically altered. Substantial improvement in the perceived user responsiveness, processing resource utilization and/or communications capabilities can be realized. Decisions can be based on factors such as historical or current patterns of user access to the visual content, the type of visual content element 10 and/or its constituent components 12, and/or user-supplied preferences.

Once again, a rasterized overview representation 122 can be generated and, if required, transmitted. The extracted textual transcoding can be performed prior to generating one or more higher pixel resolution rasterized representations. In this case, access to the underlying text can be provided before the higher resolution rasterized representation is available. Since both the overview representation 122 and the textual transcoding relatively small in size compared to the higher resolution rasterized representation, perceived user responsiveness is improved.

In another example, the textual representation can be generated and, if required, transmitted first, making the text-related representation available earlier in time. Generations of the rasterized representations can be interrupted if the user determines they are not necessary based on the textual representation.

Either the client 24 or the server 22 can generate the rasterized representations, depending on the rendering technique used. The transcoding of the text-related content can be done either by the client 24 or the server 22. Furthermore, if the server 22 performs the transcoding, then either the client 24 or server 22 can render the transcoded representation. In a server-side rendering of the text-related transcoding, word-wrapping and font attributes can be based on client display attributes 44 (FIG. 9) stored on the server 22. These client display attributes 44 can be augmented with information supplied by the client, including any user preferences and/or changes to client viewport 16 attributes for displaying the rendered text-related representation.

Combining Rasterizing with a Text-related Summary Extraction

When an overview representation 122 is displayed by user interface 9, this display can be supplemented with additional information taken from a text-related summary extraction of the associated visual content element 10. The summary extraction is a transcoding function that extracts text-related data providing summary information about the visual content element 10. In one embodiment, this includes any titles; "header" text elements; and text-related representations of hyperlinks.

In response to a location or selection event processed by the user interface 9 that requests summary information, the corresponding summary text can be rendered and displayed by user interface 9 in client viewport 16. As a result, the extracted summary text is "revealed" to the user while selecting or moving across the overview representation. The "revealed" text can be rendered and displayed in a pop-up window over the client viewport 16, or in a designated location within the client viewport 16. User interface 9 can provide a mechanism to select and process a "revealed" hyperlink. This can select or switch to a rendered representation of the visual content element 10 referenced by the hyperlink.

The summary representation is typically much smaller than either a text-related transcoding of the entire visual content element 10 or a detail raster representation. If the server 22 provides the overview and summary representation, it can transmit the summary representation after the overview representation. Alternatively, the client 24 can request individual location-oriented summary extractions from the server 22 when user requests for summary information are processed by user interface 9. If the server performs the summary extraction, it can encode hyperlink "targets" as more compact identifiers, to further reduce the size of the summary representation transmitted to the client.

Dynamic Selection within a Multi-level Set

In multi-level browsing, a user interface can be provided to control the generation and viewing of the different representation bitmaps. In one embodiment, user interface 9 may facilitate dynamic selection of a region of interest on an overview representation 122 followed by display of the corresponding pixel region 124 at the detail level. Selection or viewing can be performed using the intermediate representations if the multi-level set of bitmaps has one or more intermediate levels.

With typical visual content 10, the user has a specific region of interest that can be a small percent of the rendered content. In one example, the user might only want to use a search box, get a stock quotation, see the five-day forecast, or view the headlines within a multi-purpose Web page. A dynamic selection approach allows the user to view the overview or intermediate representation, select a region of interest, and display the region of interest at a detailed level.

The dynamic selection approach also allows a user to obtain a display of a detailed region of interest quickly without requiring the entire visual content element 10 to be downloaded from the server 22. Dynamic selection eliminates the need for the user to scroll through a detail-level rendering to find the region of interest. The overview provides an active navigational map for a small area, and the detail viewport 16 can be automatically positioned to the corresponding region of interest.

Dynamic selection is particularly useful in any device with a lower resolution display screen than a conventional personal computer. Dynamic selection is equally useful when the detail representation is being viewed within a relatively small viewport 16 on any type of device, since the tedium of panning or scrolling within this viewport 16 to the desired region of interest is eliminated. The rendering technique used for the detail representation can be set by user preference. In some cases, the user may desire a raster extraction technique. In other cases, a content extraction or transcoding technique (such as a text-related transcoding) might be preferred. User interface 9 can allow the user switch back and forth between rendering techniques, allowing some dynamic selections to be made using one technique and others using a different technique.

In another embodiment, viewing the dynamically selected region of interest with two or more rendering techniques can also be supported. For example, a news article with photographs or illustrations can be viewed both with a raster extraction of the detail to see the detailed overall layout with the text and images and with a text-related content extraction to more easily read the text portions of the article. Such an example is shown in FIGS. 14A–14E.

Figure 14A:
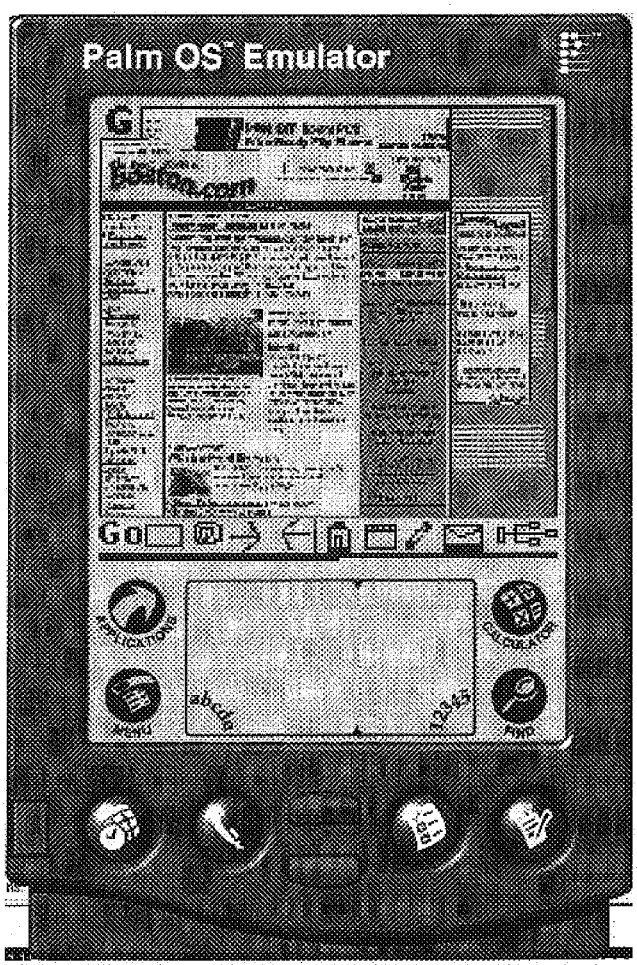
Figure 14C:
Figure 14D:
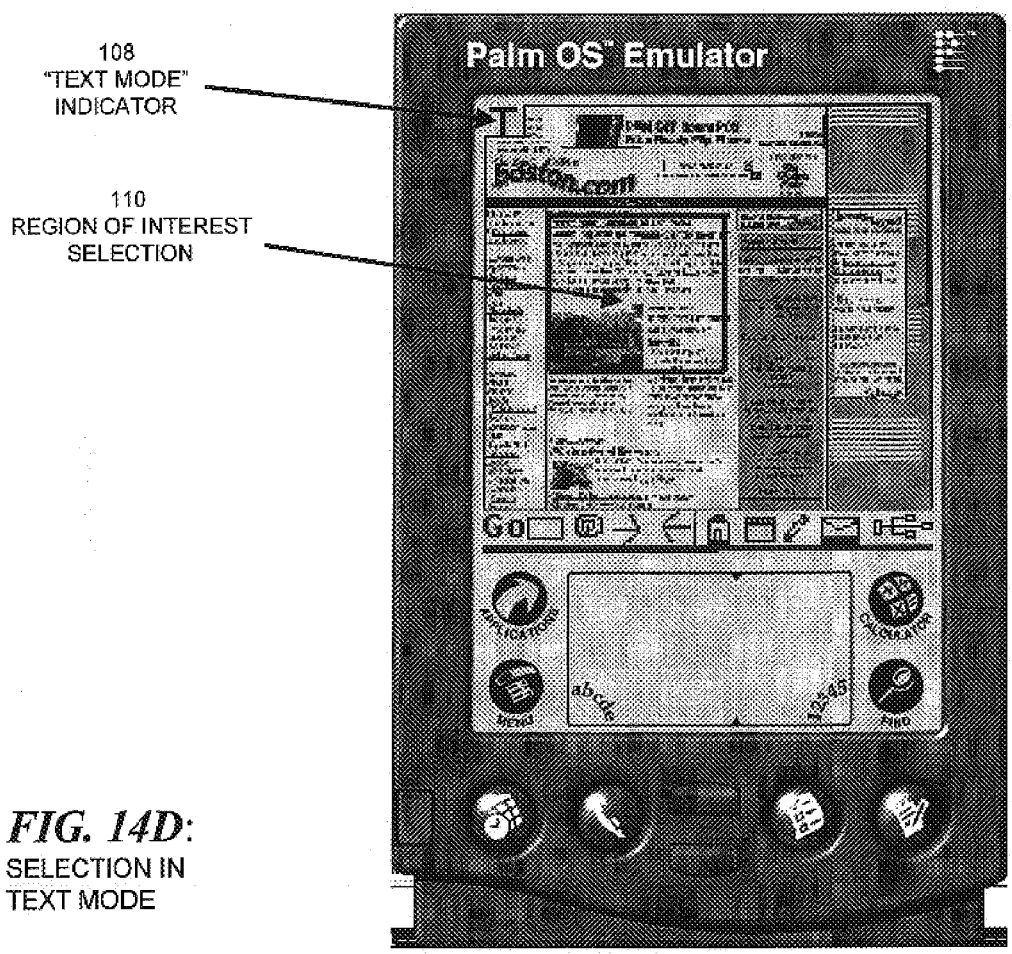
Figure 14E:
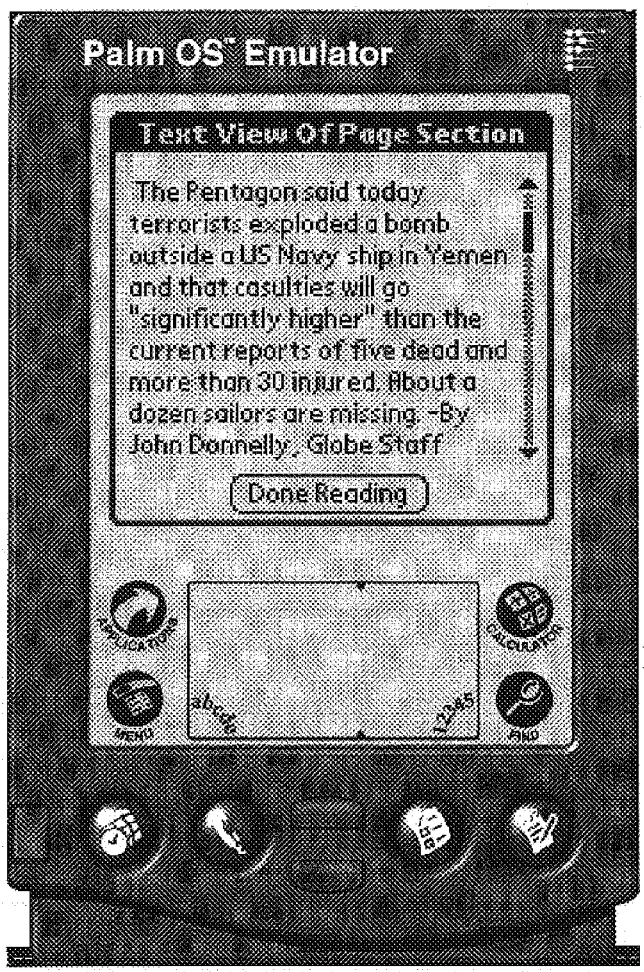

An overview representation 122 of a Web page is shown in FIG. 14A. Based on user selection, a bounding box over a region of interest is displayed in FIG. 14B. In this example, both a "graphics" (raster extraction) and a "text" (text-related rendering of a source extraction) mode may be available. The "G" in the upper right hand corner of FIG. 14B indicates graphics mode. The requested detail representation of the selected region of interest is shown in FIG. 14C. This detail representation is placed within a client viewport 16, and the user can either pan or scroll to see the remainder of the selected region. The user can also switch to "text" mode, as shown in FIG. 14D, with the upper right hand indicator changing from "G" to "T." The resulting text-related display of the selected region is shown in FIG. 14E, with the user able to scroll up and down the word-wrapped rendered text.

In one embodiment with dynamic selection using raster extraction, some or all of the detail representation is already available. This allows the processing to be optimized. If the transformed detail representation of the dynamically selected region of interest is already available, it can be used directly. If only portions of the dynamically selected region are already available, then only those remaining portions within the selected region of interest need to be generated. If a relevant proxy display surface 28 has already been generated for the entire visual content element, then only the transform and possibly transmission functions need to be performed.

In another embodiment with dynamic selection, the overview representation 122 is generated by server-side rendering. The rasterized overview representation 122 is relatively small and can be rapidly transmitted for viewing on the client. Dynamic selection is then implemented on the client, with the coordinates for the selected region of interest sent to the server 22. The server 22 can then generate the extracted detail (in the desired form, source or raster) corresponding to the selected region of interest, and transmit this to the client. Since the user determines the selected region, the user controls the trade-off between amount of detail requested and the relative transmission time for sending this detail from the server 22 to the client.

Dynamic selection gives the user control over perceived user responsiveness when viewing selected detail of a visual content element 10. This is not available in traditional client-side rendering, where the entire visual content element 10 must first be downloaded from the server 22 to the client 24 and then entirely rendered by the client. In traditional client-side rendering, the user cannot view the detail of a selected region of interest until the full download and rendering is complete.

The impact of increased user responsiveness from dynamic selection is generally proportional to the relative speed of the communications link 18 between the server 22 and client. Dynamic selection has increased value when used with relatively slower communications links 18. Even with relatively faster communications links 18, there are advantages in transmitting no more detail than required, and in prioritizing the detail that is of greatest interest.

While selections can be based entirely on user inputs, an analysis of the visual content element 10 in source form and/or raster form can assist in the selection process. For example, an analysis of the source can determine if there are structurally related elements that surround the segment of the source corresponding to the selection. These can be automatically included in the selection, with the user receiving visual feedback of the new selection region, or they can be included as automatic extensions to the specified selection without changing the selection region.

If the layout of a visual content element 10 is a visual pattern or template, an image processing analysis of the rasterized visual content can determine if the selected region is surrounded by visually similar content. Conventional image processing and pattern recognition algorithms can separate images into regions that approximate the intended major components of the visual layout. Filtered versions of overview representations 122 are often used as inputs to such image processing and pattern recognition algorithms. For example, edges of content areas are determined as sharp changes in a gradient that is computed across the filtered overview representation 122. If the selected region is near a contour boundary, the selection can be extended to these visually similar surrounding areas. These surrounding areas can either be included in the selection, with the user receiving visual feedback of the new selection region, or they can be included as automatic extensions to the specified selection without changing the selection region.

Composite Visual Content and Composite Bookmarks

A bookmark to a composite visual content element 10 (a "composite bookmark") can be defined in a manner similar to a selection bookmark. A composite bookmark can have multiple references to different visual content elements, each with its own selection region. In addition, a composite bookmark can specify multiple selection regions for the same visual content element 10. Caching and refresh methods can be applied to each visual content element 10 referenced in a composite bookmark.

A composite transaction bookmark 111 is a composite bookmark that includes specifications for one or more transactions related to one or more "reference" visual content elements. Caching and refresh methods can be applied to each visual content element 10.

Composite Page Construction using Rasterized Visual Content

A user interface can be provided to facilitate creation of a composite visual content element, composite bookmark and/or composite transaction bookmark. A "composite page construction" process, in accordance with one embodiment, can assist in creating a specification for a composite page. This specification can be used for dynamic creation of a composite visual content element, or can be stored as part of the specification for a composite bookmark or composite transaction bookmark.

Figure 19:
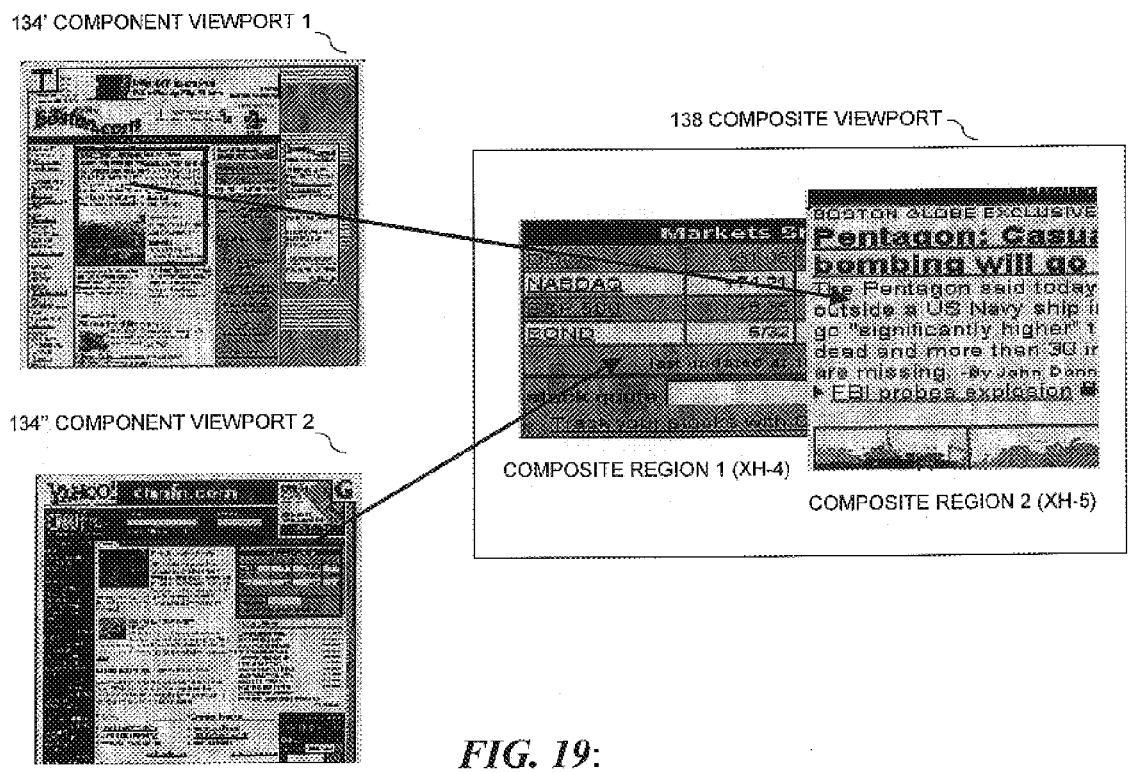
FIG. 19 illustrates an example composite page construction.

The composite page is a visual content element 10 composed of multiple pixel regions taken from rendered representations of other visual content elements 10 or their constituent components 12. With reference to FIG. 19, each constituent component 12 of the composite is displayed as a rasterized representation within its own "component" viewport. The user interface implements visual feedback to facilitate selection of a rasterized pixel region 124 within a component viewport 134. This selection can then be marked for inclusion in the composite visual content element, composite bookmark or composite transaction bookmark. Since the composite is formed from rasterized representations, any pixel region 124 from any rendered visual content element 10 or its constituent component(s) 12 can be used.

A separate client viewport 16 can be provided for viewing the composite. The composite viewport 138 is a rasterized representation of the composite visual content element, composite bookmark or composite transaction bookmark 111 being created. A user interface mechanism, such as "drag-and-drop" or "cut-and-paste" can be used to assign a selection region from a component viewport 134 to a selection region within the composite viewport 138.

In FIG. 19, a new visual content element is defined that contains a rasterized headline region from one visual content element and a rasterized stock market table from another visual content element. When the composite bookmark is refreshed, it will contain the rasterized current headlines from the first component and the rasterized current stock data from the second component.

In the illustrated example there are two component viewports 134', 134" and one composite viewport 138. The component viewports contain overview representations 122 of visual content elements 10 while the composite viewport 138 is at a detail level. In each component viewport, a black rectangle represents a selection region. A composite selection region can have the same pixel dimensions as the corresponding component region. However, the composite page construction function can support mapping specifications between corresponding selection regions. This mapping can include parameters for cropping and/or scaling functions.

The composite page construction function can support composite selection regions that are overlapping. One technique for managing overlap is to assign a "z-order" to each composite region as part of the composite's specification. When rendering the composite visual content element, the relative z-order determines the order in which the regions are composed to form the final rasterized representation.

A constituent component 12 of a composite can take any appropriate form, including source, raster, or another composite. In one embodiment of composite page construction a composite region is mapped to the entire rendered representation of a constituent component. Such a composite region can be specified at a fixed size or at a size relative to the rendered representation of the constituent component. The mapping specification can include any appropriate cropping and/or scaling operations.

In one example, a composite bookmark specifies that one rendered visual content element 10 is to be composed with a selection region from a second rendered visual content element 10. When the bookmark is refreshed, the two visual content elements 10 are rendered. The entire raster representation of the first visual content element 10 is mapped to one composite region. The specified selection region from the rendered representation of the second visual content element 10 is mapped to a second composite region.

Rendering and Display of a Composite Visual Element

When a composite visual element is rendered and displayed, a user interface for the rendered composite can treat each composite region as a viewport over the associated component rendered representation. Such a viewport interface can provide viewport functions such as panning, scrolling and/or zooming of the component rasterized representation within its respective composite region. This type of interface can extend the viewable area of the rasterized component beyond the specified selection region. In this way, the component selection region can be set to a prioritized viewing area while the viewport function provides the ability to view other portions of the rasterized component.

Adaptive Rendering for a Handheld Environment

In one embodiment of the present invention, adaptive rendering techniques can be used to combine server-side rendering, summary extractions, text-related transcoding and client-side rendering of small screen content. Small screen content is content specifically formatted for layout on a small screen (typically 320×240 or less in pixel dimensions). Examples of small screen content formats include the Wireless Markup Language (WML), Compact HTML (as used in the I-mode system), and the proposed XHTML Basic standard. The server 22 determines if the client 24 can support client-side rendering of a small screen format. If the client 24 does support client-side rendering of small screen format, then adaptive rendering can be used to send content in the supported small screen format(s) to the client 24 for client-side rendering.

The server 22 can also determine if an alternative version of the visual content element 10 is available in a small screen format. In this case, the server 22 can decide to use the alternative small screen version for client-side rendering. The server 22 can also decide to provide server-side rendering of the content in its original format while also providing the alternative small screen version to the client 24 for client-side rendering.

If an alternative version of the visual content element 10 is available in a small screen format, but the client 24 does not support client-side rendering of this format, the server 22 can decide to provide server-side rendering of the small screen version. This can be done as an alternative to, or in addition to, server-side rendering of the original format. Server-side rendering of a small screen format can also be provided even if the client 24 supports client-side rendering of this format.

Server-side rendering of the content may be provided for visual content that is not in small screen format. Multi-level browsing can also be provided, as appropriate. This can be supplemented with a summary extraction along with text-related transcoding of the content or selected segments of the content. The transcoded text-related content can be rendered on the server 22 using server-side rendering, or sent to the client 24 for client-side rendering. The format of the text-related content can be represented in a specialized format, a subset of a standard format, such as HTML, or in any one of the small screen formats.

For text-related transcoding, the server 22 can decide to include in the transcoded representation structural attributes and/or constituent components 12 that go beyond text-related content and attributes. This can increase the amount of information available in the transcoded representation, although it can also increase the total size and complexity of the transcoded representation. The rendering technique for the text-related transcoding can determine which attributes and constituent components 12 to render.

The use of a small screen format for a text-related transcoding can provide certain overall economies and efficiencies within the total browsing system. In one example, a small screen version of the visual content element 10 might already be available, perhaps in a cache. Using this version can avoid the processing of a special text-related transcoding. In another example, a client device 24 can use existing small screen rendering software if the text-related transcoding uses the appropriate small screen format. This avoids requiring the client device 24 to support specialized software for rendering the text-related transcoding.

Through adaptive rendering of small screen content combined with server-side rendering, summary extraction and text-related transcoding, the system of the present invention provides a total browsing experience highly suitable for a handheld device. A wide range of content can be browsed through server-side rendering, using multi-level browsing and extracted summary information as appropriate. Specialized small screen content can be automatically recognized by the server 22 and rendered by the client 24 while also providing any related interactive capabilities. Large blocks of text-related material can be extracted by the server 22 and rendered for viewing on the client 24 in a highly readable form. All of this can be provided in a seamless browsing experience in which the user interacts with a single integrated browsing system.

Equivalents

While the invention has been particularly shown and described with reference to specific preferred embodiments, it should be understood by those skilled in the art that various changes in form and detail can be made therein without departing from the spirit and scope of the invention as defined by the appended claims.

What is claimed is:

1. A method of displaying visual content on a client device, comprising the steps of:

establishing a communications link between the client device and a server;

determining a display attribute of the client device;

representing a visual content element on a proxy display surface of the server;

transforming the represented visual content element to a bitmap based on the display attribute of the client device, the attribute comprising data describing a constituent component of the visual content element, in which the constituent component is localized to a sub-region of a proxy display surface; and transmitting the bitmap to the client device for display thereon.

2. The method of claim 1 further comprising the step of transmitting a sub-region coordinate of the constituent component to the client device.

3. The method of claim 2 further comprising the step of modifying a sub-region of a user interface of the client device in response to the sub-region coordinate.

4. A method of displaying visual content on a client device, comprising the steps of:

establishing a communications link between the client device and a server;

determining a display attribute of the client device;

representing a visual content element on a proxy display surface of the server;

transforming the represented visual content element to a bitmap based on the display attribute of the client device, the attribute comprising data describing a constituent component of the visual content element, wherein the data describing the constituent component comprises location coordinates in the proxy display surface; and transmitting the bitmap to the client device for display thereon.

5. A method of displaying visual content on a client device, comprising the steps of:

establishing a communications link between the client device and a server;

determining a display attribute of the client device;

representing a visual content element on a proxy display surface of the server;

defining a data element describing an attribute of the visual content element;

transforming the represented visual content element to a bitmap based on the display attribute of the client device;

transmitting the bitmap to the client device for display thereon;

receiving the bitmap and the data element at the client device; and generating a display surface in a display memory at the client device in response to the bitmap and the data element.

6. A method of displaying visual content on a client device, comprising the steps of:

establishing a communications link between the client device and a server;

determining a display attribute of the client device;

representing a visual content element on a proxy display surface of the server;

defining a data element describing an attribute of the visual content element;

transforming the represented visual content element to a bitmap based on the display attribute of the client device;

transmitting the bitmap to the client device for display thereon;

receiving the bitmap and the data element at the client device; and generating a display surface in an allocated client viewport at the client device in response to the bitmap and the data element.

7. A method for generating on a server a multi-level set of bitmaps from an input bitmap, comprising the steps of:

determining a display attribute of a client device;

selecting a pixel region of an input bitmap;

in response to the display attribute of the client device, performing a first transform operation on the pixel region to generate a first bitmap;

defining a data element corresponding to a second bitmap, the data element defining a relationship of the first bitmap to the second bitmap; and transmitting to the client the first bitmap, the second bitmap representation, and the data element.

8. The method of claim 7 wherein the step of selecting comprises recalling a stored selection identifying the pixel region.

9. A method for generating on a server a multi-level set of bitmaps from an input bitmap, comprising the steps of:

determining a display attribute of a client device;

identifying a plurality of pixel regions of an input bitmap;

in response to the display attribute of the client device, performing a first transform operation on each of the plurality of pixel regions to generate a plurality of bitmaps;

defining a plurality of data elements, each data element corresponding to a respective one of the plurality of bitmaps, each of the data elements defining a relationship of the respective bitmap to the input bitmap; and transmitting to the client the plurality of bitmaps and the plurality of data elements.

10. The method of claim 9 wherein the step of transmitting comprises transmitting to the client in a predetermined order the plurality of bitmaps and the plurality of data elements.

11. The method of claim 7 wherein said step of performing a first transform operation comprises performing a scaling operation on the pixel region.

12. The method of claim 11 further comprising the step of performing, in response to the display attribute of the client device, a second transform operation on the pixel region to generate the second bitmap.

13. The method of claim 7 wherein the second bitmap is the input bitmap.

14. The method of claim 7 further comprising the step of generating a first display of at least a portion of one of the first bitmap and the second bitmap on a client device.

15. The method of claim 14 further comprising the step of selecting from the first display at least a portion of the other of the first bitmap and the second bitmap and generating a second display in response thereto.

16. A server for providing a visual content element to a client device comprising:

a proxy module for representing a proxy display;

a transformation module in communication with the proxy module, the transformation module generating a bitmap in response to an input bitmap and a display attribute of the client device; and a communications module in communication with the transformation module, the communications module transmitting the bitmap to the client device for display thereon.

17. The server of claim 16 wherein the transformation module comprises a scaling module.

18. The server of claim 16 further comprising a client attribute module in communication with the transformation module, the client attribute module determining the display attribute of the client device.

19. The server of claim 16 further comprising a data element generator in communication with the transformation module, the data element generator producing a data element based on the display attribute.

20. The server of claim 16 wherein the communications module is configured to transmit the data element to the client device.

21. The server of claim 16 wherein the display attribute comprises data describing a constituent component of the visual content element.

22. The server of claim 21 wherein the communications module is configured to transmit a sub-region coordinate of the constituent component.

23. A server for generating a multi-level set of bitmaps from an input bitmap comprising:

a proxy module for representing a proxy display;

a communications module configured to receive pixel region selection data from a client device; and a transformation module in communication with the proxy module and the communications module, the transformation module performing a transform operation on a pixel region of the input bitmap to generate a first bitmap in response to the pixel region selection data, the transformation module generating a data element corresponding to a second bitmap, the data element defining a relationship of the first bitmap to the second bitmap.

24. The server of claim 23 wherein the communications module is configured to transmit the first bitmap, the second bitmap and the data element to the client device.

25. The server of claim 23 wherein the transformation module comprises a scaling module.

26. The server of claim 23 wherein the transformation module is configured to perform a second transform operation on the pixel region to generate the second bitmap.

27. A method for generating on a server a multi-level set of bitmaps from an input bitmap, comprising the steps of:

receiving an input bitmap at a client device;

selecting a pixel region of the input bitmap;

determining a display attribute of the client device;

in response to the display attribute of the client device, performing a first transform operation on the pixel region to generate a first bitmap; and transmitting to the client device the first bitmap.

28. The method of claim 27 further comprising the steps of:

defining a data element corresponding to a second bitmap, the data element defining a relationship of the first bitmap to the second bitmap; and transmitting to a client the second bitmap representation and the data element.

29. The method of claim 1 further comprising the step of inserting a watermark in the bitmap prior to the step of transmitting the bitmap.

30. The method of claim 29 wherein the watermark is not visible to a user of the client device.

31. The method of claim 29 wherein the watermark is an active visual control.

32. The method of claim 7 further comprising the step of generating a selection bookmark in response to the selection of a pixel region.

33. The method of claim 32 wherein the selection bookmark comprises a composite selection bookmark.

34. The method of claim 32 wherein the selection bookmark specifies a prioritization of the type of rendering for application to the selected pixel region.

35. The method of claim 7 further comprising the step of generating a transaction bookmark in response to the selection of a pixel region, the transaction bookmark being associated with an executable action including transmission of data from the client to a server.

36. The method of claim 35 wherein the transaction bookmark is a composite transaction bookmark including specifications for at least two transactions related to at least one visual content element.

37. The method of claim 35 wherein the transaction bookmark comprises a transaction trigger, the transaction trigger initiating the executable action based on one of an associated input action applied to a pixel location and a value defined within an input filed.

38. The method of claim 37 wherein the transaction trigger comprises an automatic trigger, the associated input action being automatically generated to initiate the executable transaction.

39. The method of claim 35 wherein the transaction bookmark comprises an executable input action to be applied to a rendered reference visual content element.

40. A method for generating on a server a composite rasterized image from a set of input images, comprising the steps of:

determining a display attribute of a client device;

selecting a pixel region of a first input bitmap;

selecting a pixel region of a second input bitmap;

in response to the display attribute of the client device, performing a transform operation on the first and second input bitmaps to generate a composite bitmap; and transmitting the composite bitmap to the client device for display thereon.

41. A method of displaying visual content on a client device, comprising the steps of:

establishing a communications link between the client device and a server;

determining a display attribute of the client device;

representing a visual content element on a proxy display surface of the server;

transforming a first part of the represented visual content element to a first bitmap based on the display attribute of the client device;

transmitting the first bitmap to the client device for display thereon;

transmitting a second part of the represented visual content element to the client device; and transforming the second part of the represented visual content element to a second bitmap at the client device for display thereon.

42. The method of claim 41 wherein the second part of the represented visual content is text-related content.

43. The method of claim 41 further comprising the step of transcoding the second part of the represented visual content element prior to transmission.

44. A method of displaying visual content on a client device, comprising the steps of:

establishing a communications link between the client device and a server;

determining a display attribute of the client device;

representing a visual content element on a proxy display surface of the server;

performing a first transformation on a first portion of the represented visual content element to generate a first bitmap based on the display attribute of the client device;

performing a second transformation on a second portion of the represented visual content element to generate a second bitmap based on the display attribute of the client device; and transmitting the first and second bitmaps to the client device for display thereon.

* * * * *